US012606745B2

(12) United States Patent
Kojima et al.

(10) Patent No.: US 12,606,745 B2
(45) Date of Patent: Apr. 21, 2026

(54) LIQUID CRYSTAL MEDIUM

(71) Applicant: MERCK PATENT GMBH, Darmstadt (DE)

(72) Inventors: Akihiro Kojima, Tokyo (JP); Fumio Shimano, Tokyo (JP)

(73) Assignee: MERCK PATENT GMBH, Darmstadt (DE)

( * ) Notice: Subject to any disclaimer, the term of this patent is extended or adjusted under 35 U.S.C. 154(b) by 18 days.

(21) Appl. No.: 18/132,551

(22) Filed: Apr. 10, 2023

(65) Prior Publication Data

US 2024/0360362 A1 Oct. 31, 2024

(30) Foreign Application Priority Data

Apr. 11, 2022 (EP) .................................... 22167585

(51) Int. Cl.

| | |
|---|---|
| ***G02F 1/1333*** | (2006.01) |
| ***C09K 19/34*** | (2006.01) |
| ***G02F 1/1337*** | (2006.01) |
| ***G02F 1/137*** | (2006.01) |
| *C09K 19/04* | (2006.01) |

(52) U.S. Cl.

CPC .... *C09K 19/3491* (2013.01); *G02F 1/133742* (2021.01); *G02F 1/13712* (2021.01); *C09K 2019/0448* (2013.01)

(58) Field of Classification Search

CPC .. C09K 19/04; C09K 19/0425; C09K 19/068; C09K 19/0444; C09K 19/2007; G02F 1/1333; G02F 1/13712

See application file for complete search history.

(56) References Cited

U.S. PATENT DOCUMENTS

| | | | | |
|---|---|---|---|---|
| 10,774,264 | B2 | 9/2020 | Kurihara et al. | |
| 11,208,395 | B2 * | 12/2021 | Li | C09K 19/322 |
| 2010/0108945 | A1 | 5/2010 | Ijima et al. | |
| 2017/0044436 | A1 | 2/2017 | Kojima et al. | |
| 2018/0216005 | A1 | 8/2018 | Engel et al. | |
| 2018/0216006 | A1 | 8/2018 | Engel et al. | |
| 2019/0345129 | A1 | 11/2019 | Li et al. | |
| 2021/0179942 | A1 * | 6/2021 | Deing | C09K 19/3003 |
| 2023/0024370 | A1 | 1/2023 | Laut et al. | |
| 2023/0323209 | A1 * | 10/2023 | Wang | C09K 19/542 |

FOREIGN PATENT DOCUMENTS

| | | | | |
|---|---|---|---|---|
| EP | 2182046 | A1 | 5/2010 | |
| EP | 3130650 | A1 | 2/2017 | |
| EP | 3323873 | A1 | 5/2018 | |
| EP | 3354709 | A1 | 8/2018 | |
| EP | 3354710 | A1 | 8/2018 | |
| EP | 3933009 | A1 | 1/2022 | |
| JP | 2019147859 | A * | 9/2019 | C09K 19/12 |
| JP | 2020-158503 | * | 10/2020 | C09K 19/54 |
| WO | WO-2019107394 | A1 * | 6/2019 | C09K 19/12 |
| WO | WO-2020090173 | A1 * | 5/2020 | C09K 19/12 |
| WO | WO 2020/090173 | A * | 7/2020 | C09K 19/12 |
| WO | 2023/036746 | * | 3/2023 | C09K 19/04 |

OTHER PUBLICATIONS

Machine translation of WO 2020/090173 A (Year: 2020).*
Office Action in corresponding EP 23166894.8 dated Aug. 2, 2023 (pp. 1-7).

* cited by examiner

*Primary Examiner* — Geraldina Visconti
(74) *Attorney, Agent, or Firm* — Csaba Henter; MILLEN, WHITE, ZELANO & BRANIGAN, P.C.

(57) ABSTRACT

Liquid crystal (LC) media having negative dielectric anisotropy, the use thereof in an electro-optical display, particularly in a display with passive matrix addressing, based on the VA, ECB, FFS or IPS effect, and displays of this type, in particular an energy saving PM-VA display with low duty driving.

18 Claims, No Drawings

LIQUID CRYSTAL MEDIUM

The present invention relates to liquid crystal (LC) media having negative dielectric anisotropy, to the use thereof in an electro-optical display, particularly in a display with passive matrix addressing, based on the VA, ECB, FFS or IPS effect, and to displays of this type.

One of the liquid-crystal display (LCD) modes used at present is the TN ("twisted nematic") mode. However, TN LCDs have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative dielectric anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which structured in a comb-shaped manner and the other is unstructured. A strong, so-called "fringe field" is thereby generated, i.e., a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays but comprise a layer of an LC medium with negative dielectric anisotropy instead of an LC medium with positive dielectric anisotropy. The LC medium with negative dielectric anisotropy shows a more favorable director orientation that has less tilt and more twist orientation compared to the LC medium with positive dielectric anisotropy, as a result of which these displays have a higher transmission. The displays further comprise an alignment layer, preferably of polyimide provided on at least one of the substrates that is in contact with the LC medium and induces planar alignment of the LC molecules of the LC medium. These displays are also known as "Ultra Brightness FFS (UB-FFS)" mode displays. These displays require an LC medium with high reliability.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

Especially in view of mobile devices there is great demand for displays with high transmission, which enable the use of less intensive backlight, and, hence, leads to longer battery lifetime. Alternatively, of course, displays with higher brightness can be achieved having improved contrast especially under ambient light.

Both VA and FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method.

The invention is based on the object of providing novel suitable LC media optionally comprising reactive mesogens (RM), for use in displays, which do not have the disadvantages indicated above or do so to a reduced extent.

In particular, the invention is based on the object of LC media which enable displays with high transmittance and at the same time very high specific resistance values, high VHR values, high reliability, low threshold voltages, short response times, suitable birefringence, useful to reduce or prevent the occurrence of "image sticking" and "ODF mura" in the display.

Especially for passive-matrix (PM) displays improved liquid crystal materials are required. In particular lower threshold voltages, higher clearing points and adequate birefringence values are required. Media suitable for PM LC displays with negative dielectric anisotropy are described for example in EP 2 182 046 A1 and in EP3130650A1.

These objects have been achieved in accordance with the present invention by materials and processes as described in the present application. In particular, it has been found, surprisingly, that the use of liquid crystalline hosts as described hereinafter allows achieving the advantageous effects as mentioned above.

The invention relates to a liquid crystal medium comprising a) one or more compounds of the formula I

I

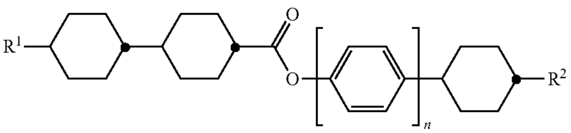

in which $R^1$ and $R^2$ independently of one another, denote H, an alkyl or alkenyl radical having 1 to 12 C atoms or 2 to 12 C atoms, respectively, which is unsubstituted, monosubstituted by CN or $CF_3$ or at least monosubstituted by halogen, where, in addition, one or more $CH_2$ groups in these radicals may be replaced by —O—, —S—,

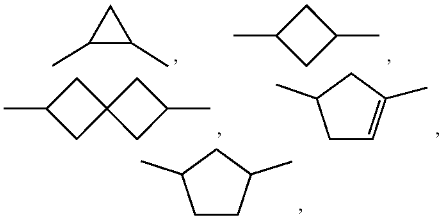

—C≡C—, —$CF_2$O—, —O$CF_2$—, —OC—O— or —O—CO— in such a way that O atoms are not linked directly to one another, and n is 0 or 1, b) one or more compounds selected from the group of the formulae IIA, IIB, IIC and IID

IIA

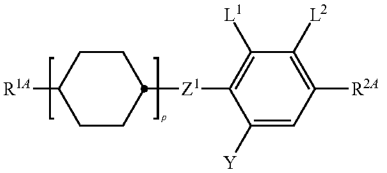

IIB

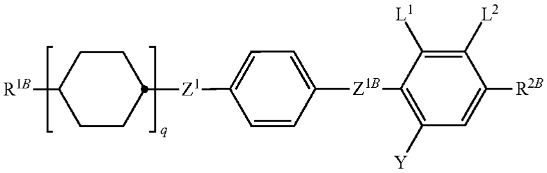

IIC

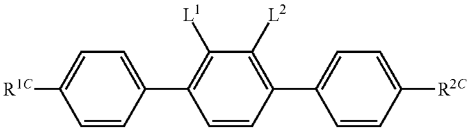

-continued

IID

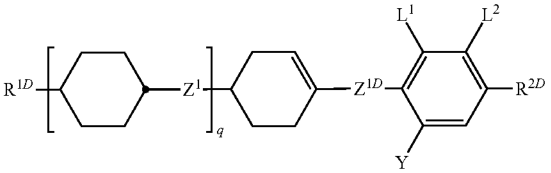

in which $R^{1A}$, $R^{1B}$, $R^{1C}$, $R^{1D}$, $R^{2A}$, $R^{2B}$, $R^{2C}$ and $R^{2D}$ each, independently of one another, denote H, an alkyl or alkenyl radical having 1 to 12 C atoms or 2 to 12 C atoms, respectively, which is unsubstituted, monosubstituted by CN or $CF_3$ or at least monosubstituted by halogen, where, in addition, one or more $CH_2$ groups in these radicals may be replaced by —O—, —S—,

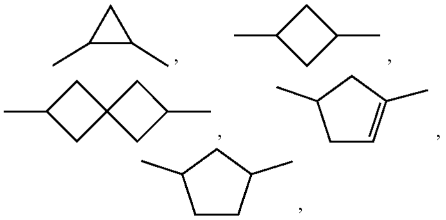

—C≡C—, —$CF_2$O—, —O$CF_2$—, —OC—O— or —O—CO— in such a way that O atoms are not linked directly to one another, $L^1$ and $L^2$, each, independently of one another, denote F, C, $CF_3$ or $CHF_2$, Y on each occurrence, identically or differently, denotes H, F, C, $CF_3$, $CHF_2$ or $CH_3$, $Z^1$, $Z^{1B}$ and $Z^{1D}$ each, independently of one another, denote a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF— or —CH═CH$CH_2$O—, p denotes 0, 1 or 2, q denotes 0 or 1, and v denotes an integer from 1 to 6, and c) one or more compounds of the formula III

III

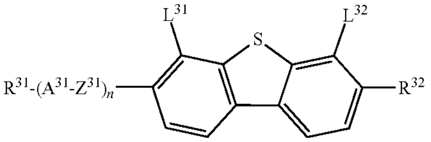

in which $R^{31}$ and $R^{32}$ each, independently of one another, denote H, an alkyl or alkoxy radical having 1 to 15 C atoms, where one or more $CH_2$ groups in these radicals may each be replaced, independently of one another, by

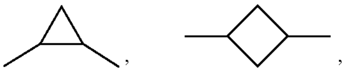

-continued

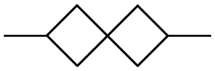
,
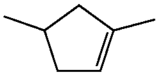
,
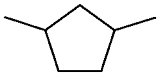
,

—C≡C—, —$CF_2O$—, —$OCF_2$—, —CH=CH—, by —O—, —CO—O— or —O—CO— in such a way that O atoms are not linked directly to one another, and in which, in addition, one or more H atoms may be replaced by halogen, $A^{31}$ on each occurrence, independently of one another, denotes
- a) 1,4-cyclohexylene or 1,4-cyclohexenylene radical, in which one or two non-adjacent $CH_2$ groups may be replaced by —O— or —S—,
- b) a 1,4-phenylene radical, in which one or two CH groups may be replaced by N, or
- c) a radical from the group spiro[3.3]heptane-2,6-diyl, 1,4-bicyclo-[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be mono- or polysubstituted by halogen atoms, $Z^{31}$ on each occurrence independently of one another denotes —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH=CH—$CH_2O$—, —$C_2F_4$—, —$CH_2CF_2$—, —$CF_2CH_2$—, —CF=CF—, —CH=CF—, —CF=CH—, —CH=CH—, —C≡C— or a single bond, $L^{31}$ and $L^{32}$ each, independently of one another, denote F, Cl, $CF_3$ or $CHF_2$, and n is 0, 1 or 2.

The invention furthermore relates to an LC display comprising the LC medium described above and below.

The invention in particular relates to an LC display comprising an LC medium according to the invention based on the VA, ECB, FFS or IPS, that is preferably addressed by a passive matrix, very particularly to an energy saving PM-VA display with low duty driving.

The invention furthermore relates to a process for preparing an LC medium as described above and below, comprising the steps of mixing one or more compounds of formula I and one or more compounds selected from the group consisting of the formulae IIA, IIB, IIC and IID and one or more compounds of the formula III.

The invention furthermore relates to the use of LC media according to the invention in LC displays.

The invention furthermore relates to a process for manufacturing an LC display as described above and below, comprising the steps of filling or otherwise providing an LC medium, which optionally comprises one or more polymerisable compounds, between the substrates of the display, and optionally polymerising the polymerisable compounds.

Preferred embodiments are subject matter of the dependent claims and can also be taken from the description.

It was surprisingly found that the use of the liquid crystal medium according to the invention enables displays with improved transmission, reduced image sticking and ODF mura in the display, a high reliability and a high VHR value and generally fast response times, a low threshold voltage and, as well as high reliability when exposed to the environment when used outdoors.

In particular, the medium according to the invention is distinguished by an excellent low-temperature stability (LTS) under harsh conditions when used outdoors.

The LC media according to the invention show the following advantageous properties when used in VA or FFS displays:
- improved transmission of the display,
- high elastic constants that enable a display with high contrast,
- a high clearing temperature,
- a high voltage-holding-ratio,
- fast switching,
- sufficient stability against heat and/or UV in particular when used outdoors.

In particular, the liquid crystal medium according to the invention shows a favorable relatively low ratio of rotational viscosity to the splay elastic constant $\gamma_1/K_1$. This contributes to improved switching behaviour especially at low driving voltages which is useful to enable energy-saving displays.

Preferred compounds of the formula I are selected from the compounds of the formulae I-1 and I-2

I-1

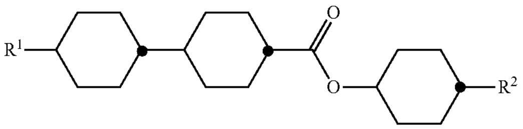

I-2

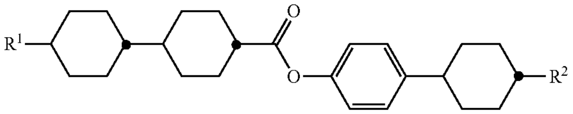

in which $R^1$ and $R^2$ denote alkyl having 1 to 7 C atoms.

Preferably, the medium comprises one, two, three or more compounds of formula 1-1 and one, two, three or more compounds of the formula 1-2.

Preferred compounds of the formula 1-1 are the compounds of the formulae I-1-1 to I-1-8:

I-1-1

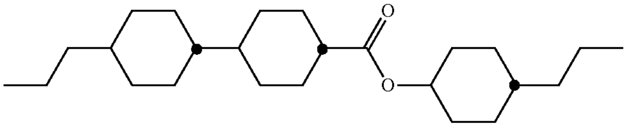

-continued
I-1-2
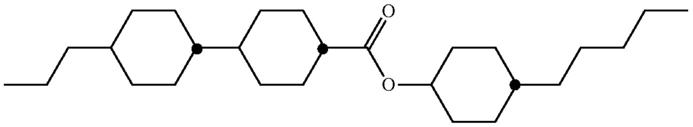
I-1-3
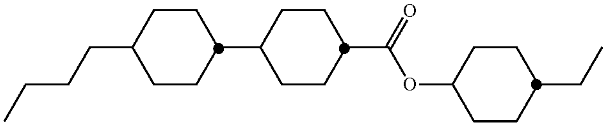
I-1-4
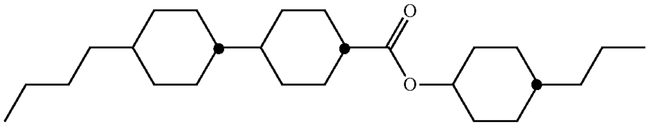
I-1-5
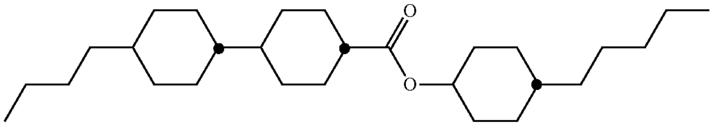
I-1-6
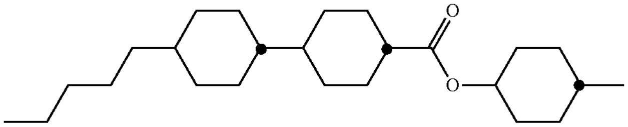
I-1-7
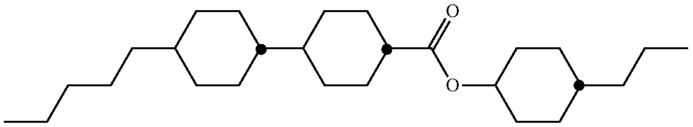
I-1-8
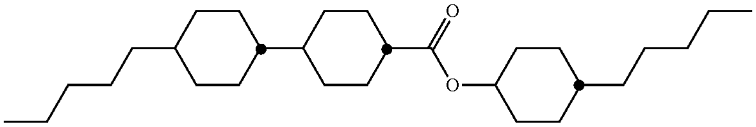
.
Especially preferred are the compounds of the formulae I-1-1, I-1-2, I-1-4, and I-1-5.
Preferred compounds of the formula I-2 are selected from the compounds of the formulae I-2-1 to I-2-4
I-2-1
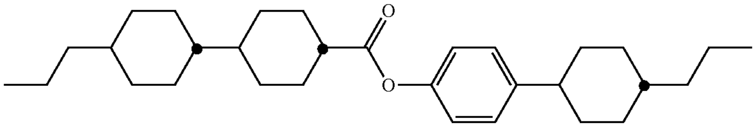
I-2-2
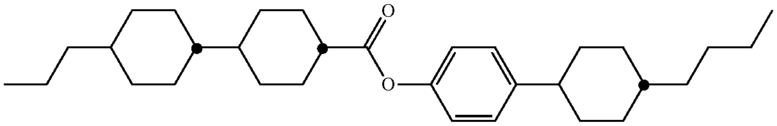
I-2-3
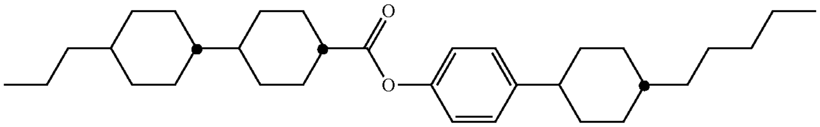

-continued
I-2-4
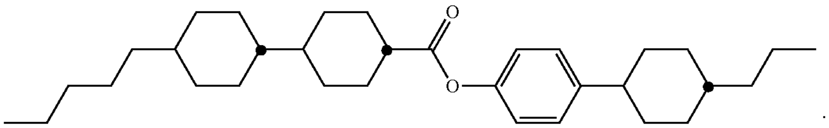
Preferred compounds of the formulae IIA, IIB, IIC and IID are indicated below:
IIA-1
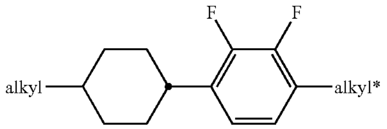
IIA-2
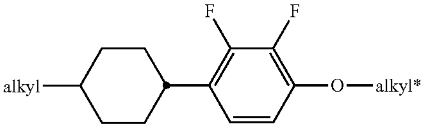
IIA-3
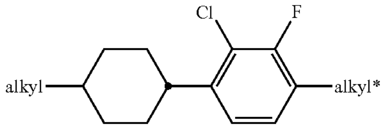
IIA-4
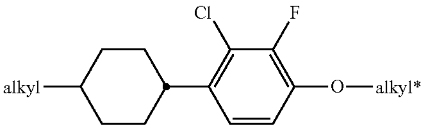
IIA-5
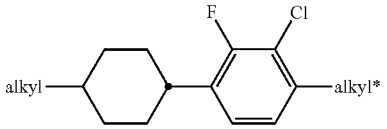
IIA-6
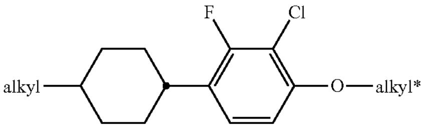
IIA-7
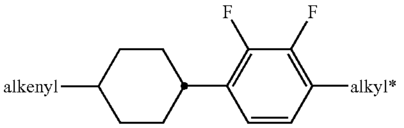
IIA-8
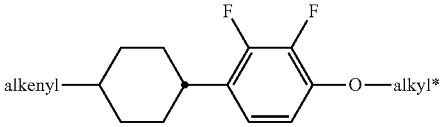
IIA-9
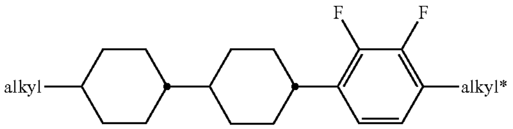
-continued
IIA-10
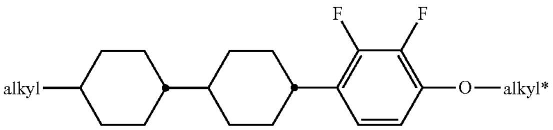
IIA-11
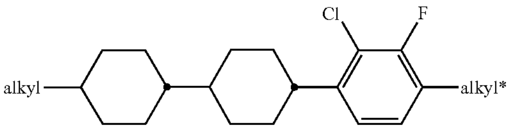
IIA-12
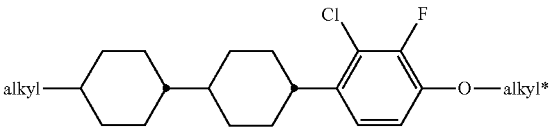
IIA-13
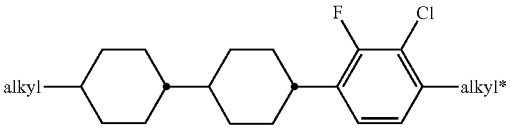
IIA-14
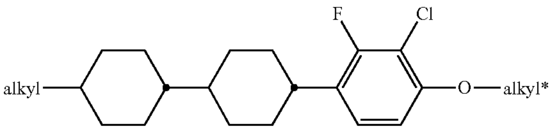
IIA-15
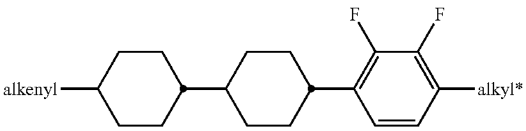
IIA-16
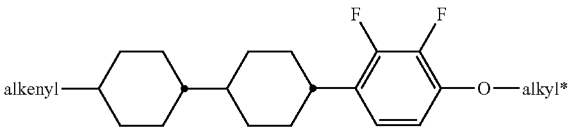
IIA-17
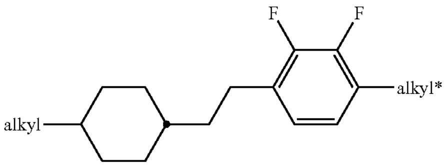

-continued
IIA-18
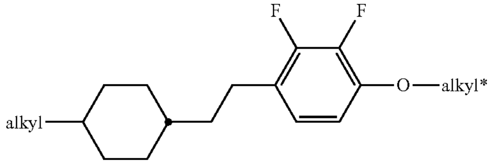
IIA-19
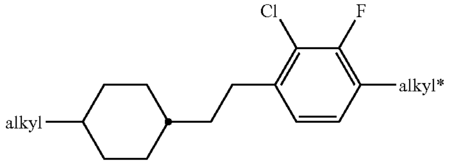
IIA-20
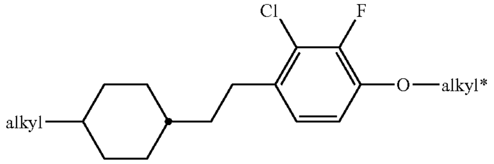
IIA-21
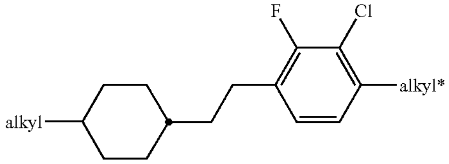
IIA-22
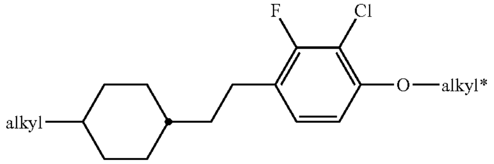
IIA-23
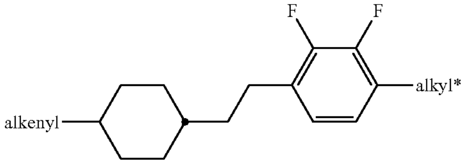
IIA-24
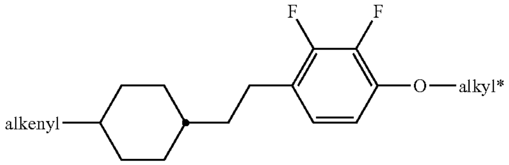
IIA-25
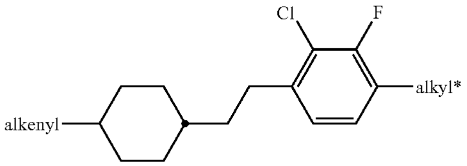
IIA-26
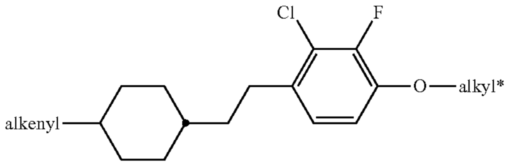
-continued
IIA-27
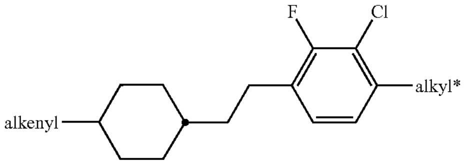
IIA-28
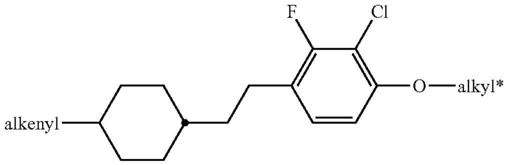
IIA-29
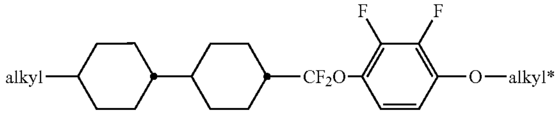
IIA-30
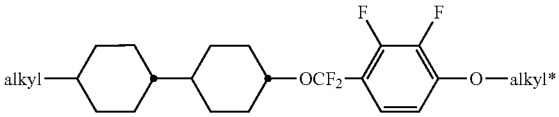
IIA-31
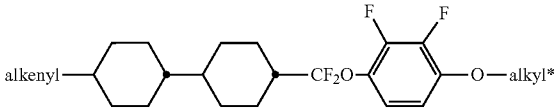
IIA-32
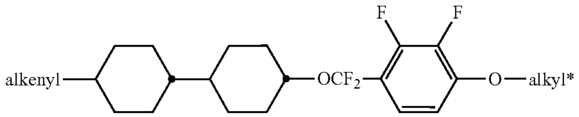
IIA-33
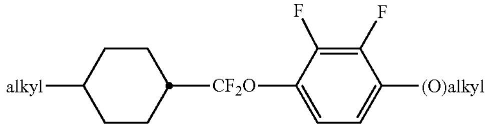
IIA-34
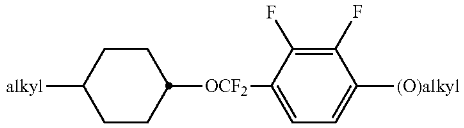
IIA-35
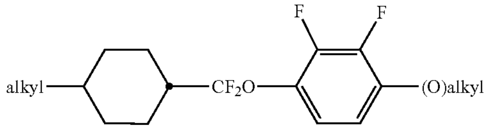
IIA-36
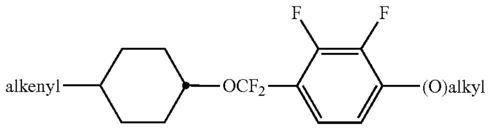

-continued
IIA-37
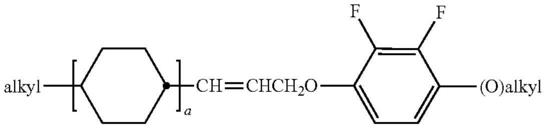
IIA-38
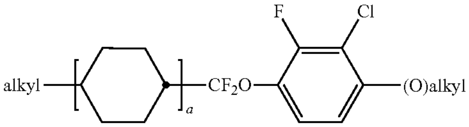
IIA-39
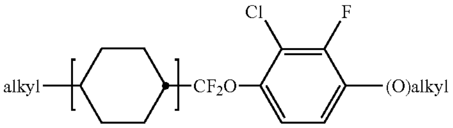
IIA-40
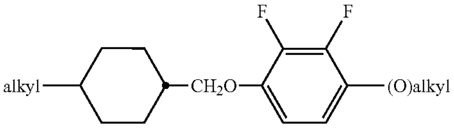
IIA-41
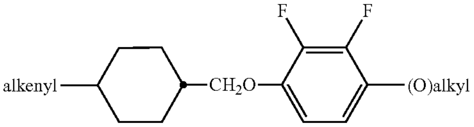
IIA-42
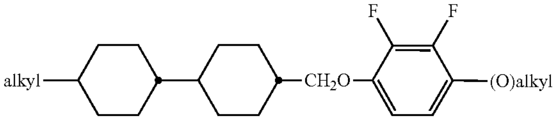
IIA-43
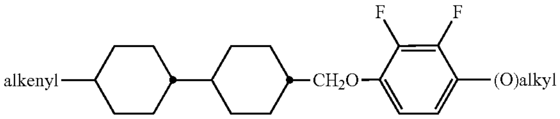
IIA-44
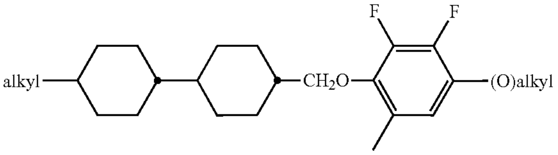
IIA-45
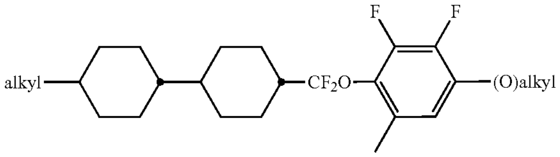
IIB-1
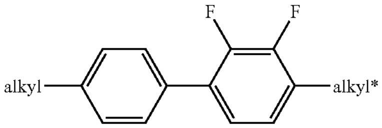
-continued
IIB-2
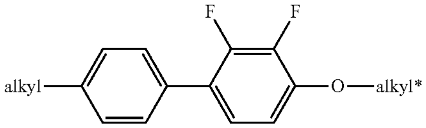
IIB-3
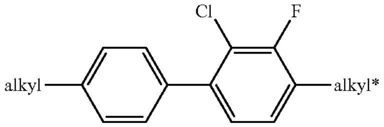
IIB-4
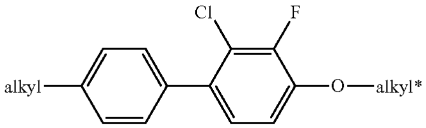
IIB-5
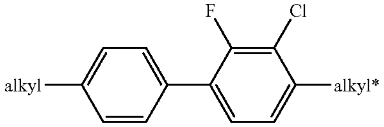
IIB-6
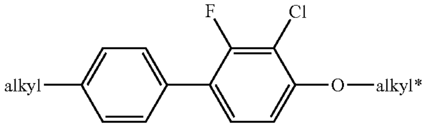
IIB-7
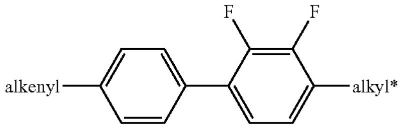
IIB-8
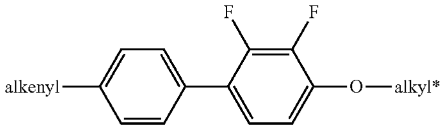
IIB-9
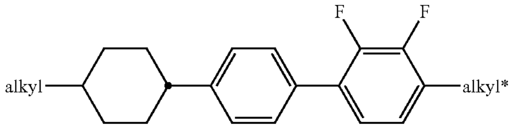
IIB-10
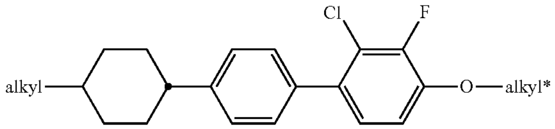
IIB-11
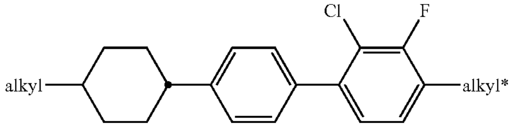
IIB-12
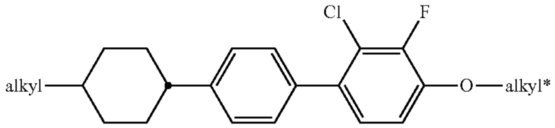

-continued
IIB-13
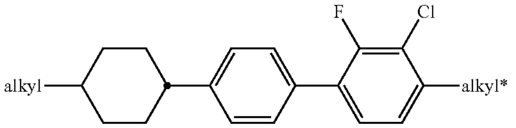
IIB-14
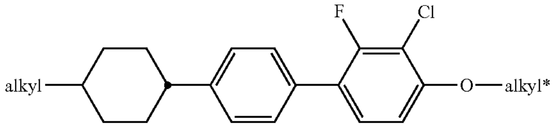
IIB-15
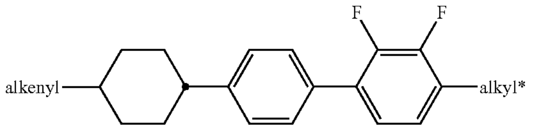
IIB-16
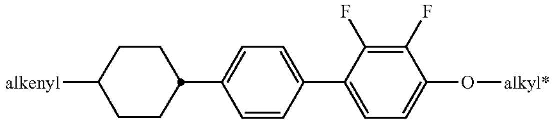
IIB-17
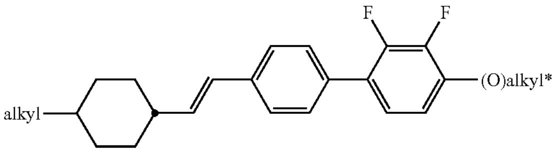
IIB-18
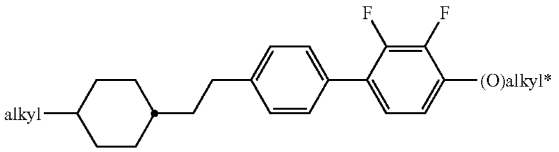
IIB-19
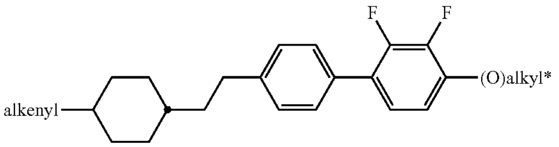
IIB-20
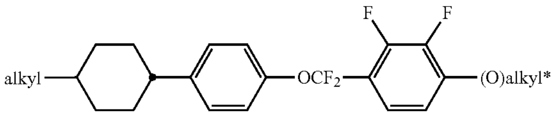
IIB-21
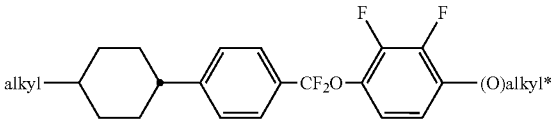
IIB-22
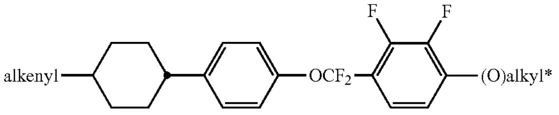
-continued
IIB-23
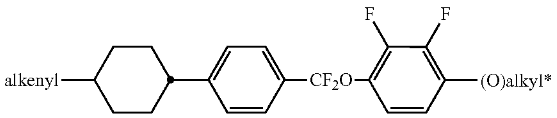
IIB-24
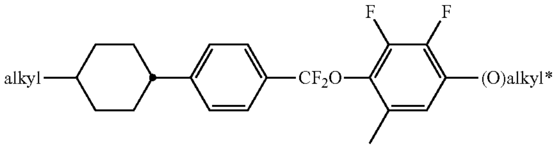
IIC-1
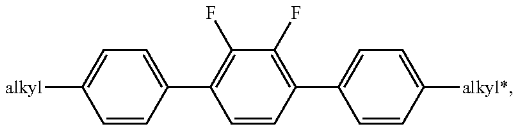
IID-1
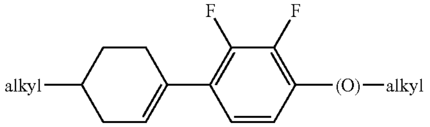
IID-2
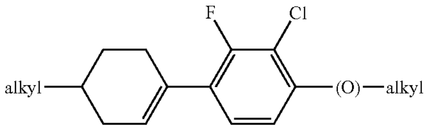
IID-3
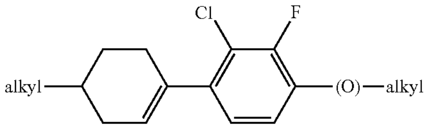
IID-4
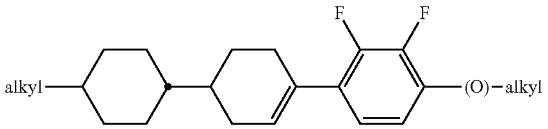
IID-5
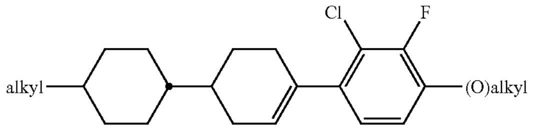
IID-6
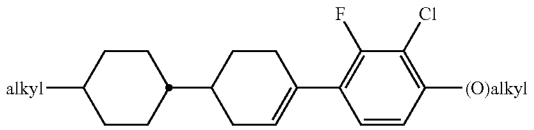
IID-7
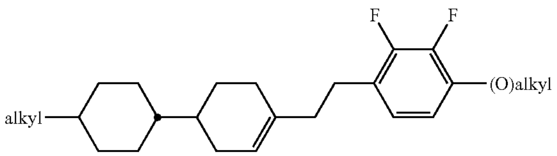

-continued

IID-8

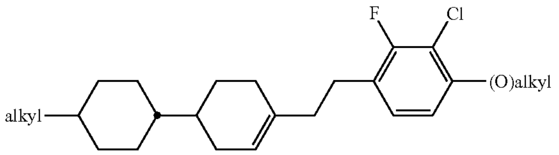

IID-9

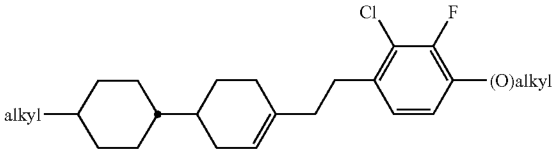

IID-10

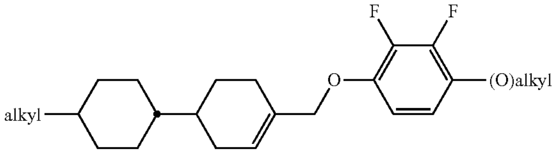

IID-11

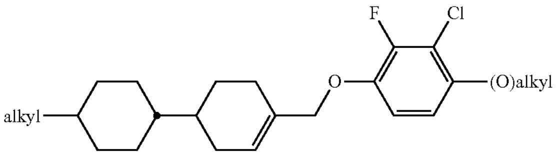

IID-12

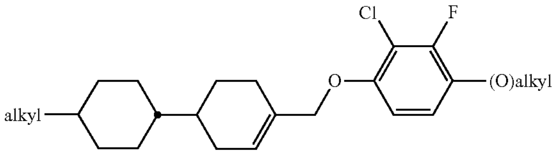

IID-13

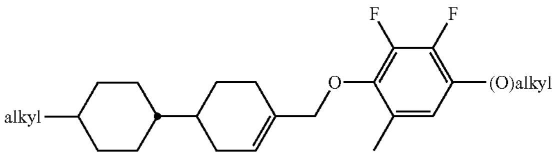

in which the parameter a denotes 1 or 2, alkyl and alkyl* each, independently of one another, denote a straight-chain or branched or cyclic alkyl radical having 1-6 C atoms, and alkenyl denotes a straight-chain or branched alkenyl radical having 2-6 C atoms, and (O) denotes an oxygen atom or a single bond, preferably an oxygen atom. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Very preferred media according to the invention comprise one or more compounds of formula IIB-2

IIB-2

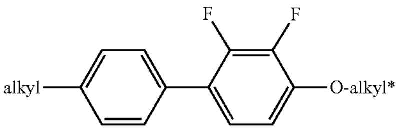

in which alkyl and alkyl* each, independently of one another, denote a straight-chain alkyl radical having 1-6 C atoms, and (O) denotes an oxygen atom or a single bond, in particular the compounds IIB-2-1

IIB-2-1

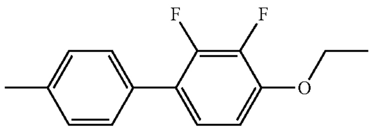

.

In particular, the medium comprises one or more compounds of the formula IIA-2 selected from the following sub-formulae:

IIA-2-1

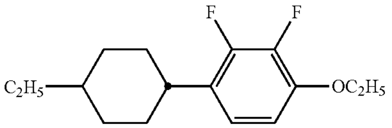

IIA-2-2

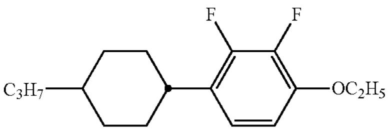

IIA-2-3

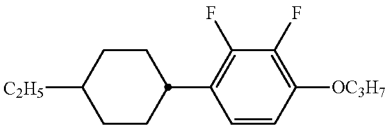

IIA-2-4

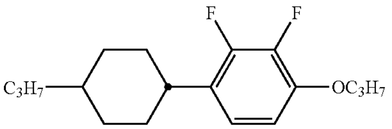

IIA-2-5

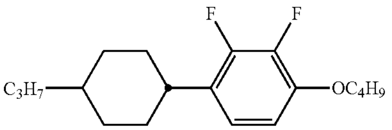

Alternatively, preferably in addition to the compounds of the formulae IIA-2-1 to IIA-2-5, the medium comprises one or more compounds of the formulae IIA-2a-1 to IIA-2a-5:

IIA-2a-1

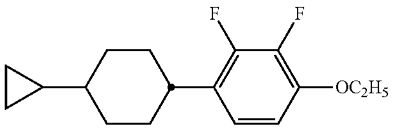

IIA-2a-2

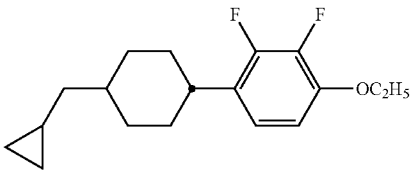

-continued

IIA-2a-3

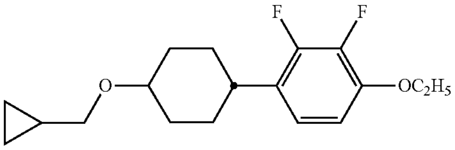

IIA-2a-4

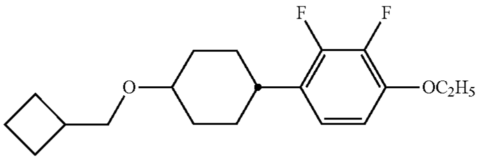

IIA-2a-5

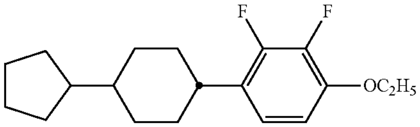

In particular, the medium comprises one or more compounds of the formula IIA-10 selected from the following sub-formulae:

IIA-10-1

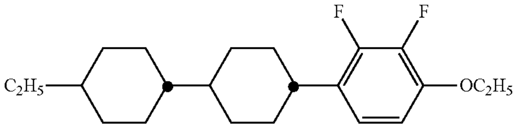

IIA-10-2

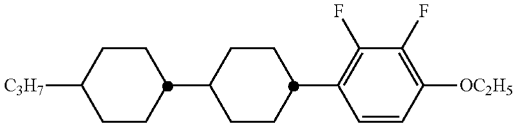

IIA-10-3

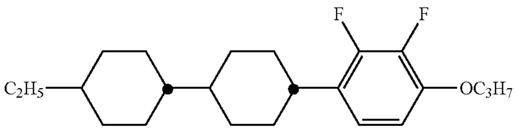

IIA-10-4

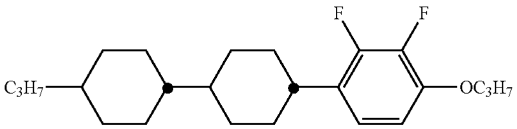

IIA-10-5

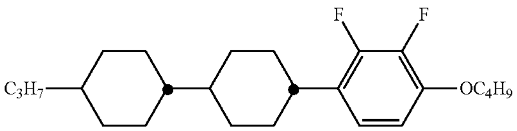

Alternatively, preferably in addition to the compounds of the formulae IIA-10-1 to IIA-10-5, the medium comprises one or more compounds of the formulae IIA-10a-1 to IIA-10a-5:

IIA-10a-1

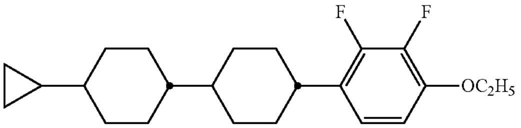

IIA-10a-2

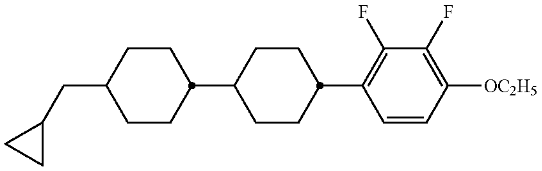

IIA-10a-3

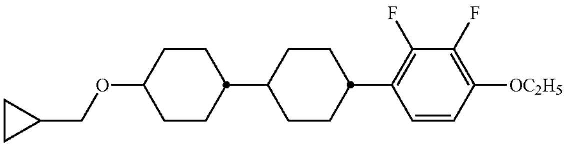

IIA-10a-4

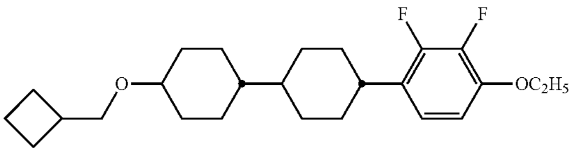

IIA-10a-5

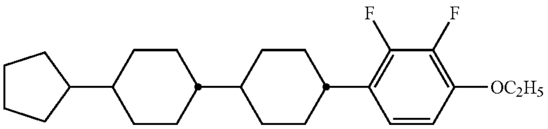

In particular, the medium comprises one or more compounds of the formula IIB-10 selected from the following sub-formulae:

IIB-10-1

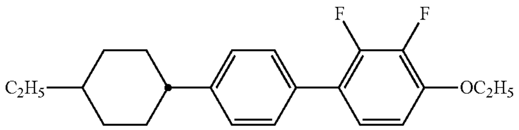

IIB-10-2

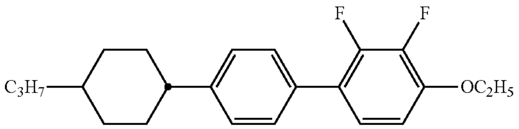

IIB-10-3

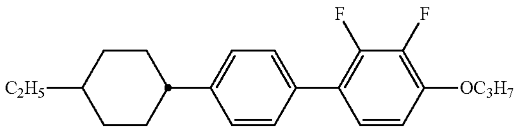

-continued

IIB-10-4

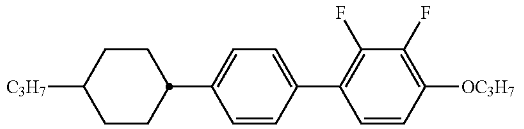

IIB-10-5

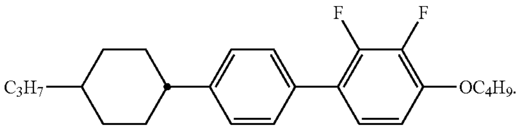

Alternatively, preferably in addition to the compounds of the formulae IIB-10-1 to IIB-10-5, the medium comprises one or more compounds of the formulae IIB-10a-1 to IIB-10a-5:

IIB-10a-1

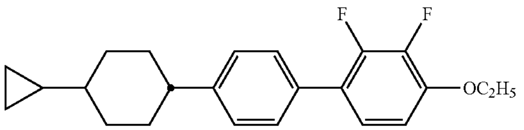

IIB-10a-2

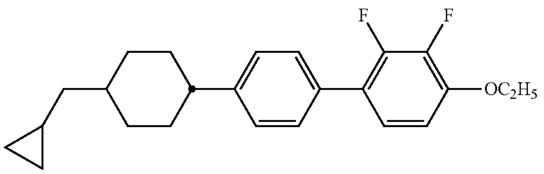

IIB-10a-3

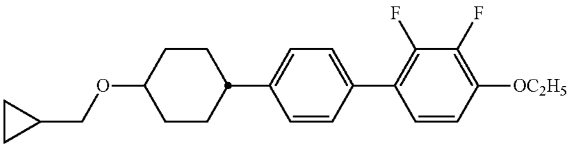

IIB-10a-4

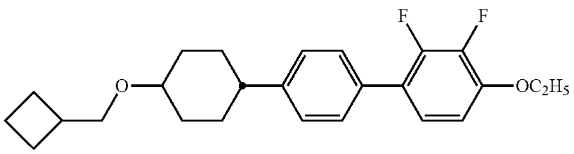

IIB-10a-5

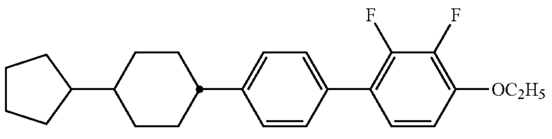

Very preferred compounds of the formula IID are selected from the compounds of the formulae IID-4, IID-7 and IID-10, and are in particular selected from the following sub-formulae:

IID-10-1

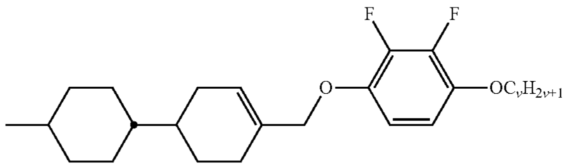

IID-10-2

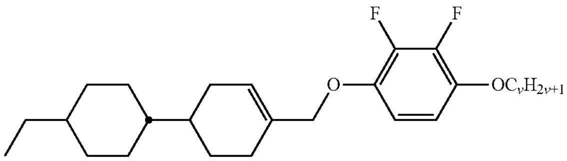

IID-10-3

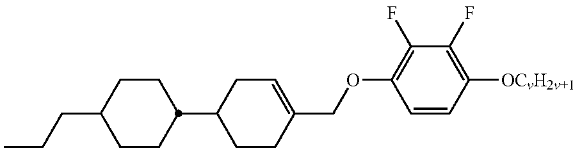

IID-10-4

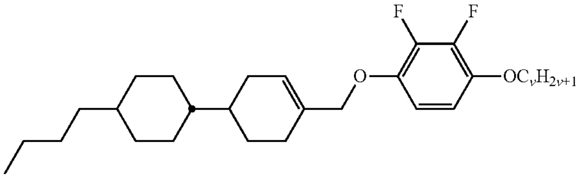

IID-10-5

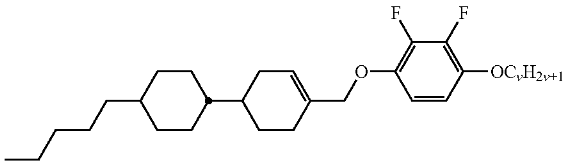

IID-10-6

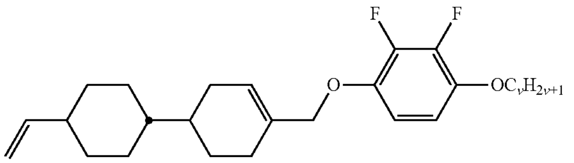

IID-10-7

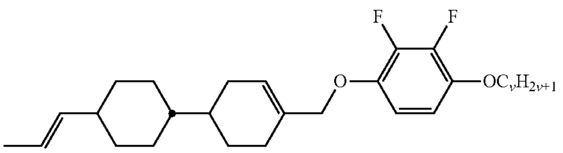

IID-10-8

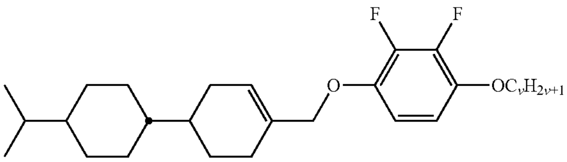

-continued
IID-10-9
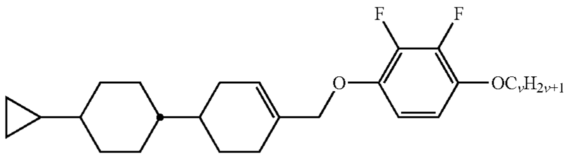
IID-10-10
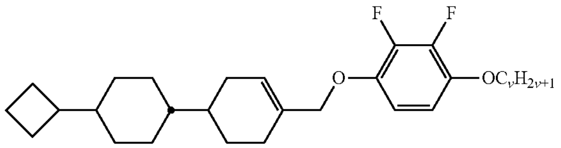
IID-10-11
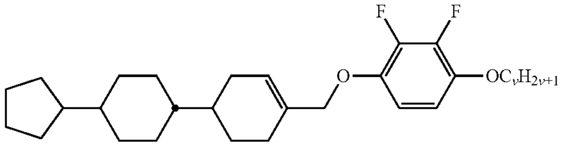
IID-10-12
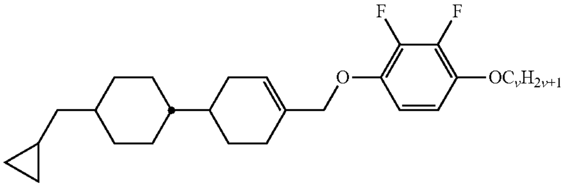
IID-10-13
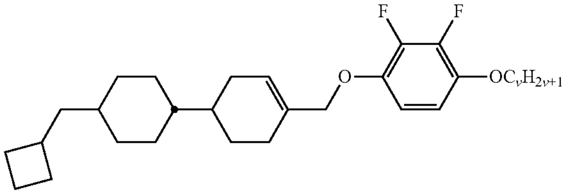
IID-10-14
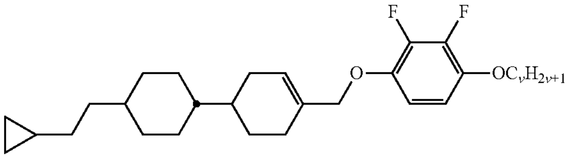
IID-10-15
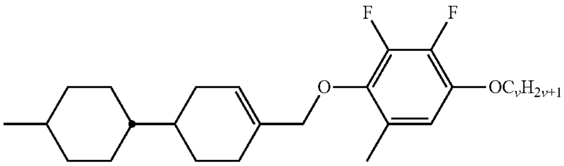
IID-10-16
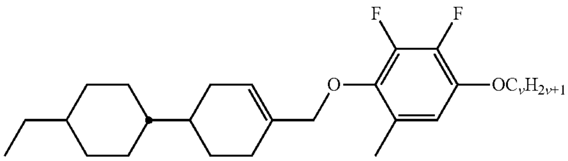
-continued
IID-10-17
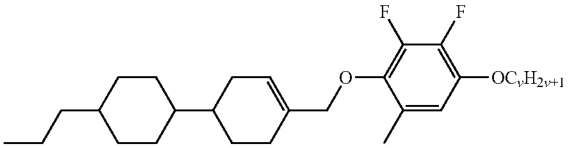
IID-10-18
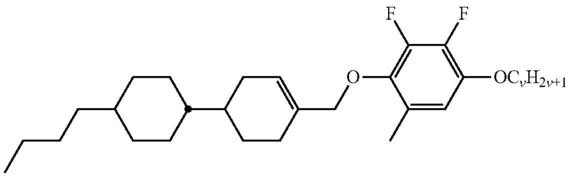
IID-10-19
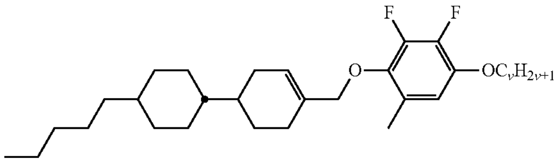
IID-10-20
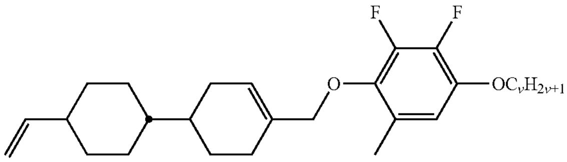
IID-10-21
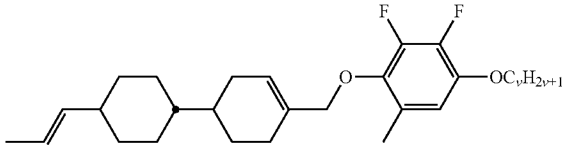
IID-10-22
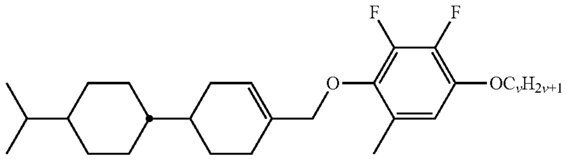
IID-10-23
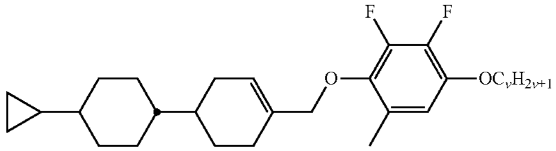
IID-10-24
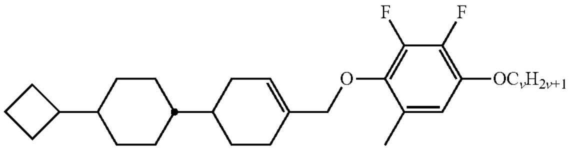

-continued

IID-10-25

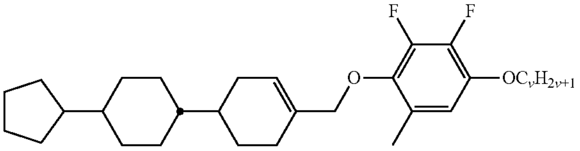

IID-10-26

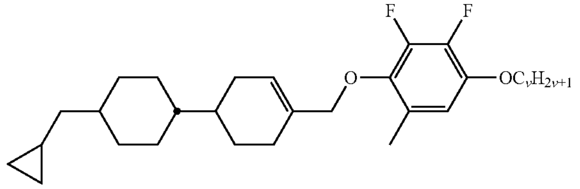

IID-10-27

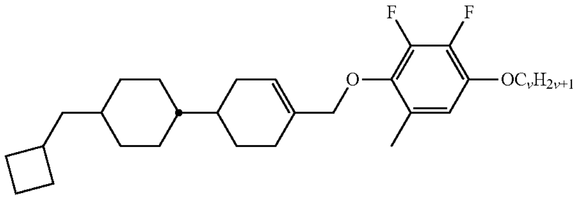

IID-10-28

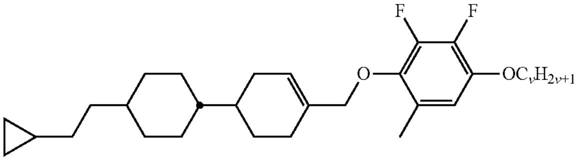

IID-10-29

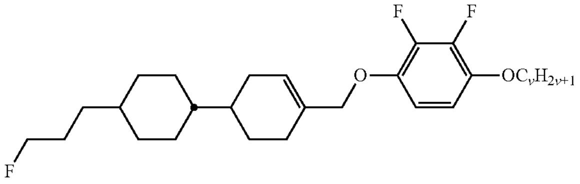

IID-10-30

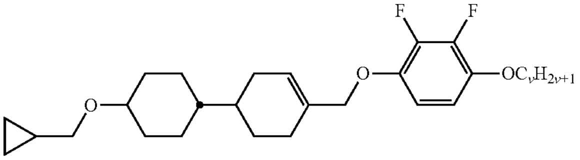

in which v is an integer from 1 to 6.

In a preferred embodiment, the medium comprises one or more compounds of formula IID-10a IID-10a

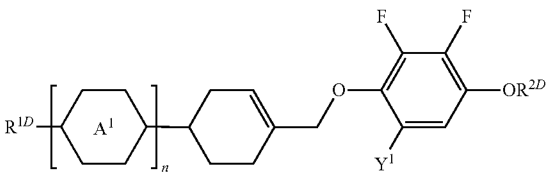

in which the occurring groups and parameters have the meanings given above under formula IID, and $R^{2D}$ denotes

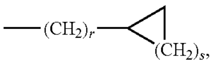

in which r is 0, 1, 2, 3, 4, 5 or 6 and s is 1, 2 or 3.

Preferred compounds of formula IID-10a are the compounds IID-10a-1 to IID-10a-14:

IID-10a-1

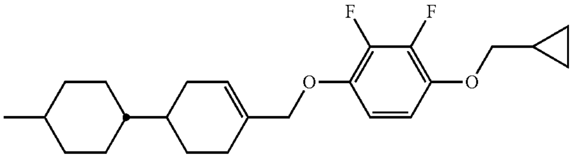

IID-10a-2

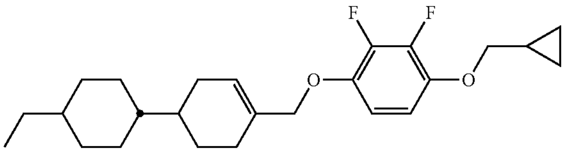

IID-10a-3

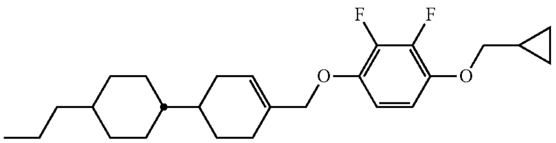

IID-10a-4

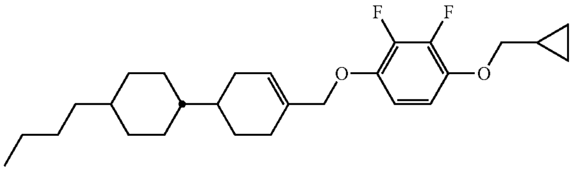

IID-10a-5

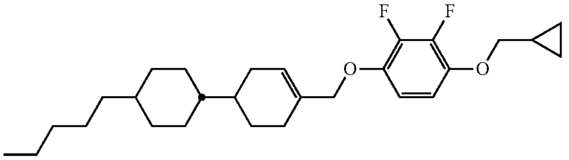

IID-10a-6

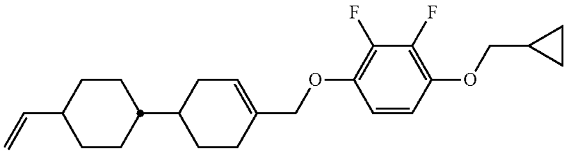

IID-10a-7

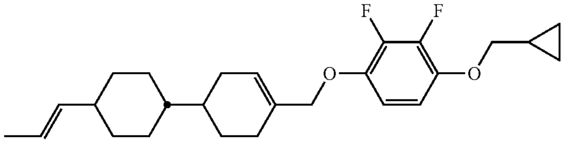

-continued

IID-10a-8

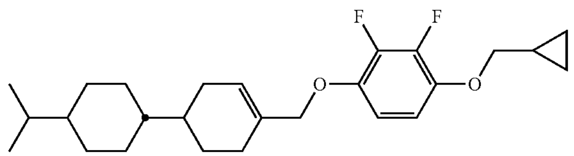

IID-10a-9

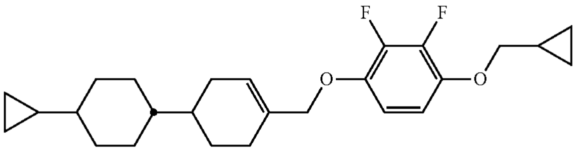

IID-10a-10

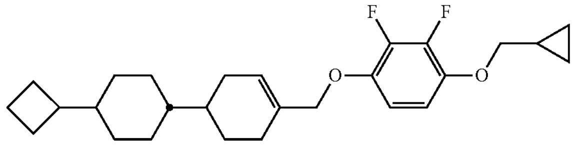

IID-10a-11

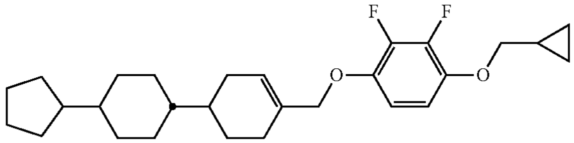

IID-10a-12

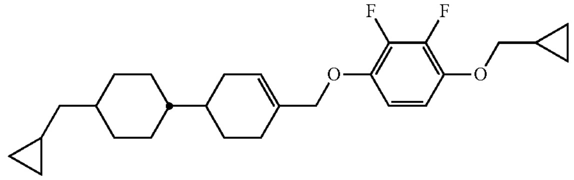

IID-10a-13

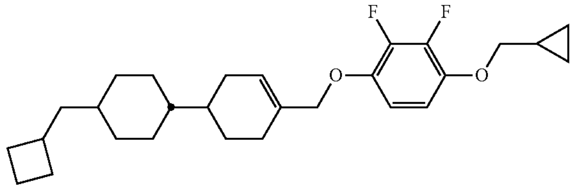

IID-10a-14

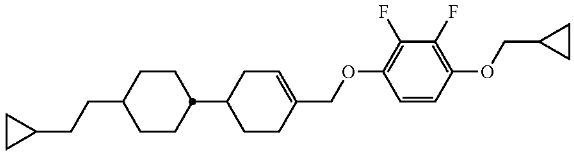

More preferred media according to the invention comprise one or more compounds of the formulae IIA-2, IIA-8, IIA-10, IIA-16, IIA-18, IIA-40, IIA-41, IIA-42, IIA-43, IIB-2, IIB-10, IIB-16, IIC-1, IID-4 and IID-10.

The compounds of formula III are preferably selected from the compounds of the formula III-1

III-1

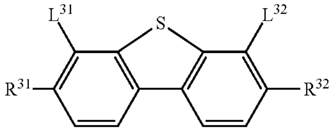

in which the occurring groups have the meanings given under formula III above and preferably $R^{31}$ and $R^{32}$ each, independently of one another, denote an alkyl or alkoxy radical having 1 to 15 C atoms or an alkenyl radical having 2 to 15 C atoms, more preferably one or both of them denote an alkoxy radical having 1 to 7 C atoms, and $L^{31}$ and $L^{32}$ preferably denote F.

The liquid crystal medium according to the invention preferably comprises one, two or more compounds of formula III-1.

Preferably, the compounds of the formula III-1 are selected from the group of compounds of formulae Ill-1-1 to Ill-1-10, preferably of formula III-1-6,

III-1-1

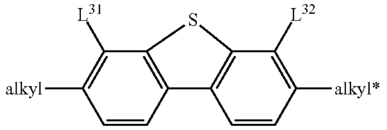

III-1-2

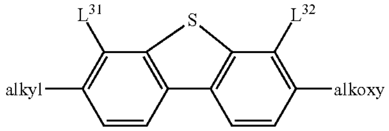

III-1-3

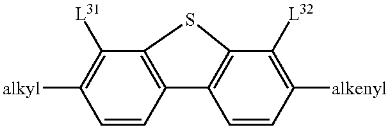

III-1-4

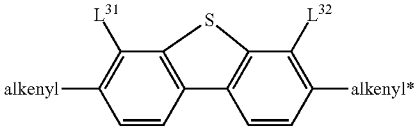

III-1-5

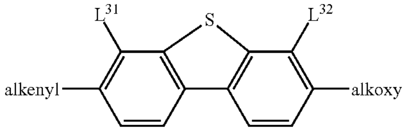

III-1-6

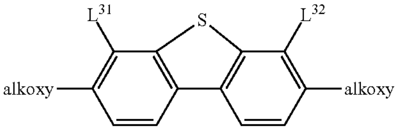

III-1-7

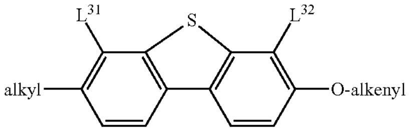

-continued

III-1-8

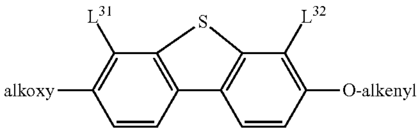

III-1-9

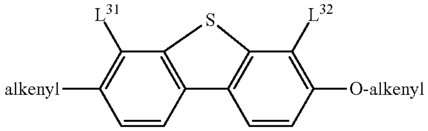

III-1-10

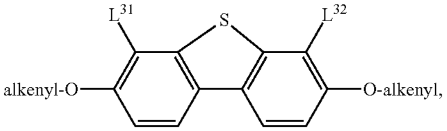

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{31}$ and $L^{32}$ each, independently of one another, denote F or Cl, preferably both F.

In a preferred embodiment, the medium according to the invention additionally comprises one or more compounds of the formula IIIA

IIIA

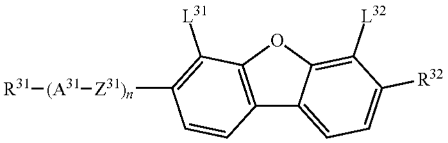

in which the occurring groups and the parameter n have the meanings defined above for formula III.

Preferably, the compounds of the formula IIIA are selected from the group of compounds of the formulae IIIA-1 to IIIA-10, preferably of formula IIIA-6,

IIIA-1-1

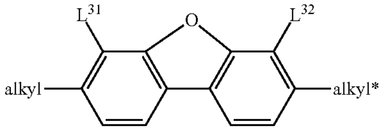

IIIA-2

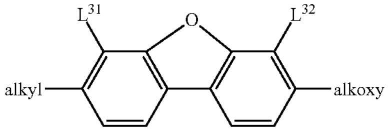

IIIA-3

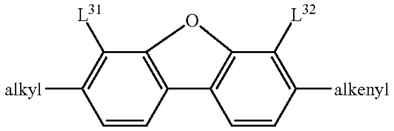

-continued

IIIA-4

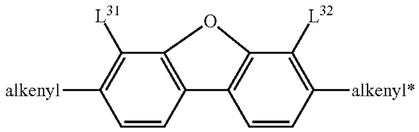

IIIA-5

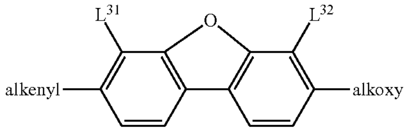

IIIA-6

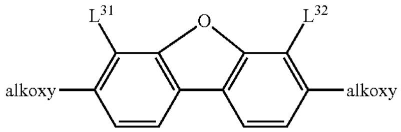

IIIA-7

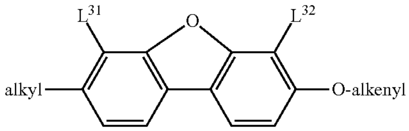

IIIA-8

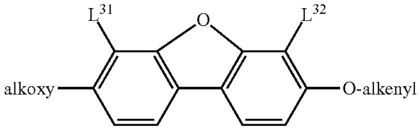

IIIA-9

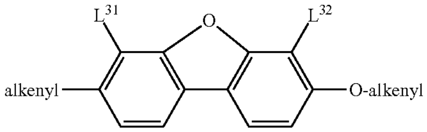

IIIA-10

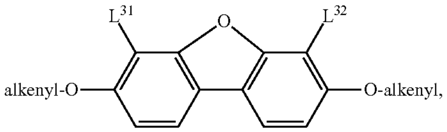

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{31}$ and $L^{32}$ each, independently of one another, denote F or Cl, preferably both F.

Optionally the medium comprises one or more compounds of the formula IIIB-1 and/or IIIB-2

IIIB-1

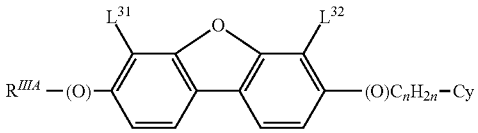

-continued

IIIB-2

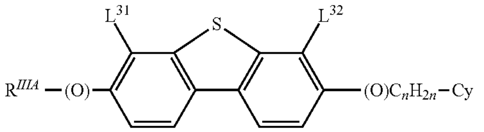

in which $L^{31}$ and $L^{32}$ have the same meanings as given under formula III, (O) denotes O or a single bond, $R^{IIIA}$ denotes alkyl or alkenyl having up to 7 C atoms or a group Cy-$C_mH_{2m+1}$—, m and n are, identically or differently, 0, 1, 2, 3, 4, 5 or 6, preferably 1, 2 or 3, very preferably 1, Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula IIIB-1 and/or IIIB-2 are contained in the medium either alternatively or in addition to the compounds of formula III, preferably additionally.

Very preferred compounds of the formulae IIIB-1 and IIIB-2 are the following:

IIIB-1-1

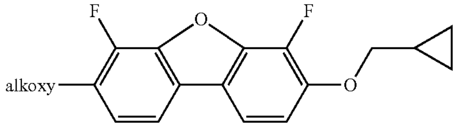

IIIB-1-2

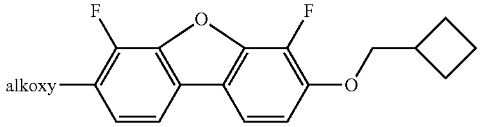

IIIB-1-3

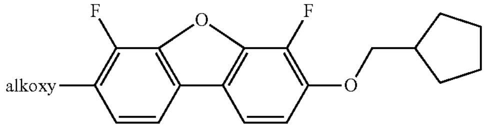

IIIB-2-1

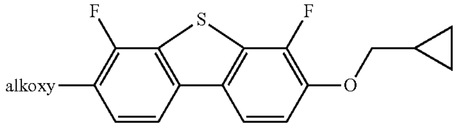

IIIB-2-2

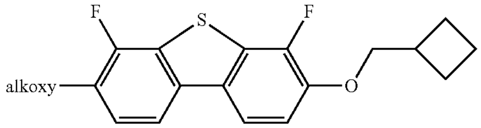

IIIB-2-3

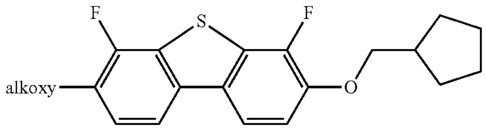

in which alkoxy denotes a straight-chain alkoxy radical having 1-6 C atoms or alternatively —($CH_2$), F in which n is 2,3,4, or 5, preferably $C_2H_4F$.

In a preferred embodiment of the present invention, the medium comprises one or more compounds of formula III-2

III-2

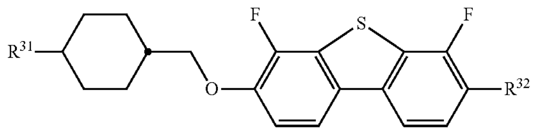

in which $R^{31}$, $R^{32}$ identically or differently, denote H, an alkyl or alkoxy radical having 1 to 15 C atoms, in which one or more $CH_2$ groups in these radicals are optionally replaced, independently of one another, by —C≡C—, —$CF_2O$—, —$OCF_2$—, —CH═CH—,

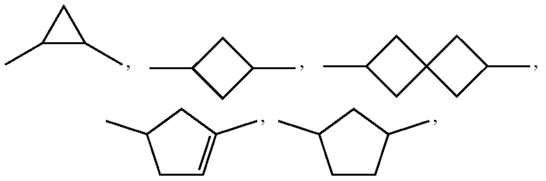

—O—, —CO—O— or —O—CO— in such a way that O atoms are not linked directly to one another, and in which, in addition, one or more H atoms may be replaced by halogen.

The compounds of formula III-2 are preferably selected from the group of compounds of the formulae Ill-2-1 to Ill-2-10:

III-2-1

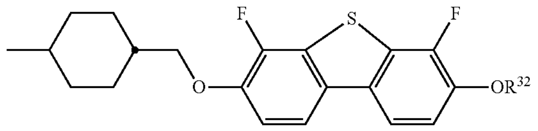

III-2-2

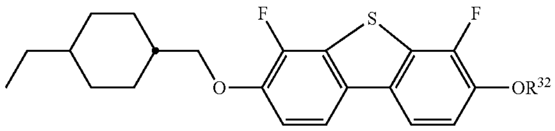

III-2-3

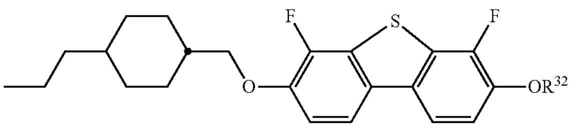

III-2-4

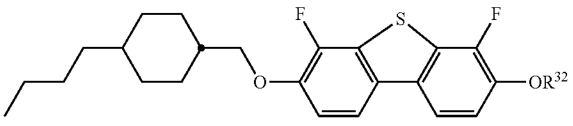

III-2-5

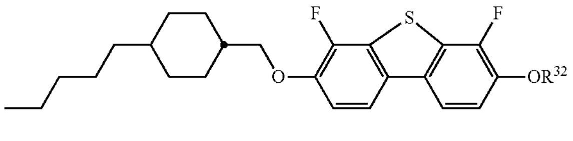

-continued

III-2-6

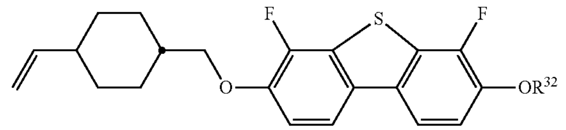

III-2-7

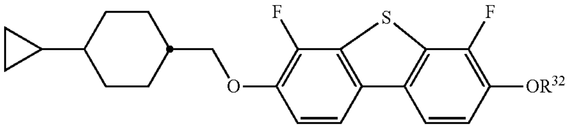

III-2-8

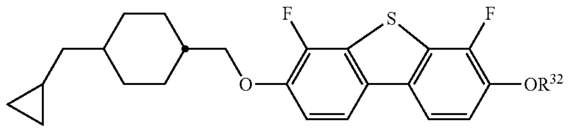

III-2-9

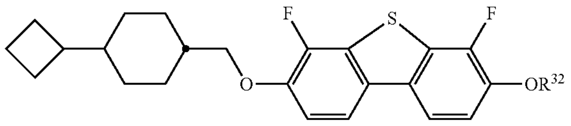

III-2-10

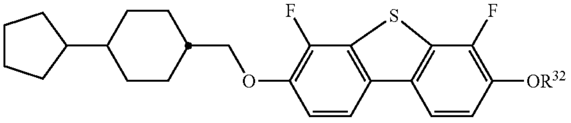

in which $R^{32}$ denotes alkyl having 1 to 7 C-atoms, preferably ethyl, n-propyl or n-butyl, or alternatively cyclopropylmethyl, cyclobutylmethyl or cyclopentylmethyl or alternatively —$(CH_2)_n$F in which n is 2,3,4, or 5, preferably $C_2H_4F$.

In a preferred embodiment of the present invention, the medium comprises one or more compounds of the formulae III-3 to III-5, preferably of formula III-4,

III-3

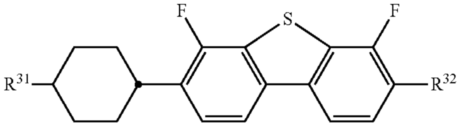

III-4

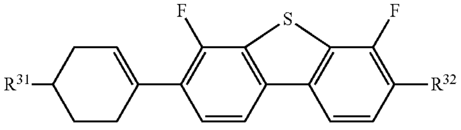

III-5

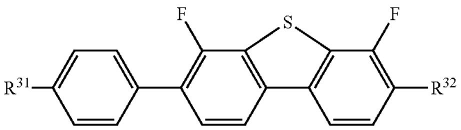

in which the parameters have the meanings given above, $R^{31}$ preferably denotes straight-chain alkyl having 1 to 7 C atoms and $R^{32}$ preferably denotes alkoxy having 1 to 7 C atoms.

In a preferred embodiment the media according to the invention comprise one or more compounds of the formula III selected from the group of compounds of formulae III-6 to III-8, preferably of formula III-7,

III-6

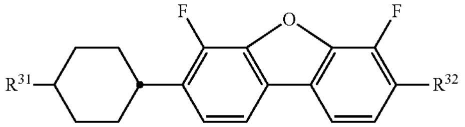

III-7

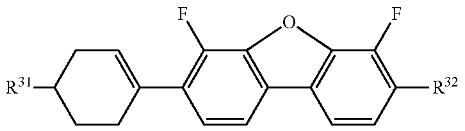

III-8

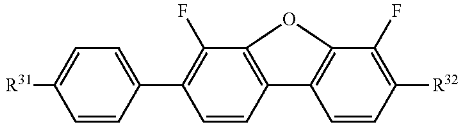

in which the parameters have the meanings given above, $R^{31}$ preferably denotes straight-chain alkyl having 1 to 7 C atoms and $R^{32}$ preferably denotes alkoxy having 1 to 7 C atoms.

In a preferred embodiment, the medium comprises one or more compounds of the formula IV,

IV

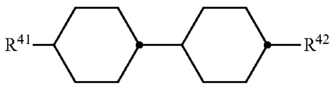

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

IV-1

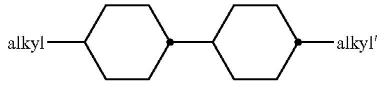

IV-2

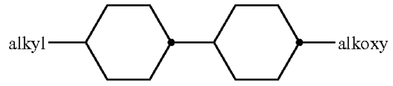

IV-3

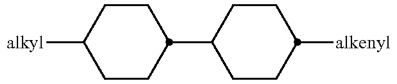

-continued

IV-4

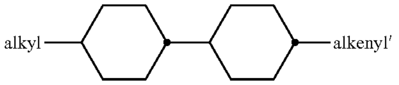

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

The compounds of the formula IV are preferably selected from the compounds of the formulae IV-1-1 to IV-1-4:

IV-1-1

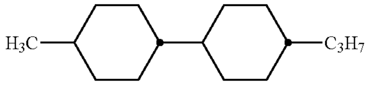

IV-1-2

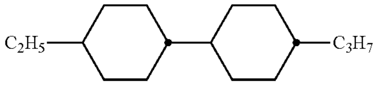

IV-1-3

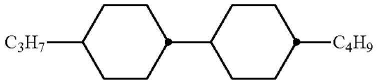

IV-1-4

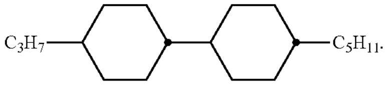

The compounds of the formula IV-2 are preferably selected from the compounds of the formulae IV-2-1 and/or IV-2-2

IV-2-1

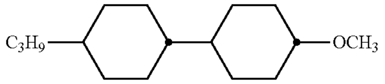

IV-1-2

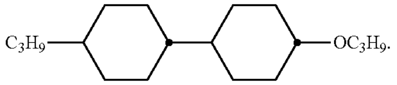

The compounds of the formula IV-3 are preferably selected from the compounds of the formulae IV-3-1 to IV-3-9

IV-3-1

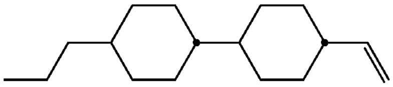

-continued

IV-3-2

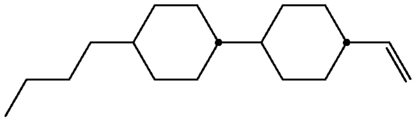

IV-3-3

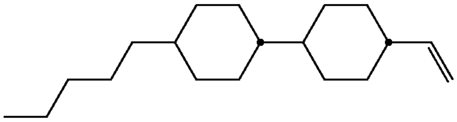

IV-3-4

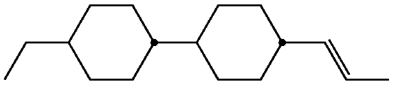

IV-3-5

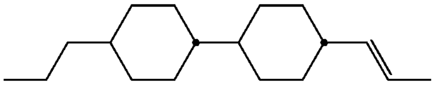

IV-3-6

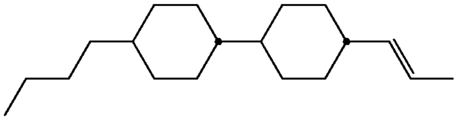

IV-3-7

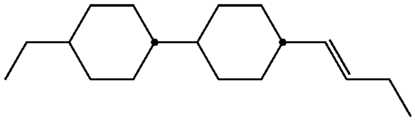

IV-3-8

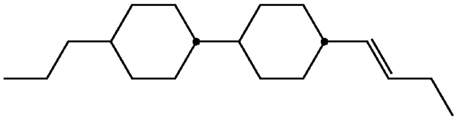

IV-3-9

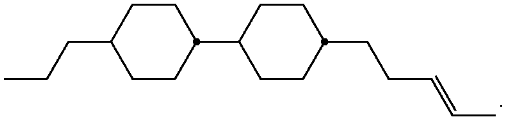

The compounds of the formula IV-4 are preferably selected from the compounds of the formulae IV-4-1 to IV-4-3, in particular of the formula IV-4-3

IV-4-1

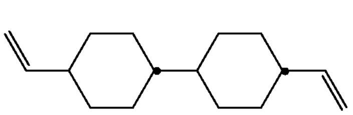

IV-4-2

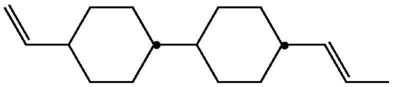

IV-4-3

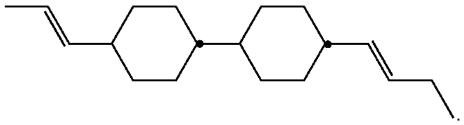

The liquid-crystalline medium according to the invention preferably comprises one or more compounds of the formula IVa, IVa

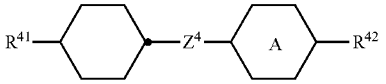

in which $R^{41}$ and $R^{42}$ each, independently of one another, denote a straight-chain alkyl, alkoxy, alkenyl, alkoxyalkyl or alkenyloxy radical having up to 12 C atoms, and

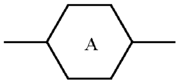

denotes

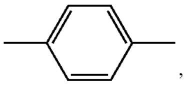
,
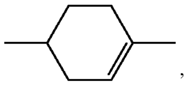
,
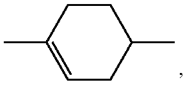
,
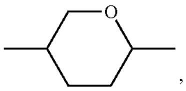
, or
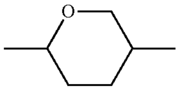
, $Z^4$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$—, —CF═CF—.

Preferred compounds of the formula IVa are indicated below:

IVa-1

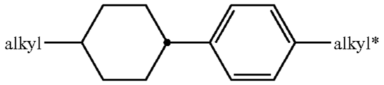

IVa-2

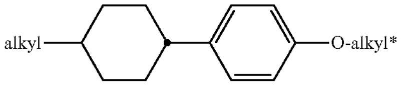

IVa-3

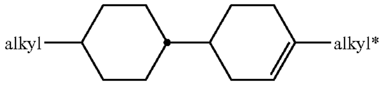

IVa-4

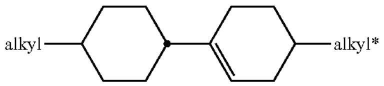

in which alkyl and alkyl* each, independently of one another, denote a straight-chain alkyl radical having 1 to 6 C atoms.

The medium according to the invention preferably comprises at least one compound of the formula IVa-1 and/or formula IVa-2, very preferably of formula IVa-2, in particular the compounds IVa-2 in which alkyl denotes n-propyl and alkyl* denotes methyl.

The proportion of compounds of the formula IVa in the mixture as a whole is preferably less than 5% by weight, very preferably less than 2% by weight.

Preferably, the medium comprises one or more compounds of formula IVb-1 to IVb-3

IVb-1

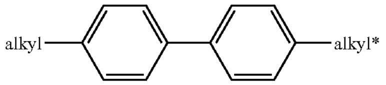

IVb-2

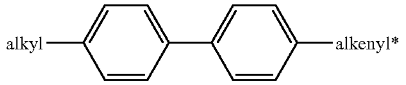

IVb-3

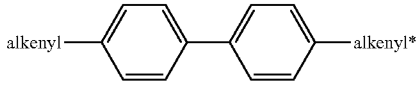

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

The proportion of the compounds of the formulae IV-1 to IV-3 in the mixture as a whole is preferably less than 3% by weight, in particular less than 2% by weight.

Of the compounds of the formulae IVb-1 to IVb-3, the compounds of the formula IVb-2 are particularly preferred.

Very particularly preferred biphenyls are

IVb-1-1

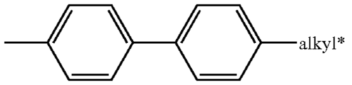

IVb-2-1

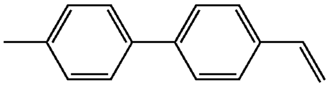

IVb-2-2

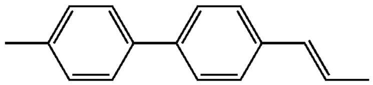

IVb-2-3

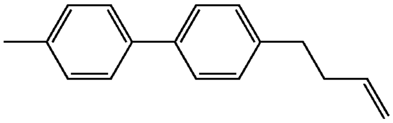

IVb-2-4

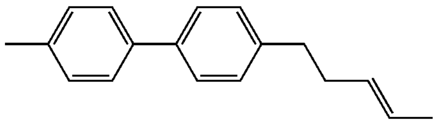

in which alkyl* denotes an alkyl radical having 1 to 6 C atoms and preferably denotes n-propyl or n-butyl. The medium according to the invention particularly preferably comprises one or more compounds of the formulae IVb-1-1 and/or IVb-2-4.

In a preferred embodiment, the medium according to the invention comprises one or more compounds of formula V

V

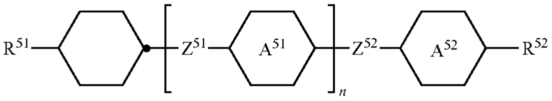

in which $R^{51}$, $R^{52}$ denote alkyl having 1 to 7 C atoms, alkoxy having 1 to 7 C atoms, or alkoxyalkyl, alkenyl or alkenyloxy having 2 to 7 C atoms,

and
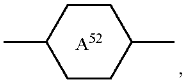
, identically or differently, denote

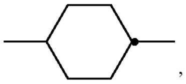
,
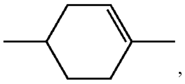
,
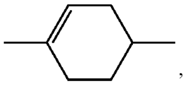
,
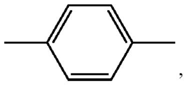
,
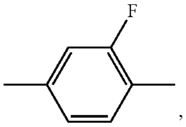
, or
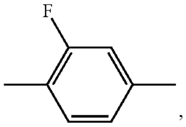
, $Z^{51}$, $Z^{52}$ each, independently of one another, denote $-CH_2-CH_2-$, $-CH_2-O-$, $-CH{=}CH-$, $-C{\equiv}C-$, $-COO-$ or a single bond, and n is 1 or 2, and where the compounds of the formula I are excluded.

The compounds of formula V are preferably selected from the compounds of the formulae V-1 to V-16:

V-1

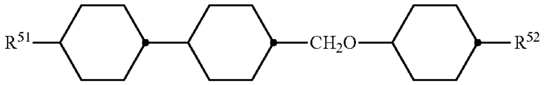

V-2

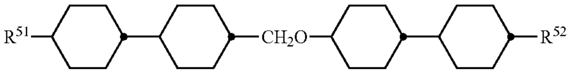

V-3

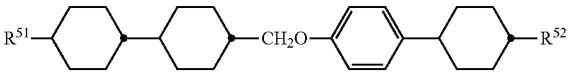

V-4

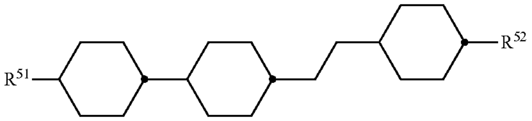

-continued

V-5

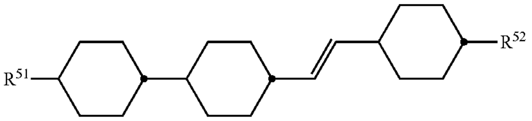

V-6

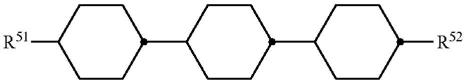

V-7

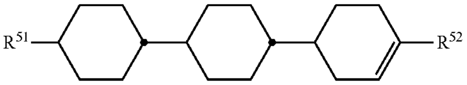

V-8

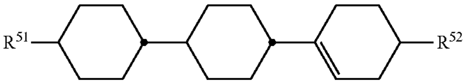

V-9

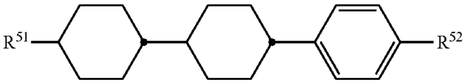

V-10

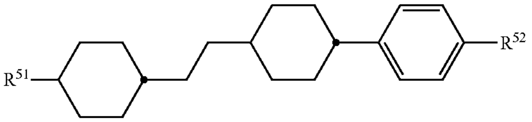

V-11

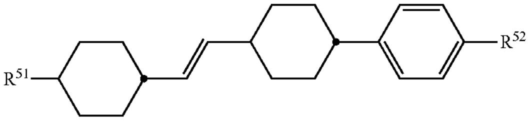

V-12

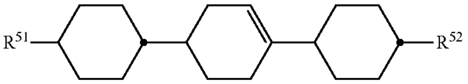

V-13

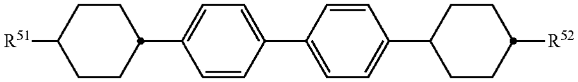

V-14

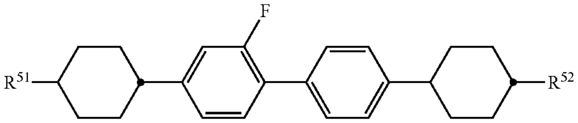

V-15

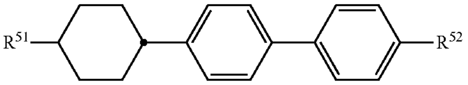

in which $R^{51}$ and $R^{52}$ have the meanings indicated for formula V above.

$R^{51}$ and $R^{52}$ preferably each, independently of one another, denote straight-chain alkyl having 1 to 7 C atoms or alkenyl having 2 to 7 C atoms.

Preferred media comprise one or more compounds of the formulae V-1, V-3, V-5, V-6, V-9, V-10, V-11, V-13, V-14, and/or V-15, in particular V-9.

In a preferred embodiment of the present invention the medium additionally comprises one or more compounds of formula VI

VI

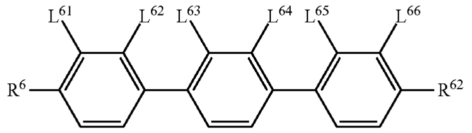

in which $R^6$ and $R^{62}$ have the meanings of $R^{2A}$ as defined herein and $R^{62}$ alternatively denotes F, Cl, $CF_3$ or $OCF_3$, preferably F, and $L^{61}$, $L^{62}$, $L^{63}$, $L^{64}$, $L^{65}$, and $L^{66}$ independently denote H or F, where at least one of $L^{61}$, $L^{62}$, $L^{63}$, $L^{64}$, $L^{65}$, and $L^{66}$ denotes F.

The compounds of formula VI are preferably selected from the formulae VI-1 to VI-21, in particular from the formula VI-4:

VI-1

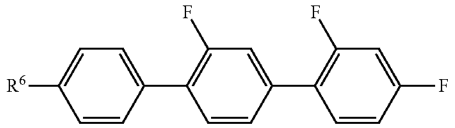

VI-2

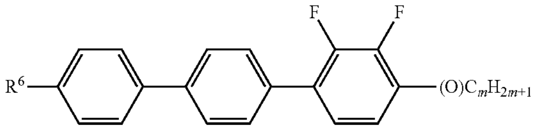

VI-3

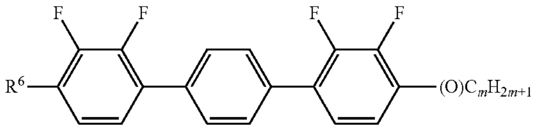

VI-4

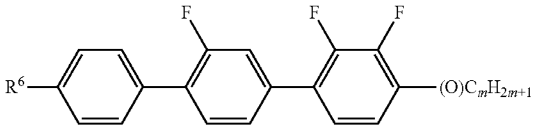

VI-5

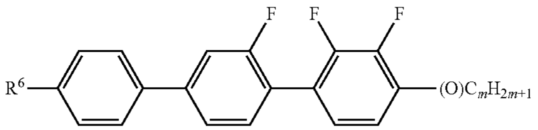

VI-6

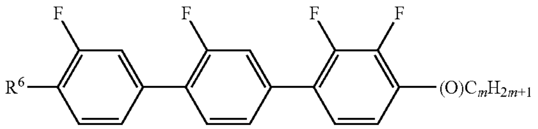

VI-7

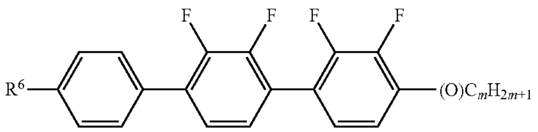

-continued

VI-8

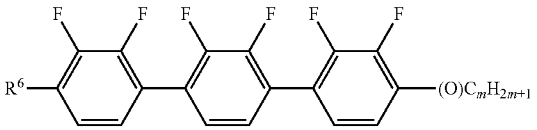

VI-9

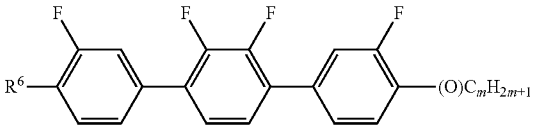

VI-10

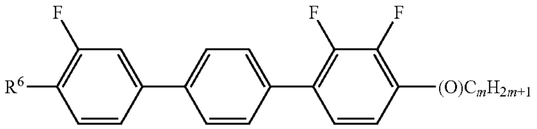

VI-11

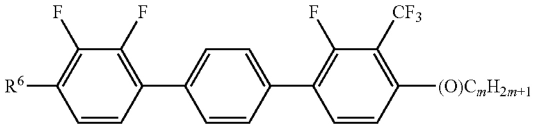

VI-12

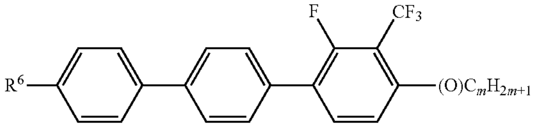

VI-13

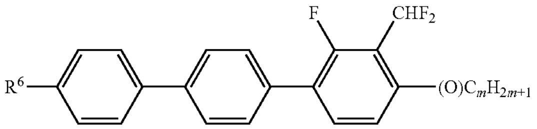

VI-14

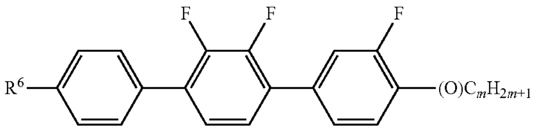

VI-15

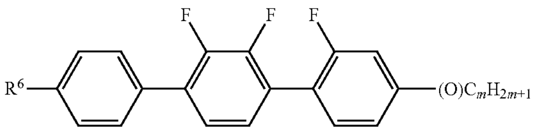

VI-16

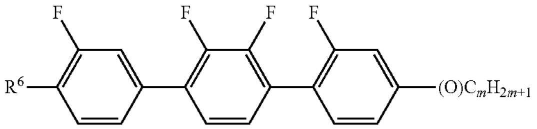

VI-17

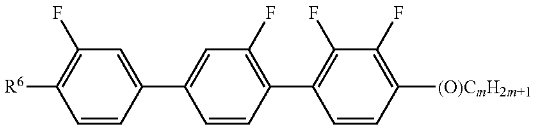

-continued

VI-18

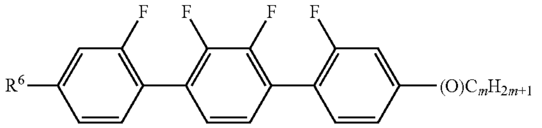

VI-19

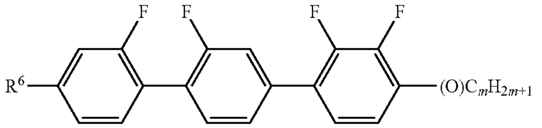

VI-20

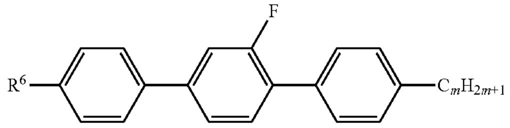

VI-21

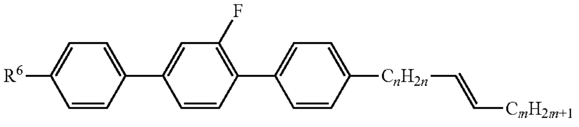

in which $R^6$ denotes a straight-chain alkyl or alkoxy radical having 1 to 6 C atoms, (O) denotes —O— or a single bond, and m is 0, 1, 2, 3, 4, 5 or 6 and n is 0, 1, 2, 3 or 4. $R^6$ preferably denotes methyl, ethyl, propyl, butyl, pentyl, hexyl, methoxy, ethoxy, propoxy, butoxy or pentoxy.

Particular preference is given to compounds of the formulae VI-1, VI-2, VI-4, VI-20 and VI-21.

Very preferably, the medium according to the invention comprises the compound of formula IV-4, in particular the compounds of the formula IV-4-1:

VI-4-1

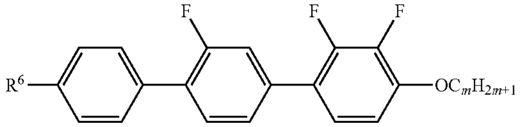

in which $R^6$ and m have the meanings defined above and preferably $R^6$ denotes methyl, ethyl, n-propyl, n-butyl, or n-pentyl, and m is 2, 3 or 4.

In a preferred embodiment of the present invention the medium additionally comprises one or more compounds of the formulae VII-1 to VII-9

VII-1

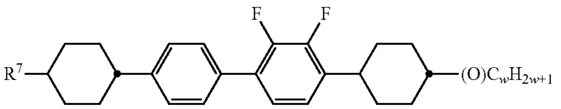

VII-2

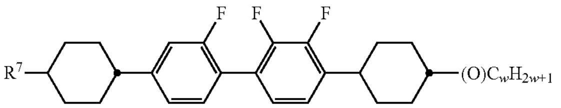

-continued

VII-3

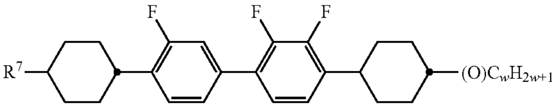

VII-4

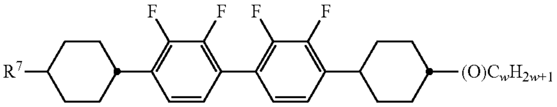

VII-5

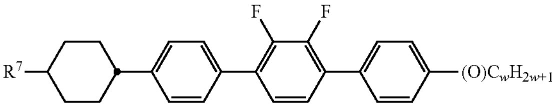

VII-6

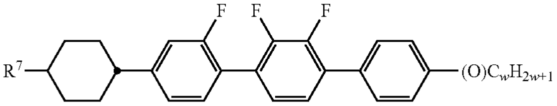

VII-7

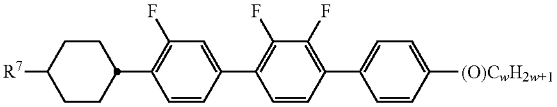

VII-8

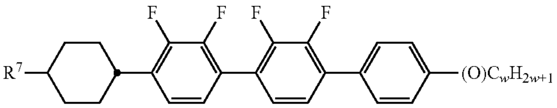

VII-9

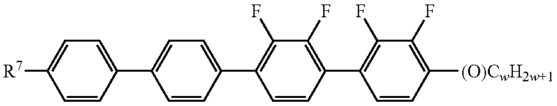

in which $R^7$ denotes a straight-chain alkyl or alkoxy radical having 1 to 6 C atoms, or a straight chain alkenyl radical having 2 to 6 C atoms, and w is an integer from 1 to 6.

Particular preference is given to mixtures comprising at least one compound of the formula VII-9.

Further preferred embodiments are listed below:

a) Liquid-crystalline medium comprising at least one compound of the formulae Z-1 to Z-7,

Z-1

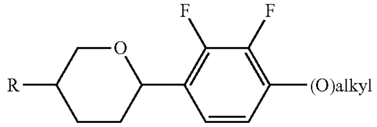

Z-2

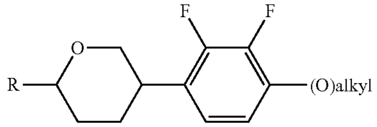

-continued

Z-3

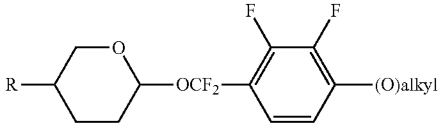

Z-4

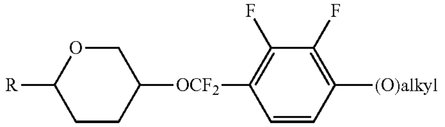

Z-5

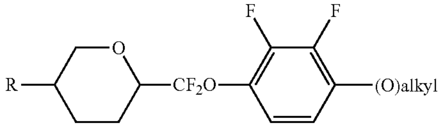

Z-6

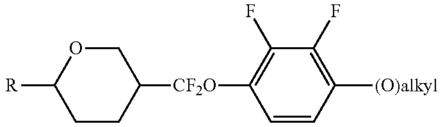

Z-7

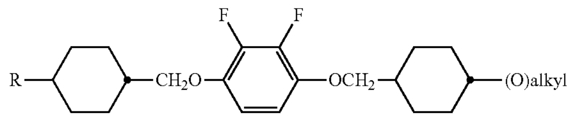

in which R and alkyl have the meanings indicated above for formula III.

b) Preferred liquid-crystalline media according to the invention comprise one or more substances which contain a tetrahydronaphthyl or naphthyl unit, such as, for example, the compounds of the formulae N-1 to N-5,

N-1

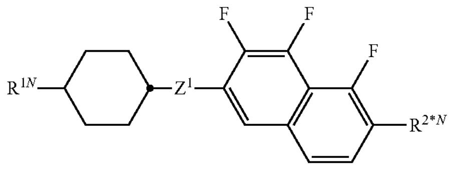

N-2

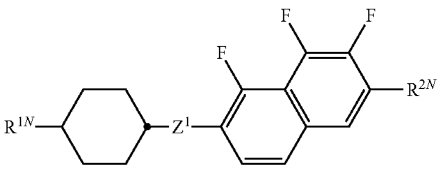

N-3

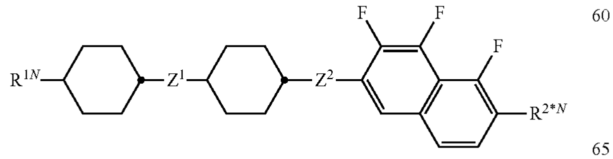

-continued

N-4

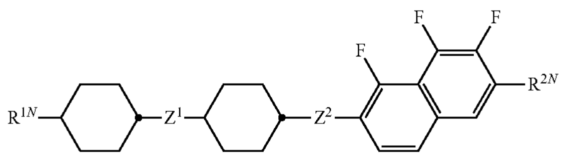

N-5

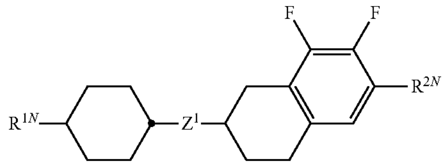

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote $-C_2H_4-$, $-CH=CH-$, $-(CH_2)_4-$, $-(CH_2)_3O-$, $-O(CH_2)_3-$, $-CH=CHCH_2CH_2-$, $-CH_2CH_2CH=CH-$, $-CH_2O-$, $-OCH_2-$, $-COO-$, $-OCO-$, $-C_2F_4-$, $-CF=CF-$, $-CF=CH-$, $-CH=CF-$, $-CF_2O-$, $-OCF_2-$, $-CH_2-$ or a single bond.

c) Preferred mixtures comprise one or more compounds selected from the group of the difluorodibenzochroman compounds of the formula BC, chromans of the formula CR, and fluorinated phenanthrenes of the formulae PH-1 and PH-2,

BC

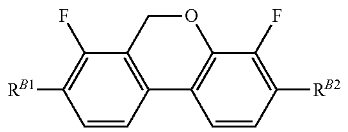

CR

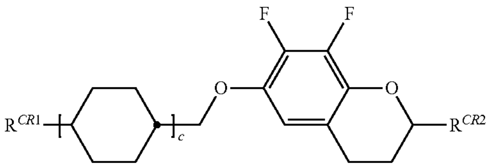

PH-1

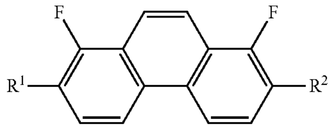

PH-2

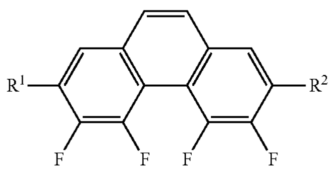

in which $R^{B}1$, $R^{B2}$, $R^{CR1}$, $R^{CR2}$, $R^1$, $R^2$ each, independently of one another, have the meaning of $R^{2A}$. c is 0, 1 or 2. $R^1$ and $R^2$ preferably, independently of one another, denote alkyl or alkoxy having 1 to 6 C atoms.

Particularly preferred compounds of the formulae BC and CR are the compounds BC-1 to BC-7 and CR-1 to CR-5,

BC-1

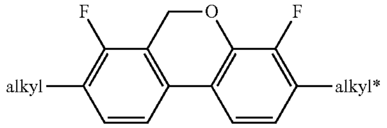

BC-2

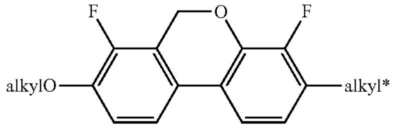

BC-3

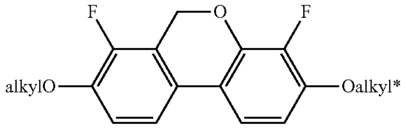

BC-4

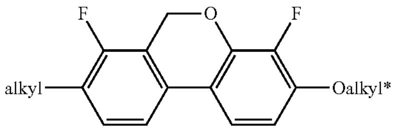

BC-5

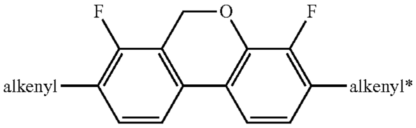

BC-6

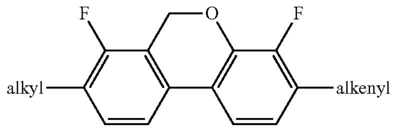

BC-7

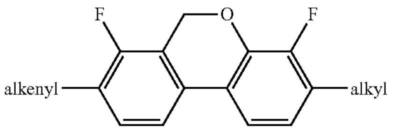

CR-1

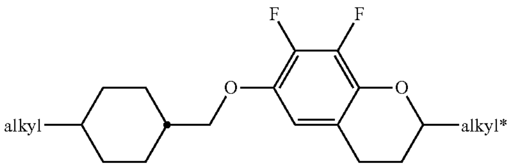

CR-2

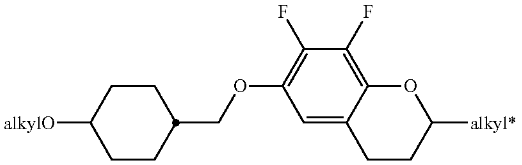

CR-3

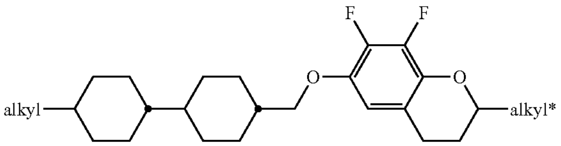

-continued

CR-4

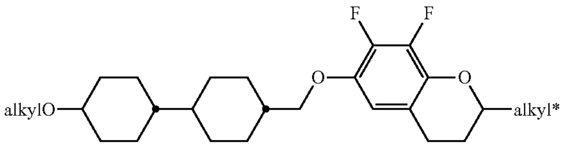

CR-5

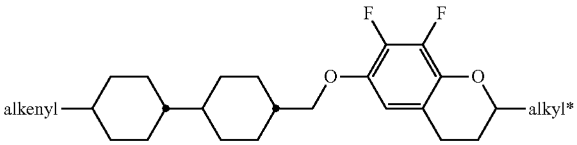

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Very particular preference is given to mixtures comprising one, two or three compounds of the formula BC-2, BF-1 and/or BF-2.

d) Preferred mixtures comprise one or more indane compounds of the formula In,

In

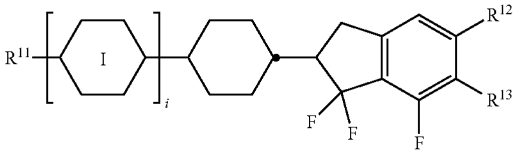

in which $R^{11}$, $R^{12}$, and $R^{13}$ each, independently of one another, denote a straight-chain alkyl, alkoxy, alkoxyalkyl or alkenyl radical having 1 to 6 C atoms, $R^{12}$ and $R^{13}$ alternatively denote halogen, preferably F,

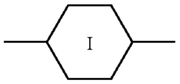

denotes

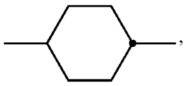, 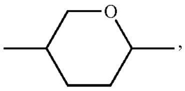,

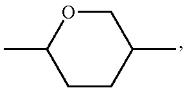, 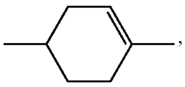,

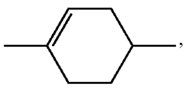, 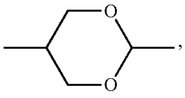,

-continued
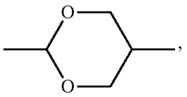
,
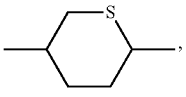
,
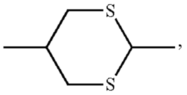
,
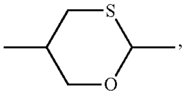
,
i denotes 0, 1 or 2.
Preferred compounds of the formula In are the compounds of the formulae In-1 to In-16 indicated below:
In-1
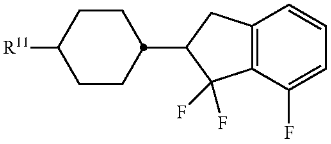
In-2
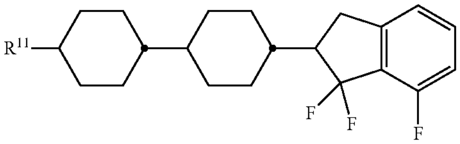
In-3
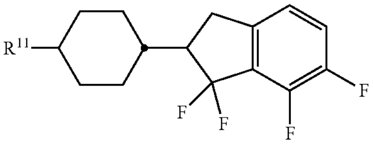
In-4
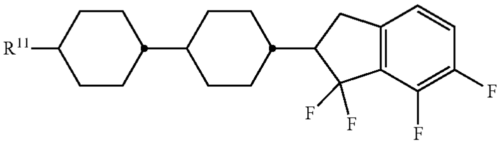
In-5
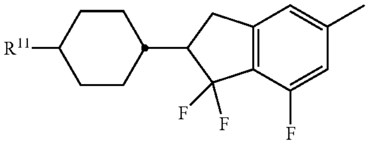
In-6
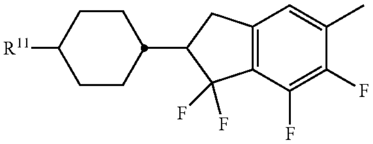
In-7
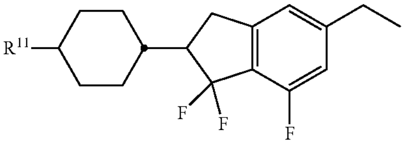
In-8
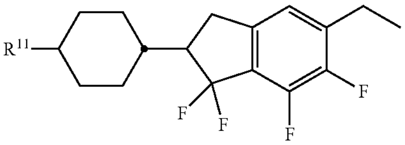
-continued
In-9
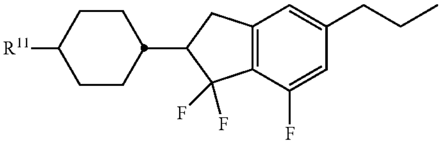
In-10
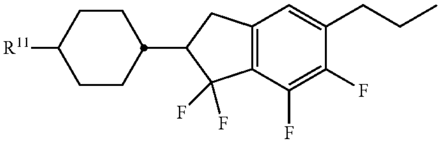
In-11
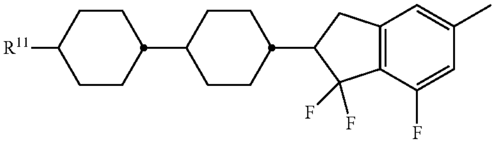
In-12
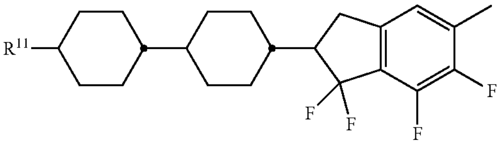
In-13
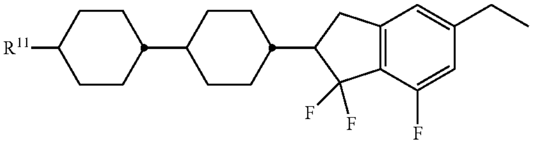
In-14
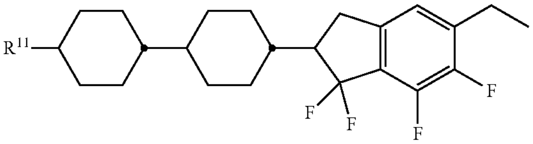
In-15
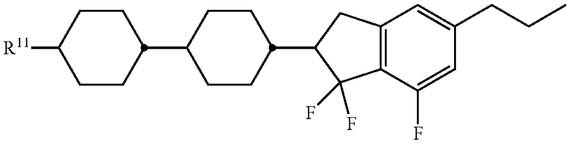
In-16
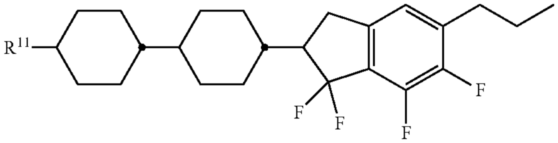
.
Particular preference is given to the compounds of the formulae In-1, In-2, In-3 and In-4.
e) Preferred mixtures additionally comprise one or more compounds of the formulae L-1 to L-11,

L-1

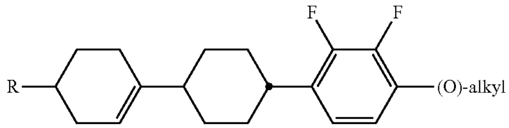

L-2

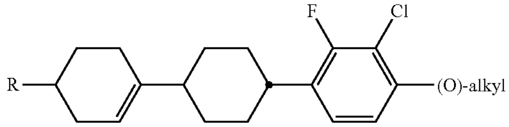

L-3

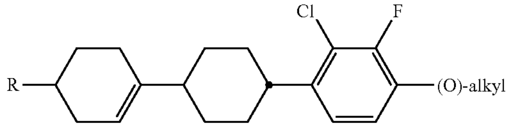

L-4

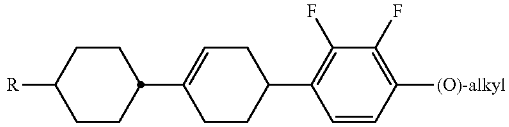

L-5

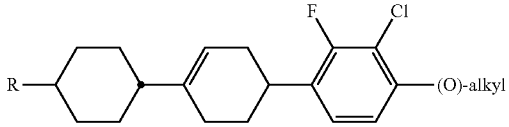

L-6

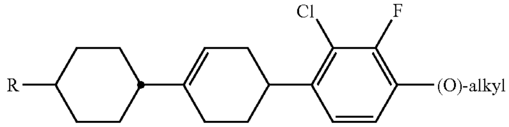

L-7

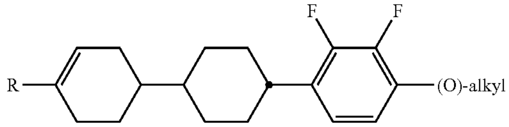

L-8

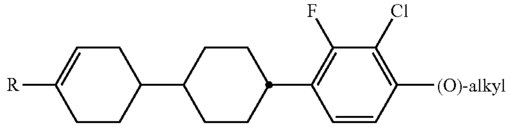

L-9

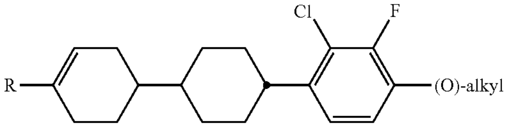

L-10

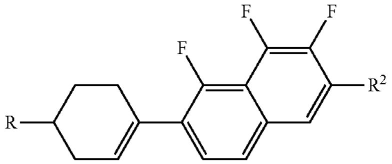

-continued

L-11

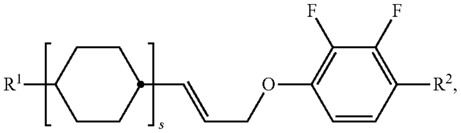

in which

R, $R^1$ and $R^2$ each, independently of one another, have the meanings indicated for $R^{2A}$ in formula IIA above, and alkyl denotes an alkyl radical having 1 to 6 C atoms. The parameter s denotes 1 or 2.

The compounds of the formulae L-1 to L-9 are preferably employed in concentrations of 5 to 15% by weight, in particular 5 to 12% by weight and very particularly preferably 8 to 10% by weight.

f) Preferred mixtures additionally comprise one or more compounds of formula IIA-Y

IIA-Y

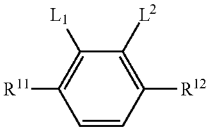

in which $R^{11}$ and $R^{12}$ have one of the meanings given for $R^{2A}$ in formula IIA above, and $L^1$ and $L^2$, identically or differently, denote F or Cl.

Preferred compounds of the formula IIA-Y are selected from the group consisting of the following sub-formulae

IIA-Y1

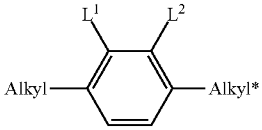

IIA-Y2

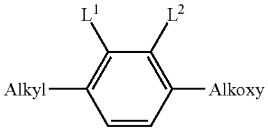

IIA-Y3

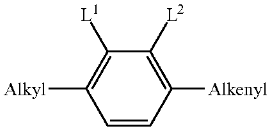

IIA-Y4

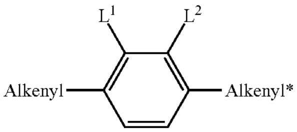

IIA-Y5

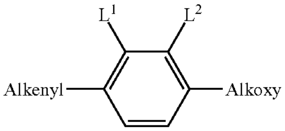

-continued

IIA-Y6

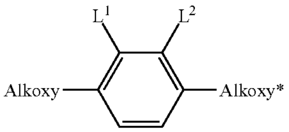

IIA-Y7

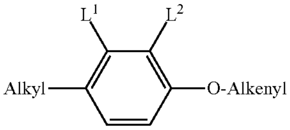

IIA-Y8

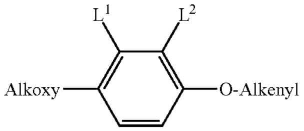

IIA-Y9

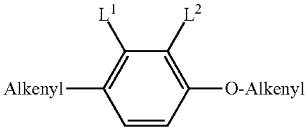

IIA-Y10

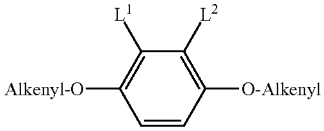

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred compounds of the formula IIA-Y are selected from the group consisting of following sub-formulae:

IIA-Y6a

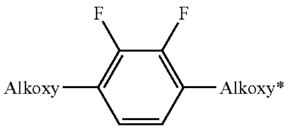

IIA-Y6b

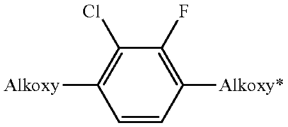

in which Alkoxy and Alkoxy* have the meanings defined above and preferably denote methoxy, ethoxy, n-propyloxy, n-butyloxy or n-pentyloxy.

Preferably, the medium according to the invention comprises one or more compounds of the formula H

H

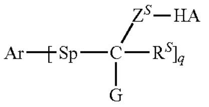

in which

Ar denotes an aromatic or heteroaromatic hydrocarbon group having 4 to 40 C atoms, preferably 6 to 30 C atoms;

Sp denotes a spacer group;

$R^S$ denotes H, alkyl having 1 to 12 C atoms or alkenyl having 2 to 12 C atoms;

$Z^S$ denotes —O—, —C(O)O—, $—(CH_2)_z—$ or $—(CH_2)_zO—$, or a single bond;

HA denotes

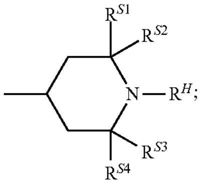

$R^H$ denotes H, O, $CH_3$, OH or $OR^S$, preferably H or O";

$R^{S1}$, $R^{S2}$, $R^{S3}$ and $R^{S4}$, identically or differently, denote alkyl having 1 to 6 C atoms, preferably having 1 to 3 C atoms, very preferably $CH_3$;

G denotes H or $R^S$ or a group $Z^S$—HA;

z is an integer from 1 to 6; and q is 3 or 4.

In formula H, aryl preferably denotes an aromatic or heteroaromatic hydrocarbon group having 4 to 40 C atoms, comprising one, two, three or four aromatic rings including condensed rings that may be linked directly or via an alkylene linking group having 1 to 12 C atoms, in which one or more H atoms are optionally replaced with alkyl or alkoxy having 1 to 6 C atoms or alkenyl having 2 to 6 C atoms, or with CN, $CF_3$ or halogen, and in which one or more $CH_2$ groups may each, independently of one another, be replaced by —O—, —S—, —NH—, —N($C_1$-$C_4$-alkyl)-, —CO—, —CO—O—, —O—CO—, —O—CO—O—, —CH=CH— or —C≡C— in such a way that O or S atoms are not linked directly to one another.

Preferred aryl groups are benzene, naphthalene, anthracene, biphenyl, m-terphenyl, p-terphenyl, and (phenylalkyl) benzene in which alkyl is straight chain alkyl having 1 to 12 C atoms.

The compounds of formula H are described in EP3354710 A1 and EP3354709 A1.

The compounds of formula H are preferably selected from the compounds of the formulae H-1, H-2 and H-3:

H-1
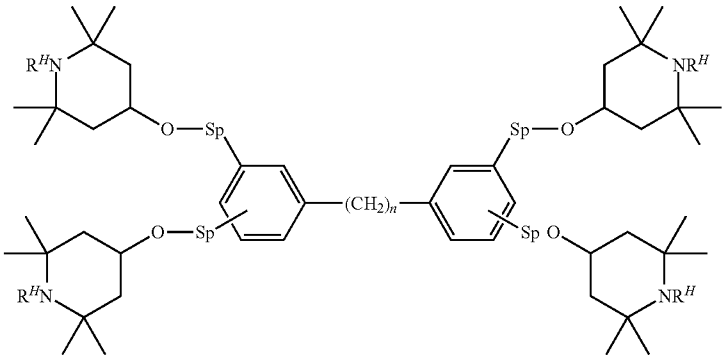
H-2
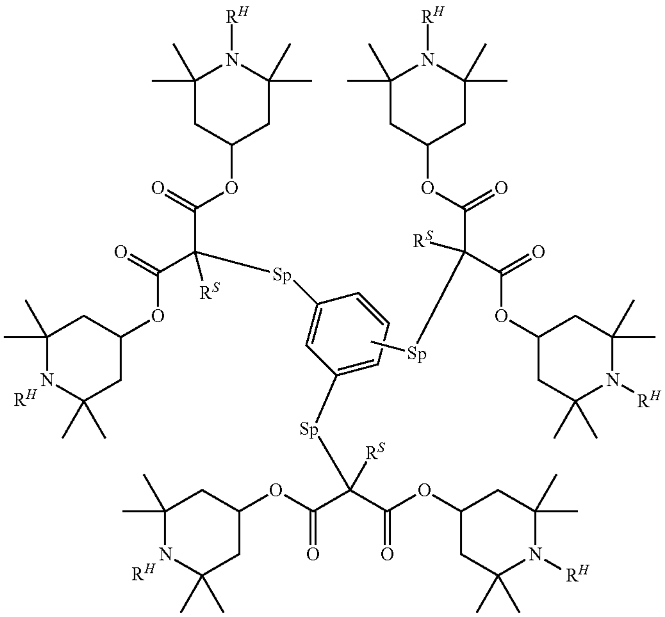
H-3
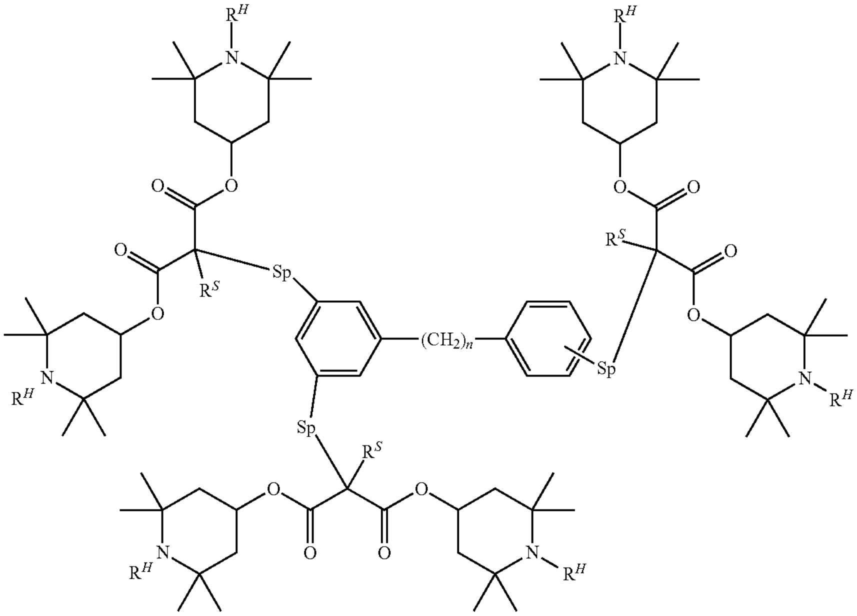

in which $R^H$ has the meanings given above and preferably denotes H or O", and n is an integer from 0 to 12, preferably 5, 6, 7, 8 or 9, very preferably 7, and Sp denotes a spacer group, preferably alkylene having 1 to 12 C atoms in which one or more non-adjacent $—CH_2—$ groups may be replaced with —O—.

Preferred compounds of formula H-1 are selected from the compounds of the formula H-1-1:

H-1-1

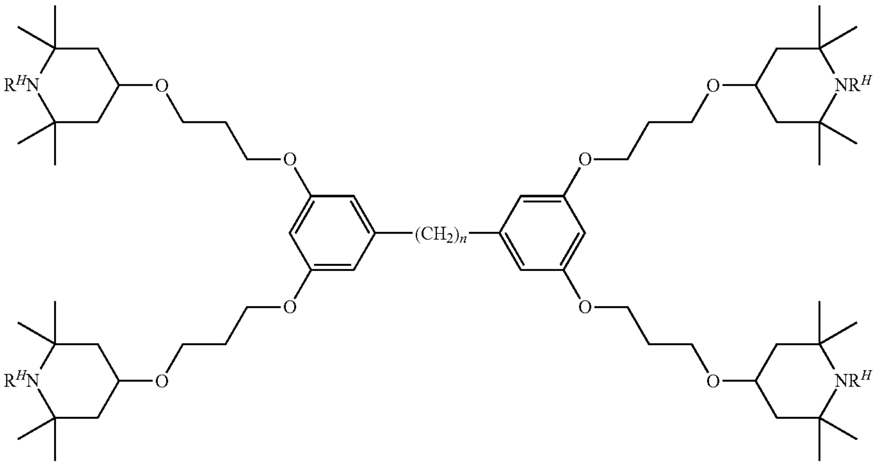

in which $R^H$ has the meanings given above and preferably denotes H or O", and n is an integer from 0 to 12, preferably 5, 6, 7, 8 or 9, very preferably 7.

Preferred compounds of formula H-2 are selected from the compounds of the formula H-2-1:

H-2-1

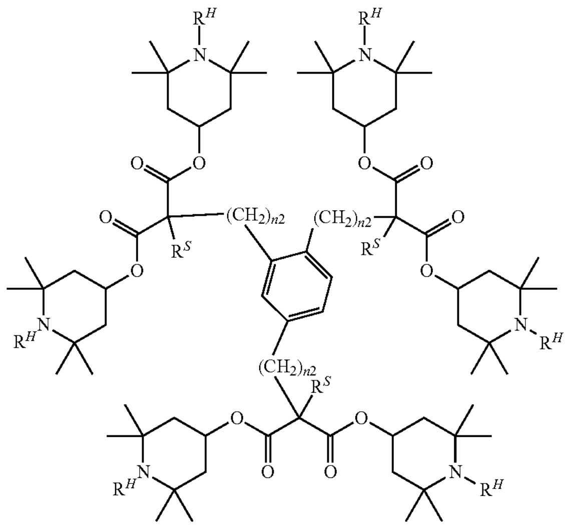

in which $R^H$ has the meanings given above and preferably denotes H or O", and n2, on each occurrence identically or differently, preferably identically, is an integer from 1 to 12, preferably 2, 3, 4, 5, or 6, very preferably 3, and $R^S$ on each occurrence identically or differently, preferably identically, denotes alkyl having 1 to 6 C atoms, preferably n-butyl.

Preferred compounds of formula H-3 are selected from the compounds of the formula H-3-1:

H-3-1

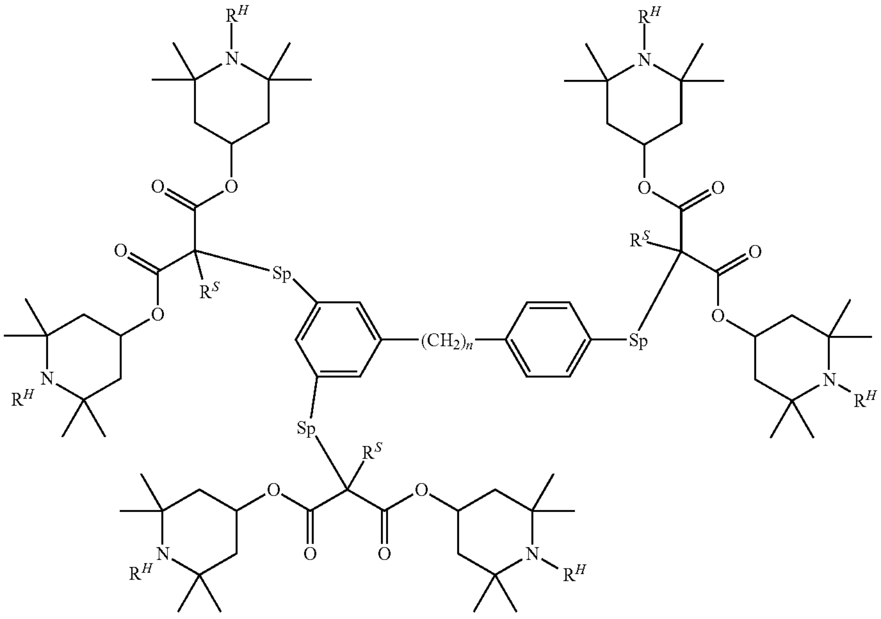

in which $R^H$ has the meanings given above and preferably denotes H or O', and n is an integer from 0 to 12, preferably 5, 6, 7, 8 or 9, very preferably 7.

Preferably, the medium according to the invention comprises a compound selected from the group of compounds of the formulae ST-1 to ST-18:

ST-1

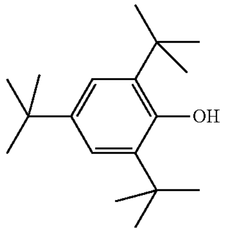

ST-2

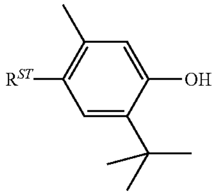

ST-3

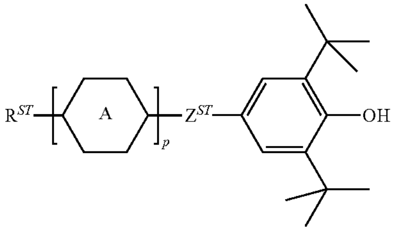

-continued

ST-4

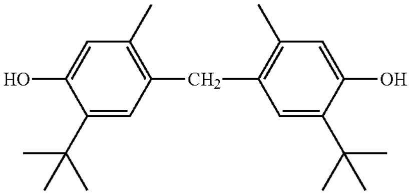

ST-5

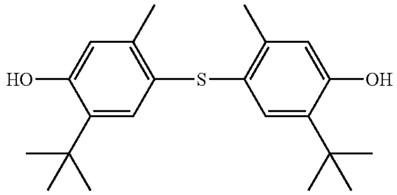

ST-6

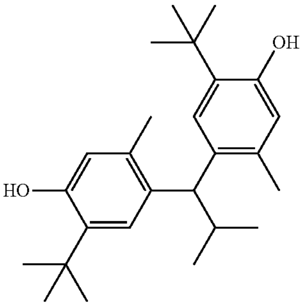

-continued
ST-7
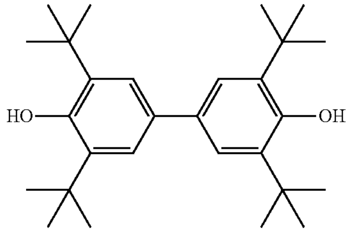
ST-8
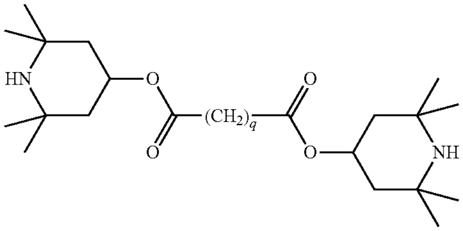
ST-9
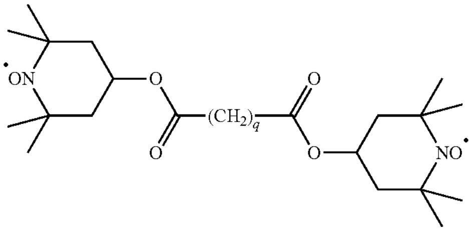
ST-10
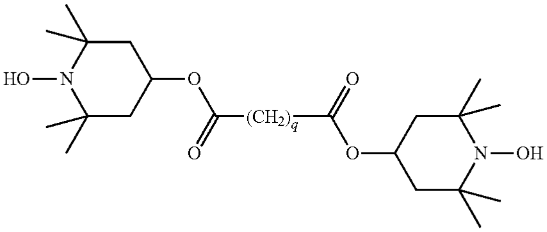
ST-11
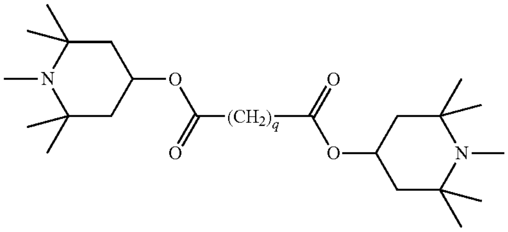
-continued
ST-12
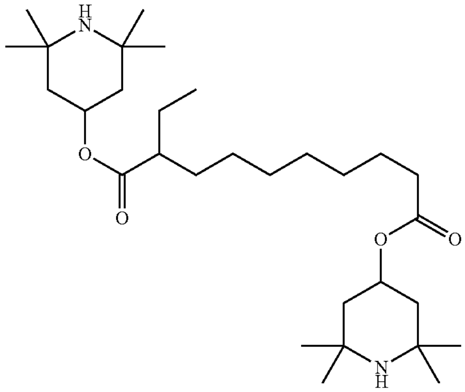
ST-13
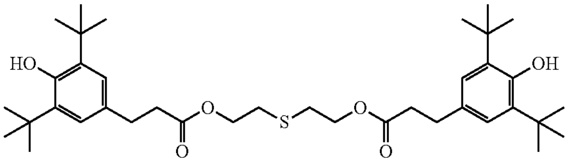
ST-14
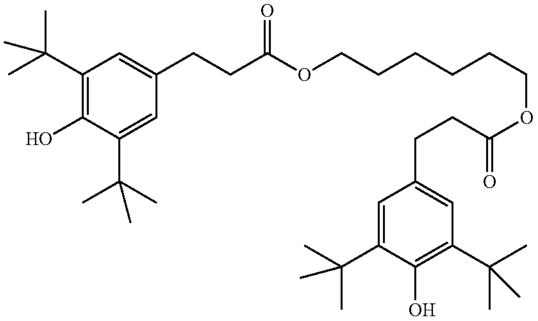
ST-15
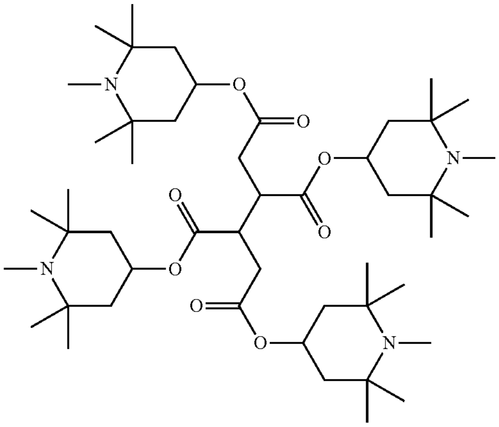
ST-16
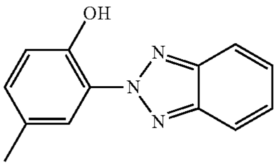

-continued

ST-17

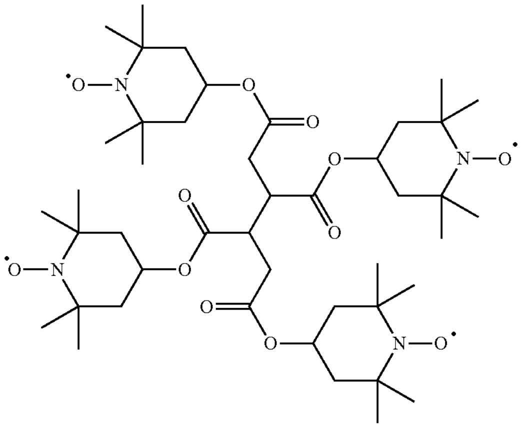

ST-18

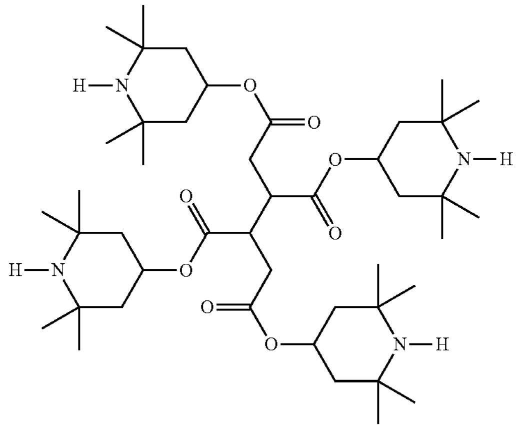

in which $R^{ST}$ denotes H, an alkyl or alkoxy radical having 1 to 15 C atoms, where, in addition, one or more $CH_2$ groups in these radicals may each be replaced, independently of one another by —C≡C—, —$CF_2O$—, —$OCF_2$—, —CH═CH—,

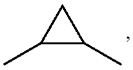, 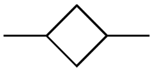, 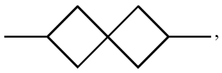,

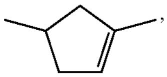, 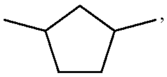,

—O—, —CO—O—, —O—CO— in such a way that O atoms are not linked directly to one another, and in which, in addition, one or more H atoms may be replaced by halogen,

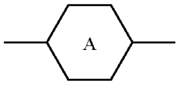, on each occurrence, identically or differently, denotes or

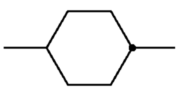 or 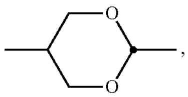, $Z^{ST}$ each, independently of one another, denote —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—, —$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^1$ and $L^2$ each, independently of one another, denote F, Cl, $CH_3$, $CF_3$ or $CHF_2$, p denotes 0, 1 or 2, q denotes 1, 2, 3, 4, 5, 6, 7, 8, 9 or 10.

Of the compounds of the formula ST, special preference is given to the compounds of the formulae ST-3 and in particular:

ST-1

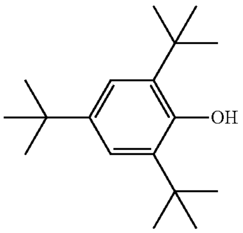

ST-3a

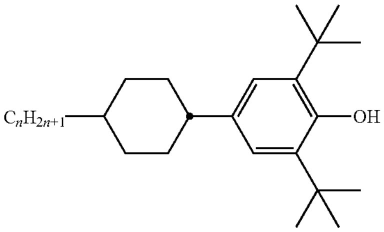

in which n=1, 2, 3, 4, 5, 6 or 7, preferably n=3

ST-3b

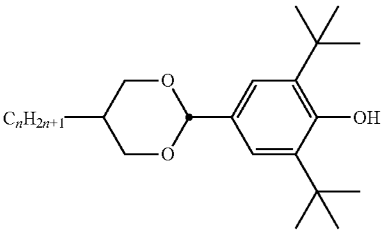

in which n=1, 2, 3, 4, 5, 6 or 7, preferably n=3

ST-3c

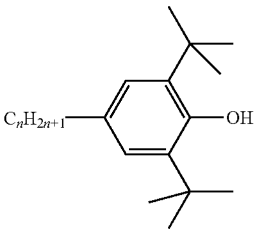

in which n=1, 2, 3, 4, 5, 6 or 7, preferably n=1 or 7

ST-8-1

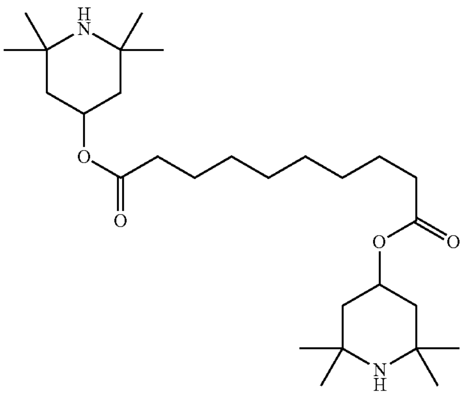

ST-9-1

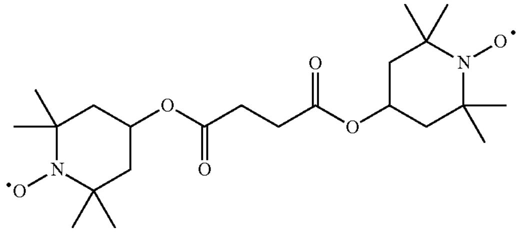

ST-12

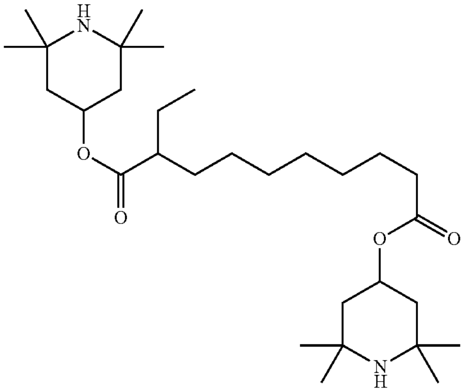

ST-16

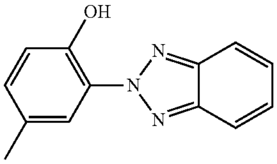

-continued

ST-17

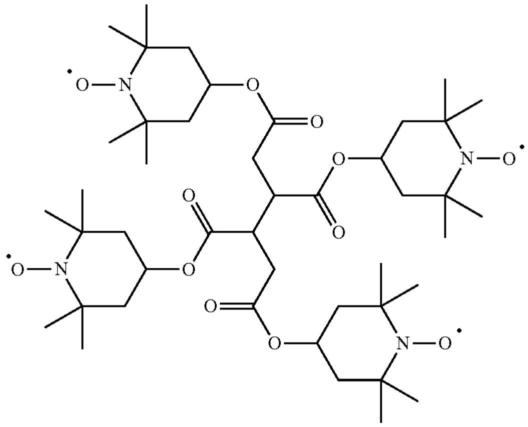

ST-18

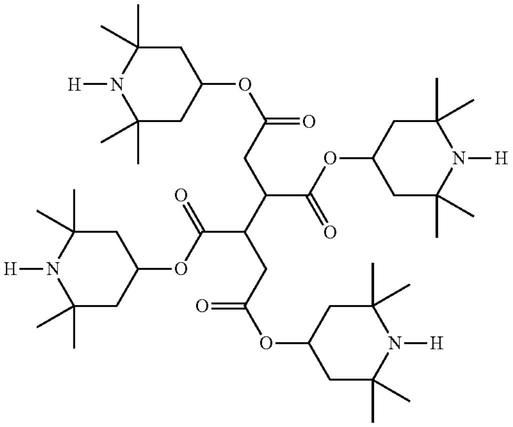

In the compounds of the formulae ST-3a and ST-3b, n preferably denotes 3. In the compounds of the formula ST-2a, n preferably denotes 7.

Very particularly preferred mixtures according to the invention comprise one or more stabilizers from the group of the compounds of the formulae ST-2a-1, ST-3a-1, ST-3b-1, ST-8-1, ST-9-1 and ST-12:

ST-3a-1

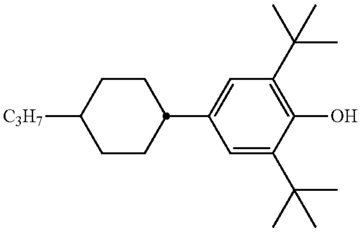

ST-3b-1

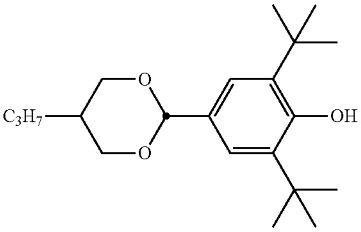

-continued

ST-3c-1

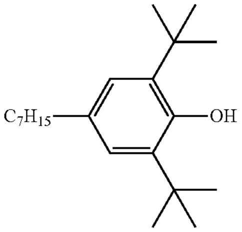

ST-8-1

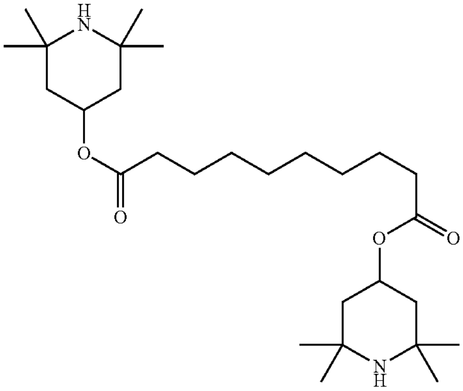

ST-9-1

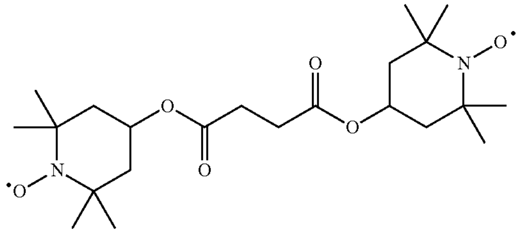

ST-12

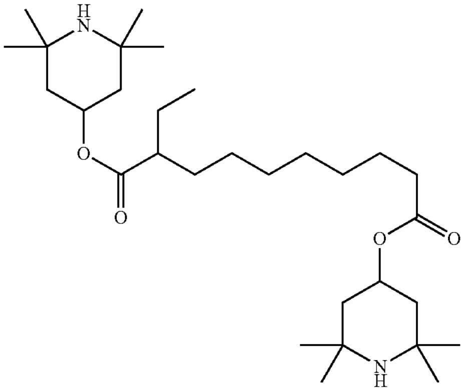

The compounds of the formulae ST-1 to ST-19 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-18, the concentration correspondingly increases to 0.01-1% in the case of two compounds, based on the mixtures.

However, the total proportion of the compounds of the formulae ST-1 to ST-18, based on the mixture according to the invention, should not exceed 2%.

The medium according to the invention preferably has negative dielectric anisotropy. In a preferred embodiment, the medium additionally comprises one or more compounds having positive dielectric anisotropy.

The term "reliability" as used herein means the quality of the performance of the display during time and with different stress loads, such as light load, temperature, humidity, voltage, and comprises display effects such as image sticking (area and line image sticking), mura, yogore etc. which are known to the skilled person in the field of LC displays. As a standard parameter for categorising the reliability usually the voltage holding ration (VHR) value is used, which is a measure for maintaining a constant electrical voltage in a test display. Among other factors, a high VHR is a prerequisite for a high reliability of the LC medium.

Unless indicated otherwise, the term "PSA" is used hereinafter when referring to displays of the polymer sustained alignment type in general, and the term "PS" is used when referring to specific display modes, like PS-VA, PS-TN and the like.

Also, unless indicated otherwise, the term "RM" is used hereinafter when referring to a polymerisable mesogenic or liquid-crystalline compound.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic, or LC compounds is given in *Pure Appl. Chem.* 2001, 73(5), 888 and C. Tschierske, G. Pelzl, S. Diele, *Angew. Chem.* 2004, 116, 6340-6368.

As used herein, the terms "optically active" and "chiral" are synonyms for materials that can induce a helical pitch in a nematic host material, also referred to as "chiral dopants".

The term “spacer group”, hereinafter also referred to as “Sp”, as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms “spacer group” or “spacer” mean a flexible group, for example an alkylene group, which connects the mesogenic group and the polymerisable group(s) in a polymerisable mesogenic compound.

Above and below,

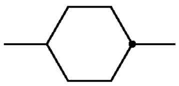

denotes a trans-1,4-cyclohexylene ring.

In a group

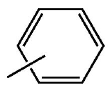

the single bond shown between the two ring atoms can be attached to any free position of the benzene ring.

Above and below “organic group” denotes a carbon or hydrocarbon group.

“Carbon group” denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term “hydrocarbon group” denotes a carbon group which additionally contains one or more H atoms and optionally one or more heteroatoms, such as, for example, N, O, S, B, P, Si, Se, As, Te or Ge.

“Halogen” denotes F, Cl, Br or I, preferably F or Cl.

—CO—, —C(═O)— and —C(O)— denote a carbonyl group, i.e.,

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms “alkyl”, “aryl”, “heteroaryl”, etc., also encompass polyvalent groups, for example alkylene, arylene, heteroarylene, etc.

The term “aryl” denotes an aromatic carbon group, or a group derived therefrom. The term “heteroaryl” denotes “aryl” as defined above, containing one or more heteroatoms, preferably selected from N, O, S, Se, Te, Si and Ge.

Herein, alkyl is straight-chain or branched and has 1 to 15 C atoms, is preferably straight-chain and has, unless indicated otherwise, 1, 2, 3, 4, 5, 6 or 7 C atoms and is accordingly preferably methyl, ethyl, n-propyl, n-butyl, n-pentyl, n-hexyl or n-heptyl.

Herein, branched alkyl is alkyl having a secondary and/or tertiary, preferably secondary, carbon atom and is preferably isopropyl, s-butyl, isobutyl, isopentyl, 2-methylhexyl or 2-ethylhexyl, 2-methylpropyl, 2-pentyl, 3-pentyl, 2-methylbutyl, 3-methylbutyl.

Herein, a cyclic alkyl group is taken to mean a cycloaliphatic radical or an alkyl group in which a methylene group is replaced with a cycloaliphatic group (i.e. a cycloalkylalkyl or alkylcycloalkylalkyl), which may be saturated or partially unsaturated, and preferably denotes cyclopropyl, methylcyclopropyl, cyclobutyl, methylcyclobutyl, cyclopentyl, methylcyclopentyl, cyclopent-1-enyl, cyclopropylmethyl, cyclopropylethyl, cyclobutylmethyl, cyclobutylethyl, cyclopentylmethyl, cyclopentylethyl, cyclopent-1-enylmethyl.

Herein, an alkoxy radical is straight-chain or branched and contains 1 to 15 C atoms. It is preferably straight-chain and has, unless indicated otherwise, 1, 2, 3, 4, 5, 6 or 7 C atoms and is accordingly preferably methoxy, ethoxy, n-propoxy, n-butoxy, n-pentoxy, n-hexoxy or n-heptoxy.

Herein, an alkenyl radical is preferably an alkenyl radical having 2 to 15 C atoms, which is straight-chain or branched and contains at least one C—C double bond. It is preferably straight-chain and has 2 to 7 C atoms. Accordingly, it is preferably vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl. If the two C atoms of the C—C double bond are substituted, the alkenyl radical can be in the form of E and/or Z isomer (trans/cis). In general, the respective E isomers are preferred. Of the alkenyl radicals, prop-2-enyl, but-2- and -3-enyl, and pent-3- and -4-enyl are particularly preferred.

Herein, alkynyl is taken to mean an alkynyl radical having 2 to 15 C atoms, which is straight-chain or branched and contains at least one C—C triple bond. 1- and 2-propynyl and 1-, 2- and 3-butynyl are preferred.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)═C($R^x$)—, —C≡-, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e., they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1" ]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquin-oline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e., those containing exclusively single bonds, and also partially unsaturated rings, i.e., those which may also contain multiple bonds. Heterocyclic rings contain one or more heteroatoms, preferably selected from Si, O, N, S and Se.

The (non-aromatic) alicyclic and heterocyclic groups can be monocyclic, i.e., contain only one ring (such as, for example, cyclohexane), or polycyclic, i.e., contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile.

Preferred substituents, hereinafter also referred to as "L", are, for example, F, Cl, Br, I, —CN, $—NO_2$, —NCO, —NCS, —OCN, —SCN, $—C(=O)N(R^x)_2$, $—C(=O)Y^1$, $—C(=O)R^x$, $—N(R^x)_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or C, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

"Substituted silyl or aryl" preferably means substituted by halogen, —CN, $R^0$, $—OR^0$, $—CO—R^0$, $—CO—O—R^0$, $—O—CO—R^0$ or $—O—CO—O—R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The LC medium according to the invention may additionally comprise one or more further components or additives, preferably selected from the list including but not limited to co-monomers, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

The LC media according to the invention preferably comprise one, two or three chiral dopants, very preferably one chiral dopant.

Particular preference is given to LC media comprising one, two or three polymerisable compounds, also referred to as reactive mesogens (RM).

Preference is furthermore given to LC media that have a chiral nematic LC phase.

Preferably the proportion of polymerisable compounds (RM) in the LC medium is from >0 to <5%, very preferably from >0 to <1%, most preferably from 0.01 to 0.5%.

Preferred embodiments, taken alone or in combination with one another, are listed below. The medium according to the invention preferably comprises

- one or more compounds of formula I in a concentration in the range of from 5% to 30%, preferably of 10% to 20% very preferably from 12% to 17%;
- one or more compounds of formula I in a concentration in the range of from 10% to 35%, preferably of 15% to 33% very preferably from 20% to 30%;
- one or more compounds of formula 1-1 in a concentration in the range of from 2% to 11%, preferably of 3% to 10% very preferably from 4% to 9%;
- one or more compounds of formula 1-1 in a concentration in the range of from 5% to 20%, preferably of 6% to 17% very preferably from 7% to 15%;
- one or more compounds of formula 1-2 in a concentration in the range of from 2% to 15%, preferably of 3% to 14% very preferably from 4% to 13%;
- one or more compounds of the formula IIA and optionally IIA-Y in a total concentration in the range of from 30% to 67%, more preferably from 35% to 62% and very preferably from 38% to 55%, in particular from 40% to 50%;
- one or more compounds of the formula IIA-2 in a total concentration in the range of from 14% to 34%, more preferably from 15% to 31% and very preferably from 16% to 28%, in particular from 17% to 25%;
- one or more compounds of the formula IIA-2 and IIA-Y in a total concentration in the range of from 8% to 40%, more preferably from 9% to 38% and very preferably from 11% to 33%, in particular from 12% to 30%;
- one or more compounds of the formula IIA-10 in a total concentration in the range of from 15% to 34%, more preferably from 18% to 31% and very preferably from 19% to 28%, in particular from 20% to 26%;
- one or more compounds of the formula IIA-Y in a total concentration in the range of from 2% to 15%, preferably from 5% to 13%, more preferably from 7% to 12%;
- one or more compounds of the formula IIB, preferably of the formula IIB-2 and/or IIB-10, very preferably IIB-10, in a total concentration in the range of from 1% to 17%, more preferably from 3% to 16% and very preferably from 5% to 15%;
- one or more compounds of the formula IID, preferably of the formula IID-4 in a total concentration in the range of from 1% to 10%, preferably from 2% to 8%, very preferably from 2% to 7%;
- one or more compounds of the formula IID-4 and IID-10 in a total concentration in the range of from 5% to 20%, preferably from 8% to 18%, very preferably from 10% to 15%;
- one, two, three or more compounds of the formula III, preferably of the formula III-1 and/or Ill-2 and optionally of the formula IIIA, in a total concentration in the range of from 1% to 12%, more preferably from 2% to 11%, very preferably from 3% to 10%;
- one or more compounds of the formula IV, preferably selected from the compounds of the formulae IV-2 and IV-3, more preferably of the formula IV-3-4 and/or IV-3-5 in a total concentration in the range of from 12% to 35%, still more preferably from 15% to 30%, and very preferably from 18% to 25%;
- one or more compounds of the formula V, preferably of the formula V-9, in a total concentration in the range of from 1% to 10%, more preferably from 1% to 7%, and very preferably from 1.5% to 5%.

It is advantageous for the liquid-crystalline medium according to the invention to preferably have a nematic phase from ≤−20° C. to ≥95° C., particularly preferably from ≤−30° C. to ≥97° C., very particularly preferably from ≤−40° C. to ≥99° C.

In a preferred embodiment, the medium according to the invention has a clearing temperature of 95° C. or more, more preferably of 97° C. or more, and in particular of 99° C. more.

Herein, the expression "to have a nematic phase" at a given temperature means that no smectic phase and no crystallisation is observed at low temperatures and on the other hand that clearing (phase transition to the isotropic phase) does not occur on heating of a nematic phase at a given temperature. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 100 K and a flow viscosity $v_{20}$ of at most 30 $mm^2 \cdot s^{-1}$ at 20° C.

The mixture is nematic at a temperature of −20° C. or less, preferably at −30° C. or less, very preferably at −40° C. or less.

The medium according to the invention has a birefringence in the range of from 0.080 to 0.110, preferably from 0.082 to 0.105, in particular from 0.085 to 0.100.

In a preferred embodiment, the medium has a birefringence in the range of from 0.0890 to 0.1000, preferably from 0.0940 to 0.0970, in particular from 0.0950 to 0.0960.

In another preferred embodiment, the medium has a birefringence in the range of from 0.0830 to 0.0900, preferably from 0.0840 to 0.0880, in particular from 0.0850 to 0.0870.

In a preferred embodiment, the medium according to the invention has a dielectric anisotropy $\Delta\varepsilon$ of −3.5 to −7.0, preferably of −4.0 to −6.0, in particular −4.5 to −5.5.

In a very preferred embodiment, the liquid-crystal mixture according to the invention has a dielectric anisotropy $\Delta\varepsilon$ of −4.8 to −5.2.

The rotational viscosity $\gamma_1$ at 20° C. is preferably in the range of from 150 to 300 mPa s, more preferably from 200 to 250 mPa s.

The rotational viscosity $\gamma_1$ at 20° C. is preferably 230 mPa s or less.

The medium according to the invention has an elastic constant $K_1$ in the range of from 14 to 16 pN.

In a preferred embodiment, the medium according to the invention has a ratio of the rotational viscosity to the splay elastic constant $\gamma_1/K_1$ of 15 mPa·s $pN^{-1}$ or less.

The liquid-crystal media according to the invention have relatively low values for the threshold voltage ($V_0$). They are preferably in the range from 1.5 V to 2.5 V, particularly preferably 2.2 V and very particularly preferably 2.0 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\varepsilon>1.5$, the term "dielectrically neutral compounds" denotes those having $-1.5\leq\Delta\varepsilon\leq1.5$ and the term "dielectrically negative compounds" denotes those having $\Delta\varepsilon<-1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA), as well as for passive matrix VA (PM-VA). They are furthermore suitable for IPS (in-plane switching) and FFS (fringe field switching) applications having negative $\Delta\varepsilon$.

It goes without saying for the person skilled in the art that the medium according to the invention may also comprise compounds in which, for example, H, N, O, Cl and F have been replaced by the corresponding isotopes.

The compounds according to the present invention can be synthesized by or in analogy to known methods described in the literature (for example in the standard works such as Houben-Weyl, Methoden der Organischen Chemie [Methods of Organic Chemistry], Georg-Thieme-Verlag, Stuttgart), under reaction conditions which are known and suitable for said reactions. Use may also be made here of variants which are known per se but are not mentioned here.

Other mesogenic compounds which are not explicitly mentioned above can optionally and advantageously also be used in the media in accordance with the present invention. Such compounds are known to the person skilled in the art.

For the present invention and in the following examples, the structures of the liquid-crystal compounds are indicated by means of acronyms, with the transformation into chemical formulae taking place in accordance with Tables A to C below. All radicals $C_mH_{2m+1}$, $C_nH_{2n+1}$, and $C_lH_{2l+1}$ or $C_mH_{2m-1}$, $C_nH_{2n-1}$ and $C_lH_{2l-1}$ are straight-chain alkyl radicals or alkylene radicals, in each case having n, m and l C atoms respectively. Preferably n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C | 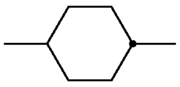 |
| D | 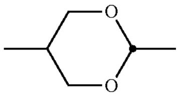 |
| DI | 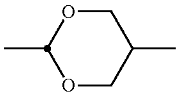 |
| A | 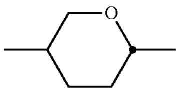 |
| AI | 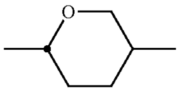 |
| P | 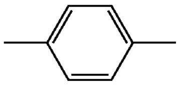 |
| G | 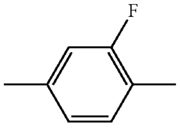 |

TABLE A-continued
| Ring elements | |
|---|---|
| GI | 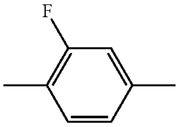 |
| U | 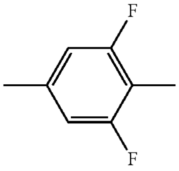 |
| UI | 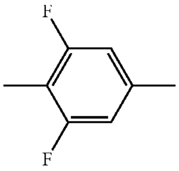 |
| Y | 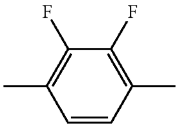 |
| P(F,Cl)Y | 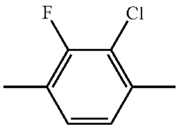 |
| P(Cl,F)Y | 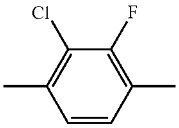 |
| np | 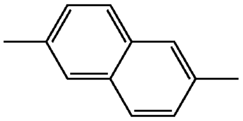 |
| n3f | 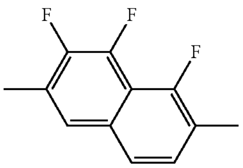 |
| nN3fl | 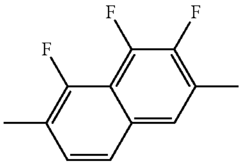 |
| th | 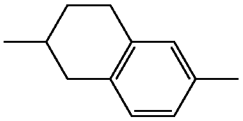 |
TABLE A-continued
| Ring elements | |
|---|---|
| thl | 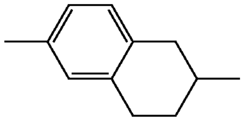 |
| tH2f | 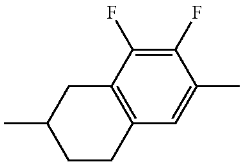 |
| tH2fl | 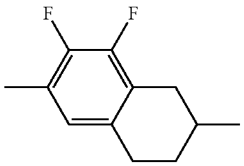 |
| o2f | 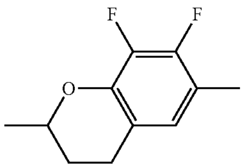 |
| o2fl | 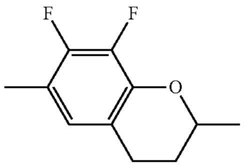 |
| dh | 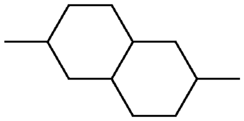 |
| B | 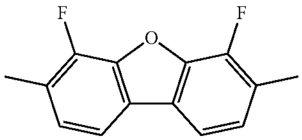 |
| B(S) | 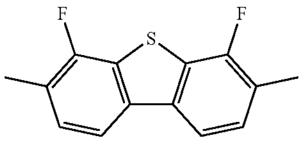 |
| O | 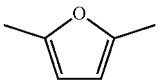 |
| S | 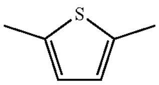 |

TABLE A-continued

| Ring elements | |
|---|---|
| K | 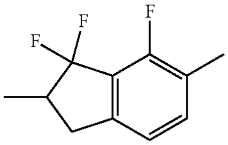 |
| KI | 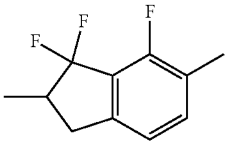 |
| L | 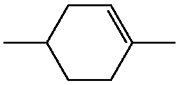 |
| LI | 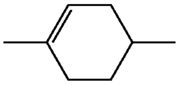 |
| F | 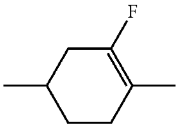 |
| FI | 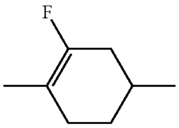 |
| Bh | 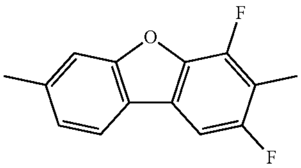 |

TABLE A-continued

| Ring elements | |
|---|---|
| Bh(S) | 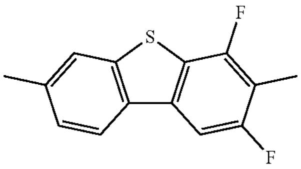 |
| Bf | 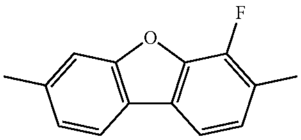 |
| Bf(S) | 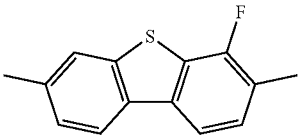 |
| Bfi | 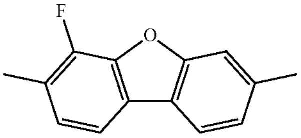 |
| Bfi(S) | 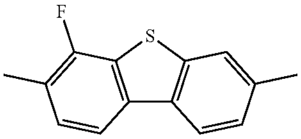 |

TABLE B

| Bridging units | | | |
|---|---|---|---|
| E | $-CH_2-CH_2-$ | | |
| V | $-CH=CH-$ | | |
| T | $-C\equiv C-$ | | |
| W | $-CF_2-CF_2-$ | | |
| B | $-CF=CF-$ | | |
| Z | $-CO-O-$ | ZI | $-O-CO-$ |
| X | $-CF=CH-$ | XI | $-CH=CF-$ |
| O | $-CH_2-O-$ | OI | $-O-CH_2-$ |
| Q | $-CF_2-O-$ | QI | $-O-CF_2-$ |

TABLE C

| End groups | | | |
|---|---|---|---|
| On the left individually or in combination | | On the right individually or in combination | |
| -n- | $C_nH_{2n+1}-$ | -n | $-C_nH_{2n+1}$ |
| -nO— | $C_nH_{2n+1}-O-$ | —On | $-O-C_nH_{2n+1}$ |
| —V— | $CH_2=CH-$ | —V | $-CH=CH_2$ |
| -nV— | $C_nH_{2n+1}-CH=CH-$ | -nV | $-C_nH_{2n}-CH=CH_2$ |
| —Vn- | $CH_2=CH-C_nH_{2n}-$ | —Vn | $-CH=CH-C_nH_{2n+1}$ |
| -nVm- | $C_nH_{2n+1}-CH=CH-C_mH_{2m}-$ | -nVm | $-C_nH_{2n}-CH=CH-C_mH_{2m+1}$ |
| —N— | $N\equiv C-$ | —N | $-C\equiv N$ |
| —S— | $S=C=N-$ | —S | $-N=C=S$ |
| —F— | F— | —F | —F |
| —CL— | Cl— | —CL | —Cl |
| —M— | $CFH_2-$ | —M | $-CFH_2$ |
| —D— | $CF_2H-$ | —D | $-CF_2H$ |
| —T— | $CF_3-$ | —T | $-CF_3$ |
| —MO— | $CFH_2O-$ | —OM | $-OCFH_2$ |

TABLE C-continued

| End groups | | | |
|---|---|---|---|
| On the left individually or in combination | | On the right individually or in combination | |
| —DO— | $CF_2HO$— | —OD | —$OCF_2H$ |
| —TO— | $CF_3O$— | —OT | —$OCF_3$ |
| —A— | H—C≡C— | —A | —C≡C—H |
| —nA— | $C_nH_{2n+1}$—C≡C— | —An | —C≡C—$C_nH_{2n+1}$ |
| —NA— | N≡C—C≡C— | —AN | —C≡C—C≡N |
| -(cn)- | 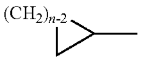 | -(cn) | 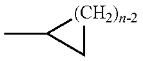 |
| -(cn)m- | 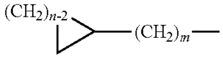 | -m(cn) | 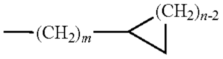 |
| -(c5-1en)m- | 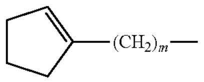 | -m(c5-1en) | 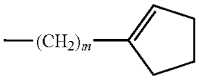 |
| -(c5-2en)m- | 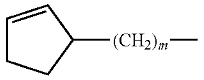 | -m(c5-2en) | 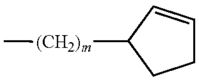 |
| -(c5-3en)m- | 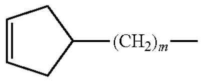 | -m(c5-3en) | 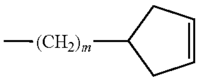 |
| - . . . n . . . - | —$C_nH_{2n}$— | - . . . n . . . | —$C_nH_{2n}$— |
| - . . . M . . . - | —CFH— | - . . . M . . . | —CFH— |
| - . . . D . . . - | —$CF_2$— | - . . . D . . . | —$CF_2$— |
| - . . . V . . . - | —CH═CH— | - . . . V . . . | —CH═CH— |
| - . . . Z . . . - | —CO—O— | - . . . Z . . . | —CO—O— |
| - . . . ZI . . . - | —O—CO— | - . . . ZI . . . | —O—CO— |
| - . . . K . . . - | —CO— | - . . . K . . . | —CO— |
| - . . . W . . . - | —CF═CF— | - . . . W . . . | —CF═CF— |

in which n and m are each integers, and the three dots " . . . " are placeholders for other abbreviations from this table.

Apart from the compounds of formula I, IIA, IIB, IIC and/or IID and III, the mixtures according to the invention optionally comprise one or more compounds of the compounds mentioned below.

The following abbreviations are used:

(n, m, k and l are, independently of one another, each an integer, preferably 1 to 9 preferably 1 to 7, k and l possibly may be also 0 and preferably are 0 to 4, more preferably 0 or 2 and most preferably 2, n preferably is 1, 2, 3, 4 or 5, in the combination "-nO—" it preferably is 1, 2, 3 or 4, preferably 2 or 4, m preferably is 1, 2, 3, 4 or 5, in the combination "-Om" it preferably is 1, 2, 3 or 4, more preferably 2 or 4. The combination "-IVm" preferably is "2V1".)

TABLE D

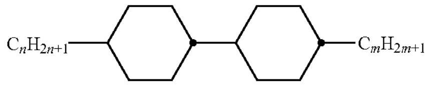

CC-n-m

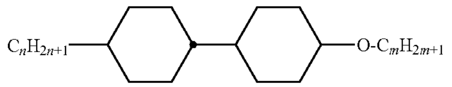

CC-n-Om

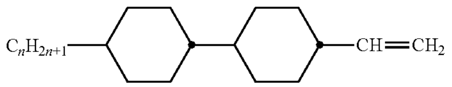

CC-n-V

TABLE D-continued
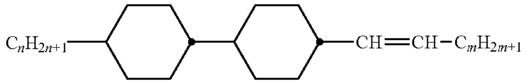
CC-n-Vm
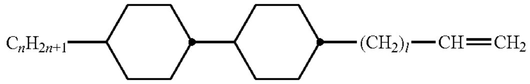
CC-n-IV
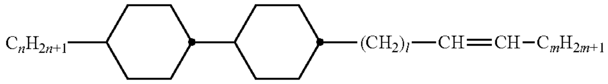
CC-n-IVm
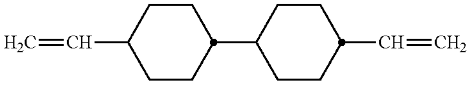
CC-V-V
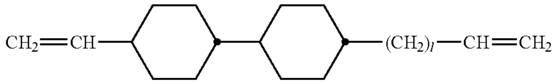
CC-V-IV
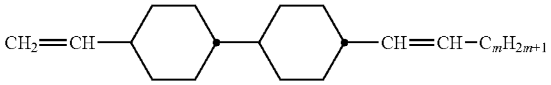
CC-V-Vm
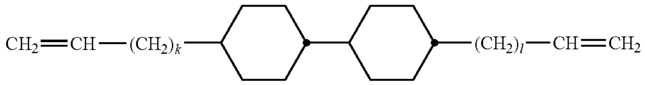
CC-Vk-IV
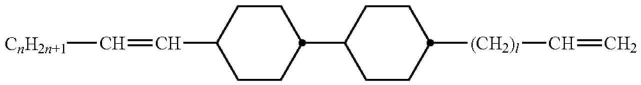
CC-nV-IV
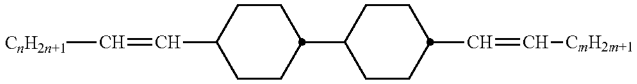
CC-nV-Vm
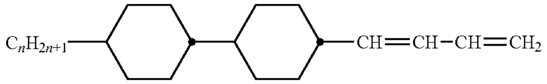
CC-n-VV
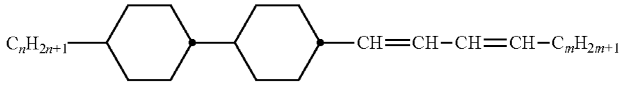
CC-n-VVm TABLE D-continued
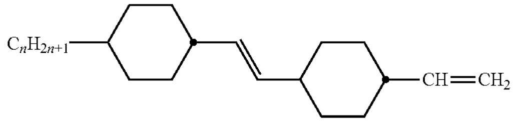
CVC-n-V
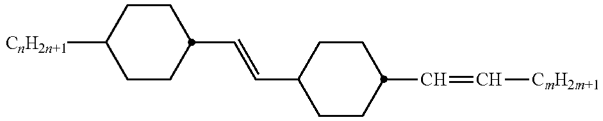
CVC-n-Vm
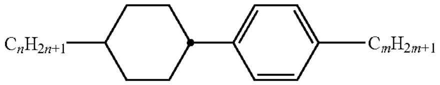
CP-n-m
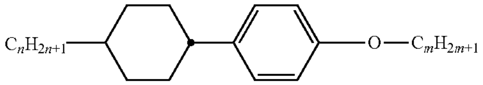
CP-n-Om
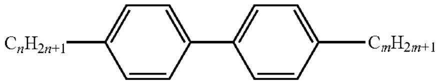
PP-n-m
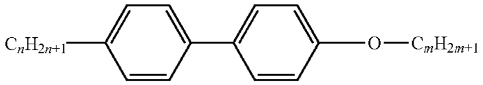
PP-n-Om
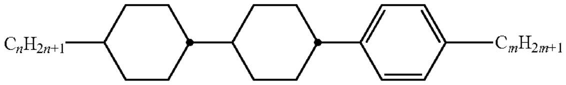
CCP-n-m
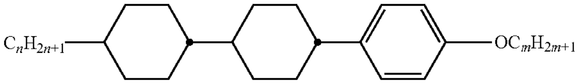
CCP-n-Om
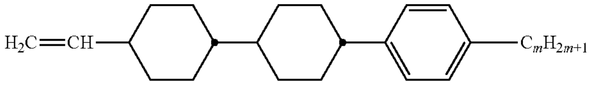
CCP-V-m
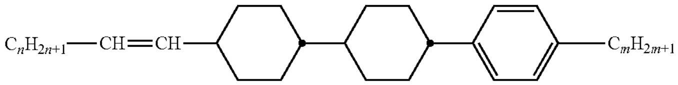
CPP-nV-m
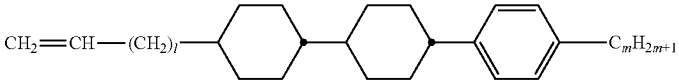
CCP-VI-m TABLE D-continued
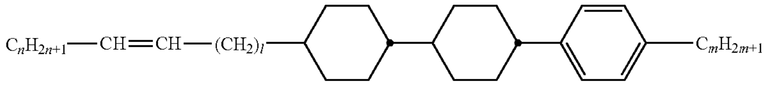
CCP-nVI-m
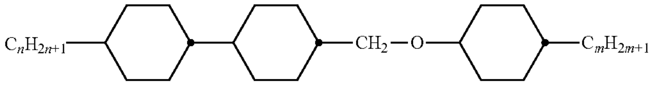
CCOC-n-m
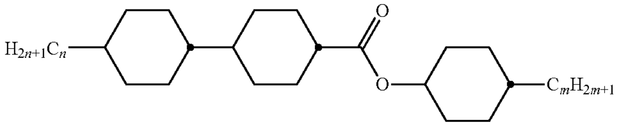
CCZC-n-m
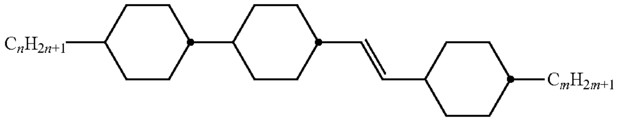
CCVC-n-m
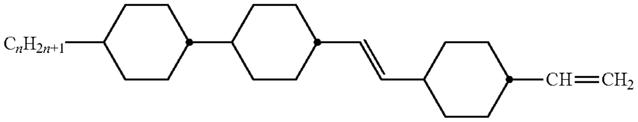
CCVC-n-V
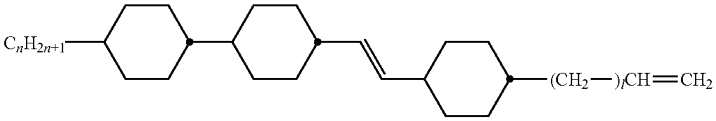
CCVC-n-IV
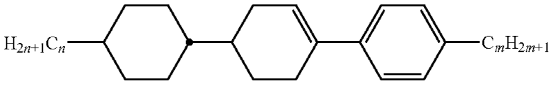
CLP-n-m
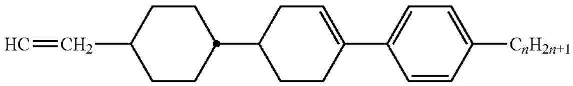
CLP-V-n
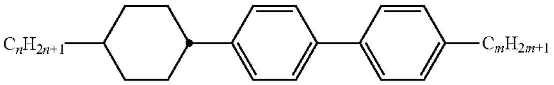
CCP-n-m
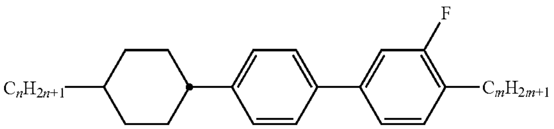
CGP-n-m TABLE D-continued
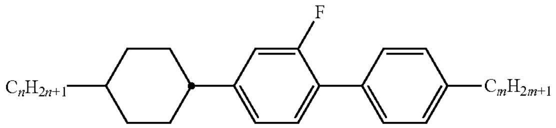
CGP-n-m
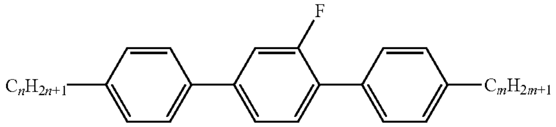
PGP-n-m
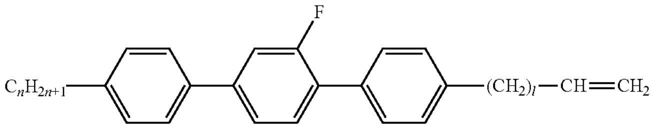
PGP-n-IV
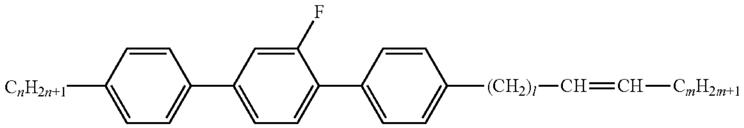
PGP-n-IVm
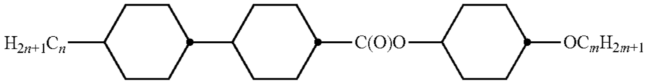
CCZC-n-m
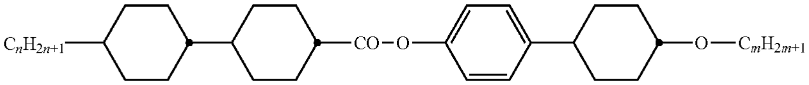
CCZPC-n-m
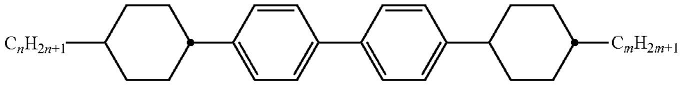
CPPC-n-m
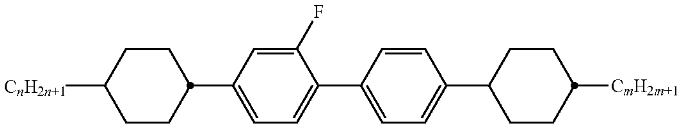
CGPC-n-m
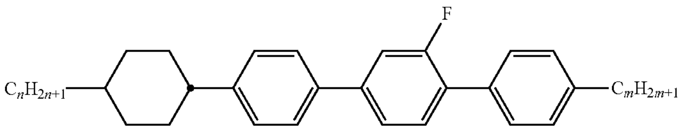
CPGP-n-m TABLE D-continued
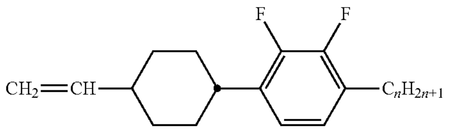
CY-V-n
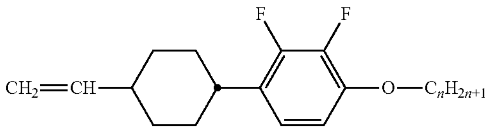
CY-V-On
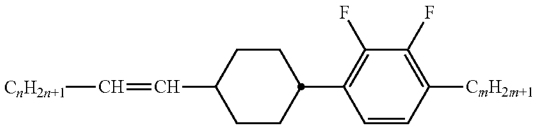
CY-nV-m
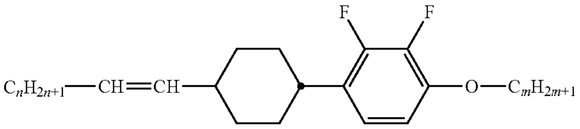
CY-nV-Om
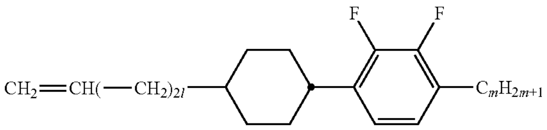
CY-VI-m
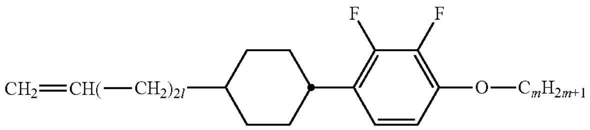
CY-VI-Om
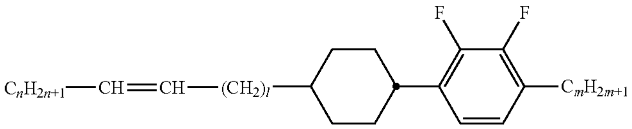
CY-nVI-m
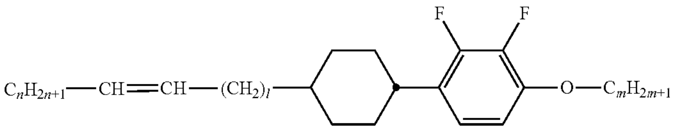
CY-nVI-Om TABLE D-continued
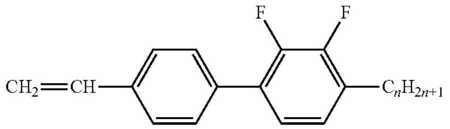
PY-V-n
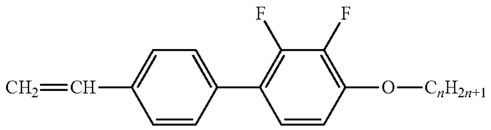
PY-V-On
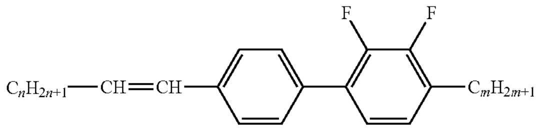
PY-nV-m
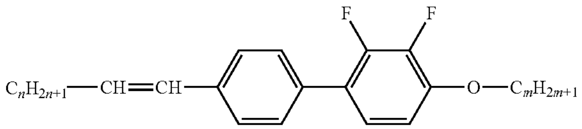
PY-nV-Om
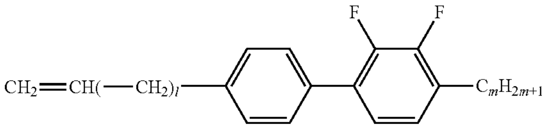
PY-VI-m
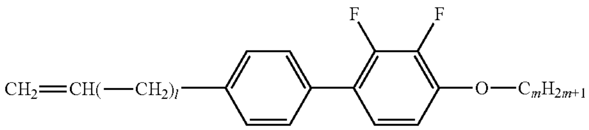
PY-VI-Om
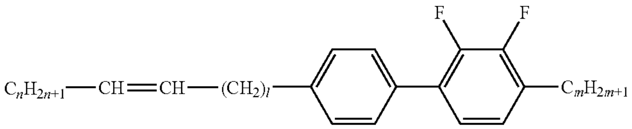
PY-nVI-m
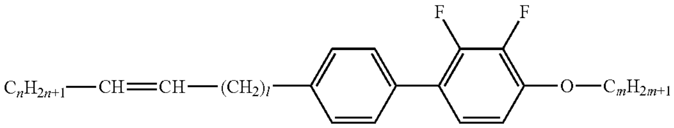
PY-nVI-Om
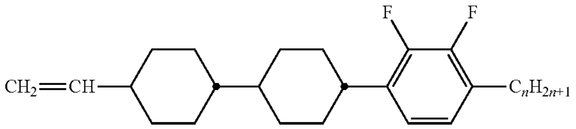
CCY-V-n TABLE D-continued
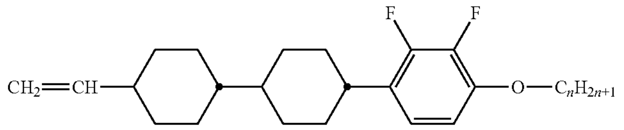
CCY-V-On
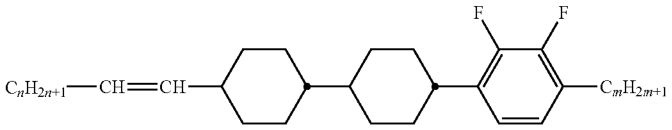
CCY-nV-m
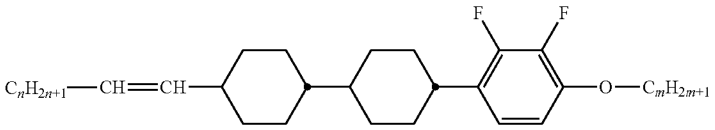
CCY-nV-Om
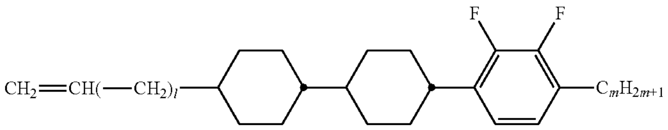
CCY-VI-m
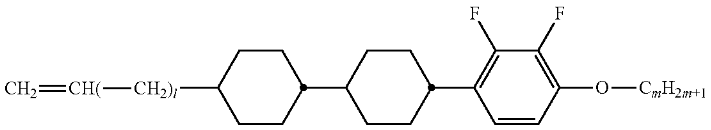
CCY-VI-Om
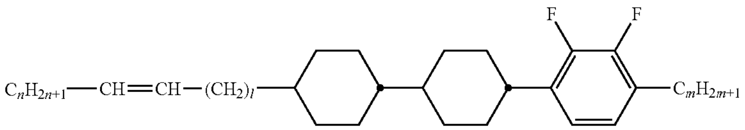
CCY-nVI-m
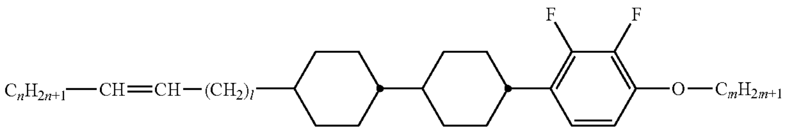
CCY-nVI-Om
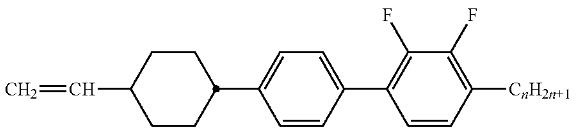
CPY-V-n
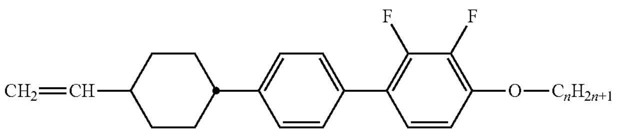
CPY-V-On TABLE D-continued
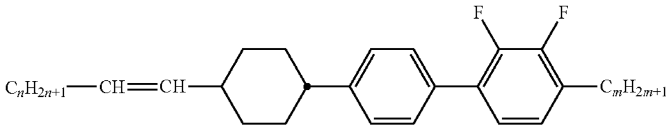
CPY-nV-m
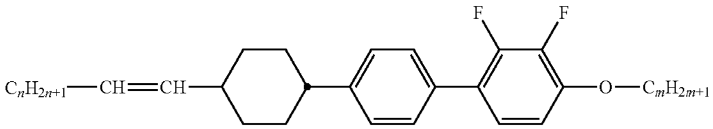
CPY-nV-Om
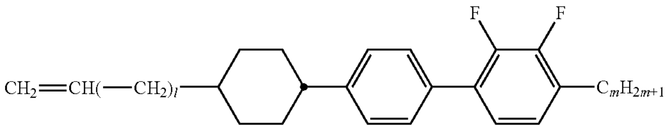
CPY-VI-m
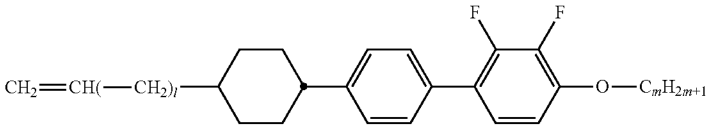
CPY-VI-Om
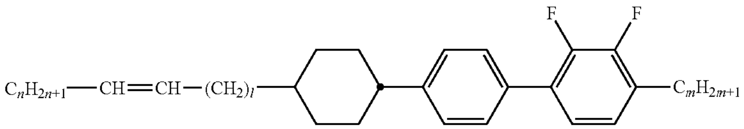
CPY-nVI-k
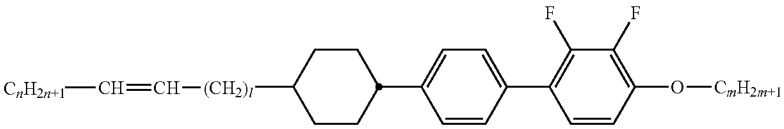
CPY-nVI-Om
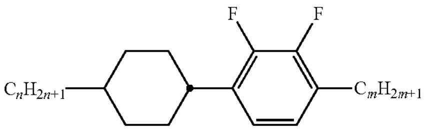
CY-n-m
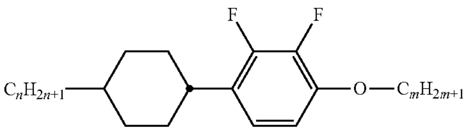
CY-n-Om
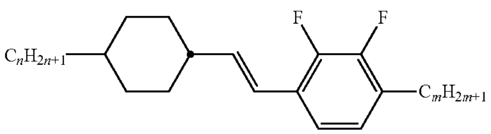
CVY-n-m TABLE D-continued
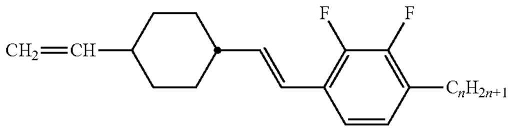
CVY-V-n
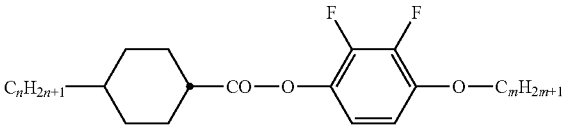
CZY-n-Om
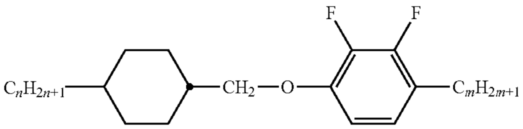
COY-n-m
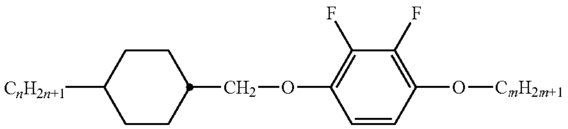
COY-n-Om
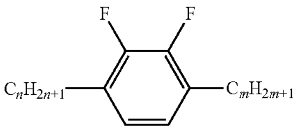
Y-n-m
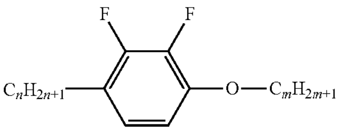
Y-n-Om
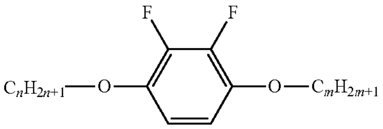
Y-nO-Om
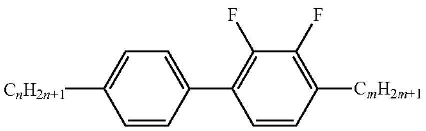
PY-n-m
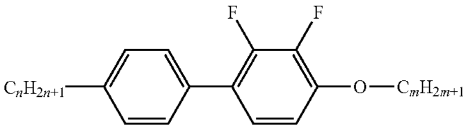
PY-n-Om TABLE D-continued
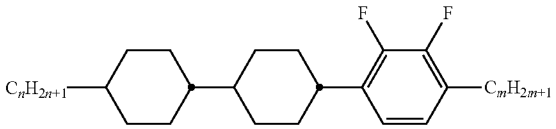
CCY-n-m
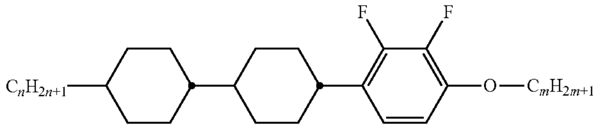
CCY-n-Om
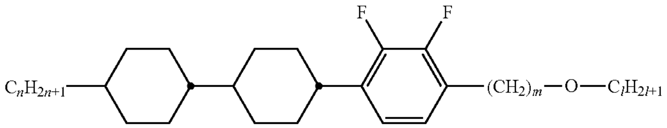
CCY-n-mOl
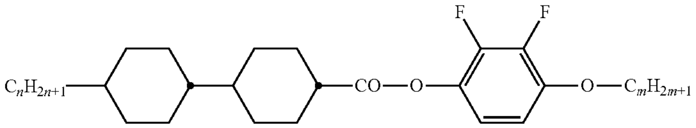
CCZY-n-Om
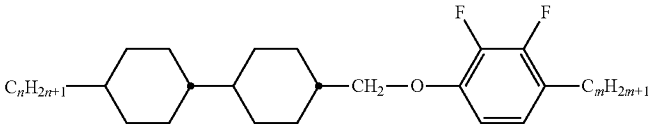
CCOY-n-m
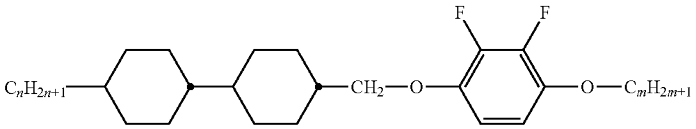
CCOY-n-Om
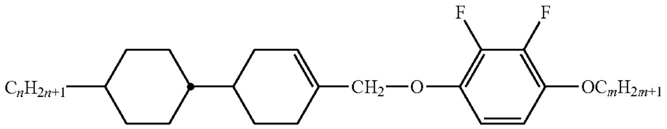
CLOY-n-Om
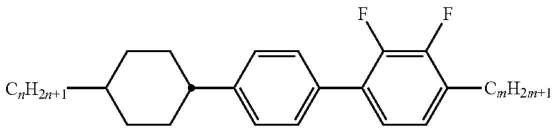
CPY-n-m
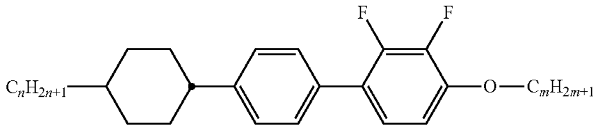
CPY-n-Om TABLE D-continued
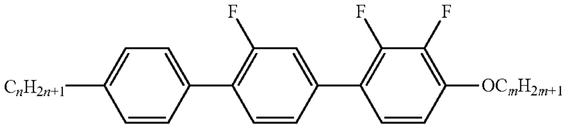
PGIY-n-Om
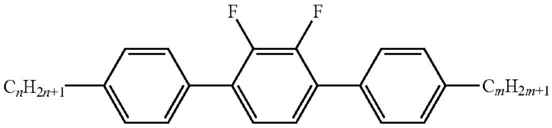
PYP-n-m
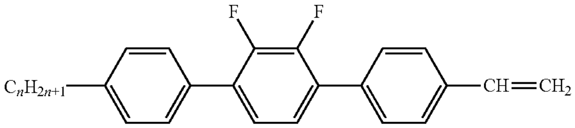
PYP-n-V
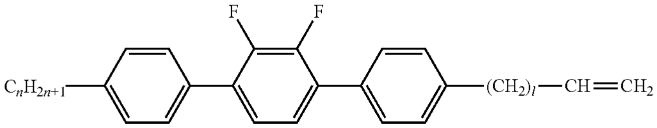
PYP-n-IV
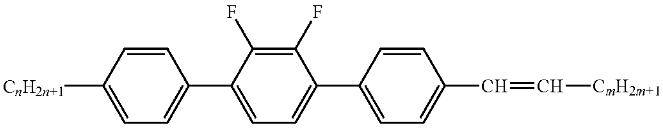
PYP-n-Vm
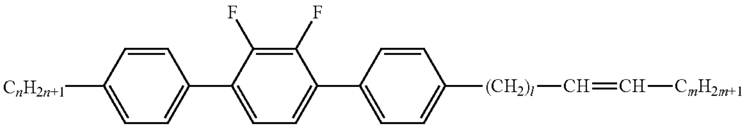
PYP-n-IVm
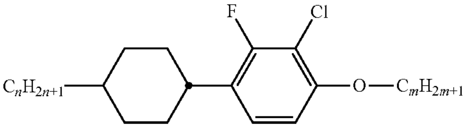
CP(F,Cl)-n-Om
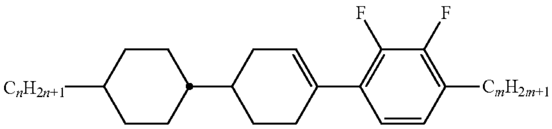
CLY-n-m TABLE D-continued
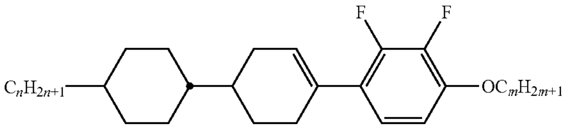
CLY-n-Om
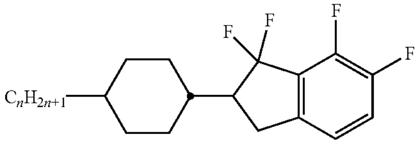
CK-n-F
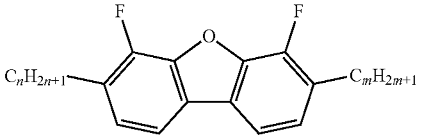
B-n-m
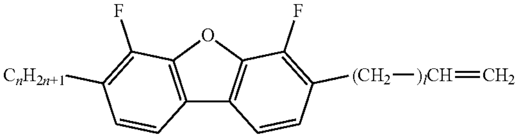
B-n-IV
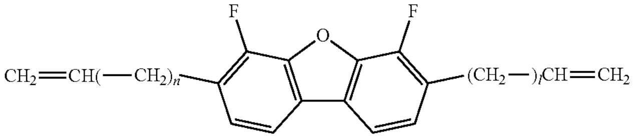
B-Vn-IV
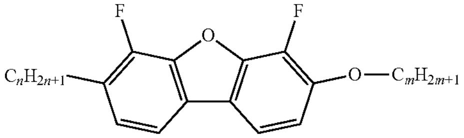
B-n-Om
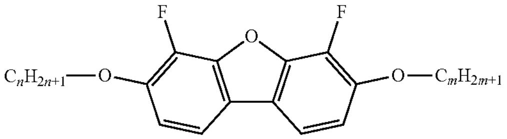
B-nO-Om
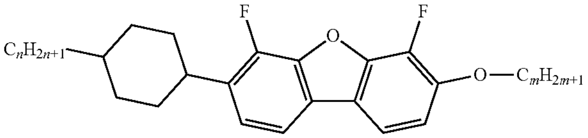
CB-n-Om TABLE D-continued

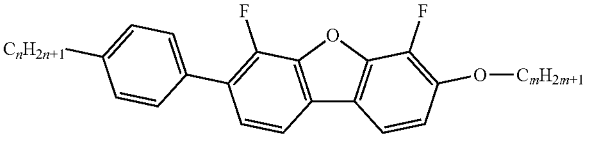

PB-n-Om

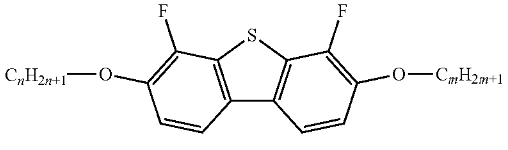

B(S)-nO-Om

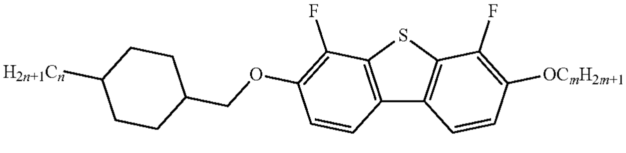

COB(S)-n-Om

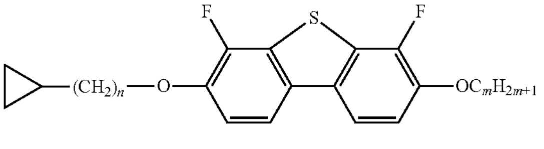

B(S)-(c3)nO-Om

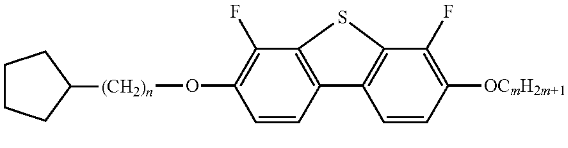

B(S)-(c5)nO-Om

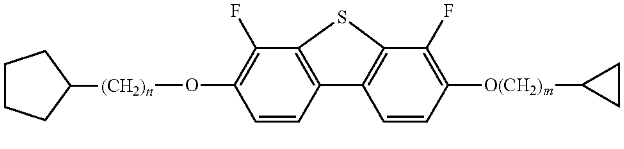

B(S)-(c5)nO-Om(c3)

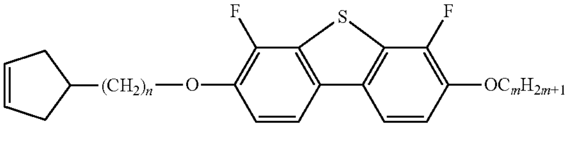

B(S)-(c5-3en)nO-Om

EXAMPLES

The present invention is illustrated in detail by the following non-restrictive working examples.

The following abbreviations and symbols are used:

$V_0$ threshold voltage, capacitive [V] at 20° C., $n_e$ extraordinary refractive index at 20° C. and 589 nm, $n_o$ ordinary refractive index at 20° C. and 589 nm, $\Delta n$ optical anisotropy at 20° C. and 589 nm, $\varepsilon\perp$ dielectric permittivity perpendicular to the director at 20° C. and 1 kHz, $\varepsilon\|$ dielectric permittivity parallel to the director at 20° C. and 1 kHz, $\Delta\varepsilon$ dielectric anisotropy at 20° C. and 1 kHz, cl.p., T(N,I) clearing point [° C.], $\gamma_1$ rotational viscosity at 20° C. [mPa-s], $K_1$ elastic constant, "splay" deformation at 20° C. [pN], $K_2$ elastic constant, "twist" deformation at 20° C. [pN], $K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S)

to the nematic (N) phase T(S,N) and the clearing point T(N,I), are quoted in degrees Celsius (° C.). M.p. denotes melting point, cl.p.=clearing point. Furthermore, C =crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates with a distance of 25 μm, each of which has on the inside an electrode layer and an unrubbed polyimide alignment layer on top, which effect homeotropic alignment of the liquid-crystal molecules.

Unless indicated otherwise, the VHR is determined at 20° C. ($VHR_{20}$) and after 5 minutes in an oven at 100° C. ($VHR_{100}$) in a commercially available instrument Model LCM-1 (00004) from TOYO Corporation, Japan. The voltage used has a frequency of in a range from 1 Hz to 60 Hz, unless indicated more precisely.

The stability to UV irradiation is investigated in a "Suntest CPS+", a commercial instrument from Heraeus, Germany, using a Xenon lamp NXE1500B. The sealed test cells are irradiated for 2.0 h, unless explicitly indicated, without additional heating. The irradiation power in the wavelength range from 300 nm to 800 nm is 765 W/m$^2$ V. A UV "cut-off" filter having an edge wavelength of 310 nm is used in order to simulate the so-called window glass mode. In each series of experiments, at least four test cells are investigated for each condition, and the respective results are indicated as averages of the corresponding individual measurements.

In order to investigate the low-temperature stability, also known as "LTS", i.e. the stability of the LC mixture in the bulk against spontaneous crystallisation of individual components at low temperatures or the occurrence of smectic phases, as the case may be, several sealed bottles, each containing about 1 g of the material, are stored at one or more given temperatures, typically of −10° C., −20° C., −30° C. and/or −40° C. and it is inspected at regular intervals visually, whether a phase transition is observed or not. As soon as the first one of the samples at a given temperature shows a change time is noted. The time until the last inspection, at which no change has been observed, is noted as the respective LTS.

The ion density from which the resistivity is calculated is measured using the commercially available LC Material Characteristics Measurement System Model 6254 from Toyo Corporation, Japan, using VHR test cells with AL16301 Polyimide (JSR Corp., Japan) having a 3.2 μm cell gap. The measurement is performed after 5 min of storage in an oven at 60° C. or 100° C.

The Clearing point is measured using the Mettler Thermosystem FP900. The optical anisotropy (Δn) is measured using an Abbe Refractometer H005 (Natrium-spectral lamp Na10 at 589 nm, 20° C.). The dielectric anisotropy (Δε) is measured using an LCR-Meter E4980A/Agilent (G005) at 20° C. (ε-parallel-cells with JALS 2096-R1). The turn on voltage ($V_0$) is measured using an LCR-Meter E4980A/Agilent (G005) at 20° C. (ε-parallel-cells with JALS 2096-R1). The rotational viscosity ($\gamma_1$) is measured using a TOYO LCM-2 (0002) at 20° C. (gamma 1 negative cells with JALS-2096-R1). The elastic constant ($K_1$, splay) is measured using an LCR-Meter E4980A/Agilent (G005) at 20° C. (E parallel-cells with JALS 2096-R1). $K_3$: The elastic constant ($K_3$, bend) is measured using an LCR-Meter E4980A/Agilent (G005) at 20° C. (ε-parallel-cells with JALS 2096-R1).

The following mixture examples having negative dielectric anisotropy are suitable, in particular, for liquid-crystal displays which have at least one planar alignment layer, such as, for example, IPS and FFS displays, in particular UB-FFS (=ultra-bright FFS), and for VA displays.

Mixture Examples

The nematic LC host mixtures M1 to M19 have the composition and physical properties given in the following tables:

Mixture M1

| | | | |
|---|---|---|---|
| CY-3-O2 | 5.0% | Clearing point/° C.: | 104 |
| CY-3-O4 | 18.0% | Δn (589 nm, 20° C.): | 0.0973 |
| CCY-3-O1 | 5.0% | Δε (1 kHz, 20° C.): | −4.9 |
| CCY-3-O2 | 6.0% | $K_1$ (pN, 20° C.): | 15.9 |
| CCY-3-O3 | 6.0% | $K_3$ (pN, 20° C.): | 15.9 |
| CCY-4-O2 | 6.0% | $V_0$ [V]: | 2.0 |
| CLY-3-O2 | 2.0% | | |
| CPY-2-O2 | 7.0% | | |
| CC-4-V | 18.0% | | |
| CC-5-V | 2.0% | | |
| CCP-V-1 | 3.5% | | |
| CZC-3-3 | 3.0% | | |
| CZC-3-5 | 3.0% | | |
| CCZPC-3-3 | 4.0% | | |
| CCZPC-3-4 | 4.0% | | |
| B(S)-2O-O4 | 4.0% | | |
| B(S)-2O-O5 | 3.5% | | |
| Σ | 100.0% | | |

Mixture M2

| | | | |
|---|---|---|---|
| CY-3-O2 | 5.0% | Clearing point/° C.: | 107 |
| CY-3-O4 | 18.0% | Δn (589 nm, 20° C.): | 0.0964 |
| CCY-3-O1 | 5.0% | Δε (1 kHz, 20° C.): | −4.7 |
| CCY-3-O2 | 6.0% | $K_1$ (pN, 20° C.): | 16.2 |
| CCY-3-O3 | 6.0% | $K_3$ (pN, 20° C.): | 16.2 |
| CCY-4-O2 | 6.0% | $V_0$ [V]: | 2.0 |
| CLY-3-O2 | 2.0% | | |
| CPY-2-O2 | 7.0% | | |
| CC-4-V | 18.0% | | |
| CC-5-V | 2.0% | | |
| CCP-V-1 | 3.5% | | |
| CZC-3-3 | 3.0% | | |
| CZC-3-5 | 3.0% | | |
| CCZPC-3-3 | 4.0% | | |
| CCZPC-3-4 | 4.0% | | |
| B(S)-2O-O5 | 4.5% | | |
| COB(S)-2-O4 | 3.0% | | |
| Σ | 100.0% | | |

| Mixture M3 | | | |
|---|---|---|---|
| CY-3-O2 | 4.0% | Clearing point/° C.: | 105 |
| CY-3-O4 | 18.0% | Δn (589 nm, 20° C.): | 0.0970 |
| CCY-3-O1 | 5.0% | Δε (1 kHz, 20° C.): | −4.9 |
| CCY-3-O2 | 6.0% | $\gamma_1$ [mPa s](20° C.): | 228 |
| CCY-3-O3 | 6.0% | $K_1$ (pN, 20° C.): | 15.7 |
| CCY-4-O2 | 6.0% | $K_3$ (pN, 20° C.): | 16.1 |
| CLY-3-O2 | 2.5% | $V_0$ [V]: | 2.0 |
| CPY-2-O2 | 8.0% | | |
| CC-4-V | 18.0% | | |
| CC-5-V | 4.0% | | |
| CZC-3-3 | 3.0% | | |
| CZC-3-5 | 3.0% | | |
| CCZPC-3-3 | 4.5% | | |
| CCZPC-3-4 | 4.5% | | |
| B(S)-2O-O5 | 7.5% | | |
| Σ | 100.0% | | |

| Mixture M4 | | | |
|---|---|---|---|
| CY-3-O2 | 2.0% | Clearing point/° C.: | 103 |
| CY-3-O4 | 18.0% | Δn (589 nm, 20° C.): | 0.0955 |
| CCY-3-O1 | 4.0% | Δε (1 kHz, 20° C.): | −5.2 |
| CCY-3-O2 | 6.0% | $\gamma_1$ [mPa s](20° C.): | 245 |
| CCY-3-O3 | 6.0% | $K_1$ (pN, 20° C.): | 16.3 |
| CCY-4-O2 | 6.0% | $K_3$ (pN, 20° C.): | 16.6 |
| CLY-3-O2 | 2.0% | $V_0$ [V]: | 2.0 |
| CPY-2-O2 | 7.0% | | |
| CLOY-3-O2 | 6.0% | | |
| CC-4-V | 18.0% | | |
| CC-5-V | 4.0% | | |
| CZC-3-3 | 3.0% | | |
| CZC-3-5 | 3.0% | | |
| CCZPC-3-3 | 4.0% | | |
| CCZPC-3-4 | 4.0% | | |
| B(S)-2O-O4 | 3.0% | | |
| B(S)-2O-O5 | 4.0% | | |
| Σ | 100.0% | | |

| Mixture M5 | | | |
|---|---|---|---|
| CY-3-O2 | 6.5% | Clearing point/° C.: | 102 |
| CY-3-O4 | 14.0% | Δn (589 nm, 20° C.): | 0.0958 |
| CCY-3-O1 | 5.0% | Δε (1 kHz, 20° C.): | −4.8 |
| CCY-3-O2 | 6.0% | $\gamma_1$ [mPa s](20° C.): | 215 |
| CCY-3-O3 | 6.0% | $K_1$ (pN, 20° C.): | 16.3 |
| CCY-4-O2 | 6.0% | $K_3$ (pN, 20° C.): | 15.9 |
| CLY-3-O2 | 6.0% | $V_0$ [V]: | 1.9 |
| CPY-2-O2 | 6.5% | | |
| CPY-3-O2 | 6.5% | | |
| CC-3-O1 | 4.5% | | |
| CC-4-V | 16.0% | | |
| CZC-3-3 | 3.0% | | |
| CZC-3-5 | 3.0% | | |
| CZC-4-3 | 3.0% | | |
| CCZC-4-5 | 3.0% | | |
| CCZPC-3-3 | 1.5% | | |
| B(S)-2O-O5 | 3.5% | | |
| Σ | 100.0% | | |

| Mixture M6 | | | |
|---|---|---|---|
| CY-3-O2 | 6.5% | Clearing point/° C.: | 100 |
| CY-3-O4 | 14.0% | Δn (589 nm, 20° C.): | 0.0885 |
| CCY-3-O1 | 5.0% | Δε (1 kHz, 20° C.): | −5.14 |
| CCY-3-O2 | 6.0% | $\gamma_1$ [mPa s](20° C.): | 226 |
| CCY-3-O3 | 6.0% | $K_1$ (pN, 20° C.): | 17.0 |

-continued

| Mixture M6 | | | |
|---|---|---|---|
| CCY-4-O2 | 6.0% | $K_3$ (pN, 20° C.): | 16.3 |
| CLY-3-O2 | 6.0% | $V_0$ [V]: | 1.9 |
| CPY-3-O2 | 4.5% | | |
| CLOY-3-O2 | 6.5% | | |
| CC-3-O1 | 4.5% | | |
| CC-4-V | 16.0% | | |
| CZC-3-3 | 4.0% | | |
| CZC-3-5 | 4.0% | | |
| CZC-4-3 | 3.0% | | |
| CCZC-4-5 | 3.0% | | |
| CCZPC-3-3 | 1.5% | | |
| B(S)-2O-O5 | 3.5% | | |
| Σ | 100.0% | | |

| Mixture M7 | | | |
|---|---|---|---|
| CY-3-O2 | 6.5% | Clearing point/° C.: | 105 |
| CY-3-O4 | 14.0% | Δn (589 nm, 20° C.): | 0.0953 |
| CCY-3-O1 | 5.0% | Δε (1 kHz, 20° C.): | −4.8 |
| CCY-3-O2 | 6.0% | $\gamma_1$ [mPa s](20° C.): | 226 |
| CCY-3-O3 | 6.0% | $K_1$ (pN, 20° C.): | 16.7 |
| CCY-4-O2 | 6.0% | $K_3$ (pN, 20° C.): | 16.0 |
| CLY-3-O2 | 6.0% | $V_0$ [V]: | 2.0 |
| CPY-2-O2 | 6.5% | | |
| CPY-3-O2 | 6.5% | | |
| CC-3-O1 | 4.5% | | |
| CC-4-V | 16.0% | | |
| CZC-3-3 | 3.0% | | |
| CZC-3-5 | 3.0% | | |
| CZC-4-3 | 3.0% | | |
| CCZC-4-5 | 3.0% | | |
| CCZPC-3-3 | 1.5% | | |
| COB(S)-2O-O5 | 3.5% | | |
| Σ | 100.0% | | |

| Mixture M8 | | | |
|---|---|---|---|
| CY-3-O2 | 4.0% | Clearing point/° C.: | 105 |
| CY-3-O4 | 18.0% | Δn (589 nm, 20° C.): | 0.0956 |
| CCY-3-O1 | 5.0% | Δε (1 kHz, 20° C.): | −4.8 |
| CCY-3-O2 | 6.0% | $\gamma_1$ [mPa s](20° C.): | 231 |
| CCY-3-O3 | 6.0% | $K_1$ (pN, 20° C.): | 15.8 |
| CCY-4-O2 | 6.0% | $K_3$ (pN, 20° C.): | 16.1 |
| CLY-3-O2 | 4.0% | $V_0$ [V]: | 2.0 |
| CPY-2-O2 | 8.0% | | |
| CC-4-V | 18.0% | | |
| CC-5-V | 4.0% | | |
| CZC-3-3 | 3.0% | | |
| CZC-3-5 | 3.0% | | |
| CCZPC-3-3 | 4.5% | | |
| CCZPC-3-4 | 4.5% | | |
| B(S)-2O-O4 | 2.0% | | |
| B-2O-O5 | 4.0% | | |
| Σ | 100.0% | | |

| Mixture M9 | | | |
|---|---|---|---|
| CY-3-O2 | 4.0% | Clearing point/° C.: | 106 |
| CY-3-O4 | 18.0% | Δn (589 nm, 20° C.): | 0.0964 |
| CCY-3-O1 | 5.0% | Δε (1 kHz, 20° C.): | −4.8 |
| CCY-3-O2 | 6.0% | $\gamma_1$ [mPa s](20° C.): | 228 |
| CCY-3-O3 | 6.0% | $V_0$ [V]: | 2.0 |
| CCY-4-O2 | 6.0% | | |
| CLY-3-O2 | 2.5% | | |
| CPY-2-O2 | 8.0% | | |

-continued

| Mixture M9 | |
|---|---|
| CC-4-V | 18.0% |
| CC-5-V | 4.0% |
| CZC-3-3 | 3.0% |
| CZC-3-5 | 3.0% |
| CCZPC-3-3 | 4.5% |
| CCZPC-3-4 | 4.5% |
| B(S)-2O-O4 | 3.0% |
| B(S)-(c5)1O-O2 | 4.5% |
| Σ | 100.0% |

-continued

| Mixture M10 | |
|---|---|
| CC-3-V | 21.0% |
| CZC-3-3 | 3.0% |
| CZC-3-5 | 3.0% |
| CCZPC-3-3 | 4.5% |
| CCZPC-3-4 | 4.5% |
| B(S)-2O-O4 | 3.0% |
| B(S)-(c5)1O-O2 | 4.5% |
| Σ | 100.0% |

Mixture M11

Mixture M11 consists of 98.87% of mixture M1, 0.03% of the compound ST-3a-1 and 0.10% of the compound H-1-1

ST-3a-1

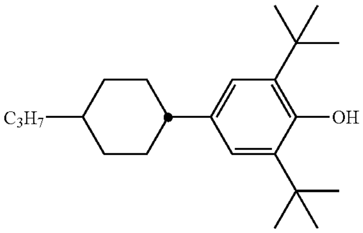

H-1-1a

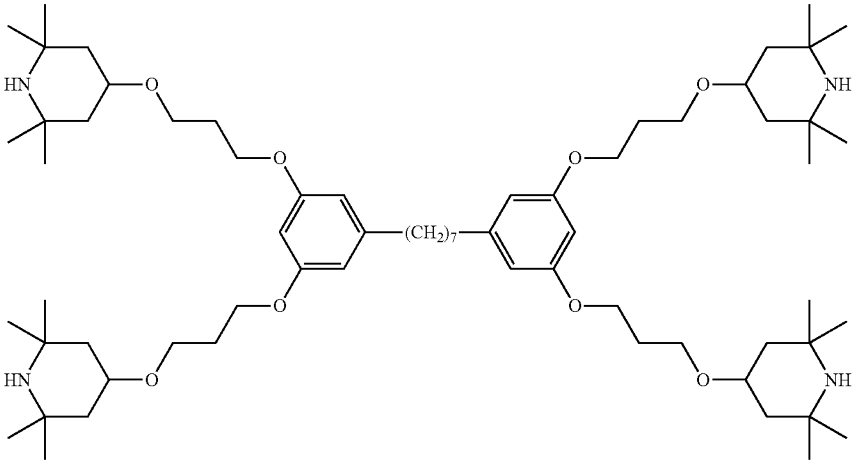

Mixture M9 contains the compound B(S)-(c5)$_1$O-O2

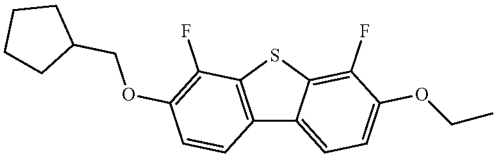 [SMILES: CCOc1ccc2c(sc3c(F)c(OCC4CCCC4)ccc32)c1F]

| Mixture M10 | | | |
|---|---|---|---|
| CY-3-O2 | 6.0% | Clearing point/° C.: | 100 |
| CY-3-O4 | 20.0% | Δn (589 nm, 20° C.): | 0.0959 |
| CCY-3-O1 | 5.0% | Δε (1 kHz, 20° C.): | −5.0 |
| CCY-3-O2 | 5.0% | $\gamma_1$ [mPa s](20° C.): | 214 |
| CCY-3-O3 | 5.0% | $V_0$ [V]: | 2.0 |
| CCY-4-O2 | 5.0% | | |
| CLY-3-O2 | 35% | | |
| CPY-2-O2 | 6.0% | | |

Mixture M12

Mixture M12 consists of 98.965% of mixture M1, 0.03% of the compound ST-3a-1 and 0.005% of the compound H-2-1a ST-3a-1

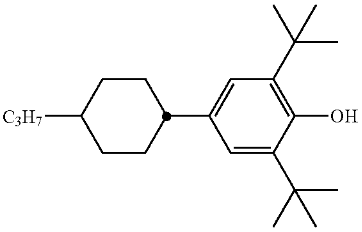

-continued

H-2-1a

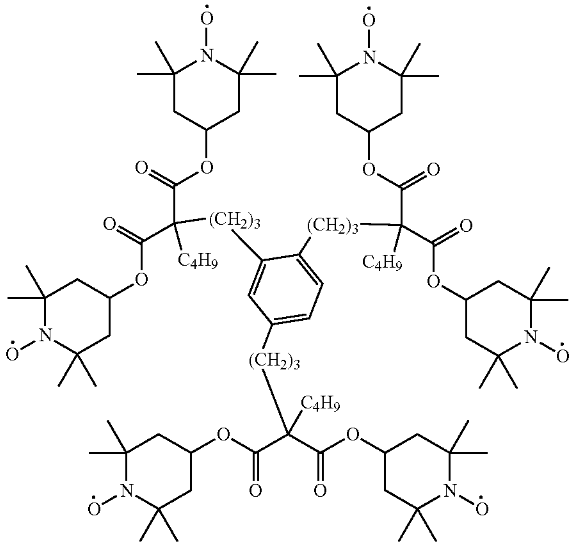

| Mixture M13 | | | |
|---|---|---|---|
| Y-4O-O4 | 10.0% | Clearing point/° C.: | 106 |
| CY-3-O4 | 2.5% | Δn (589 nm, 20° C.): | 0.0980 |
| CCY-3-O1 | 5.0% | Δε (1 kHz, 20° C.): | −4.9 |
| CCY-3-O2 | 8.0% | $\gamma_1$ [mPa s](20° C.): | 208 |
| CCY-3-O3 | 6.0% | $K_1$ (pN, 20° C.): | 16.3 |
| CCY-4-O2 | 6.0% | $K_3$ (pN, 20° C.): | 16.8 |
| CPY-2-O2 | 6.0% | $V_0$ [V]: | 2.0 |
| CPY-3-O2 | 7.5% | | |
| CC-4-V | 18.0% | | |
| CC-5-V | 5.5% | | |
| CZC-3-3 | 3.0% | | |
| CZC-3-5 | 3.0% | | |
| CZC-4-3 | 3.0% | | |
| CCZPC-3-3 | 4.5% | | |
| CCZPC-3-4 | 4.5% | | |
| B(S)-2O-O4 | 7.5% | | |
| Σ | 100.0% | | |

| Mixture M14 | | | |
|---|---|---|---|
| Y-4O-O4 | 10.0% | Clearing point/° C.: | 105 |
| CY-3-O4 | 3.0% | Δn (589 nm, 20° C.): | 0.0969 |
| CCY-3-O1 | 5.0% | Δε (1 kHz, 20° C.): | −4.8 |
| CCY-3-O2 | 6.0% | $\gamma_1$ [mPa s](20° C.): | 204 |
| CCY-3-O3 | 6.0% | $K_1$ (pN, 20° C.): | 16.4 |
| CCY-4-O2 | 6.0% | $K_3$ (pN, 20° C.): | 16.2 |
| CCY-5-O2 | 2.5% | $V_0$ [V]: | 1.9 |
| CPY-2-O2 | 7.0% | | |
| CPY-3-O2 | 5.5% | | |
| CC-4-V | 18.0% | | |
| CC-5-V | 5.5% | | |
| CZC-3-3 | 3.0% | | |
| CZC-3-5 | 3.0% | | |
| CZC-4-3 | 3.0% | | |
| CCZPC-3-3 | 4.5% | | |
| CCZPC-3-4 | 4.5% | | |
| B(S)-2O-O5 | 7.5% | | |
| Σ | 100.0% | | |

| Mixture M15 | | | |
|---|---|---|---|
| Y-4O-O4 | 10.0% | Clearing point/° C.: | 104 |
| CY-3-O4 | 19.0% | Δn (589 nm, 20° C.): | 0.0876 |
| CC-4-V | 11.5% | Δε (1 kHz, 20° C.): | −4.8 |
| CCP-V-1 | 2.5% | $K_1$ (pN, 20° C.): | 15.2 |
| CCY-3-O1 | 4.0% | $K_3$ (pN, 20° C.): | 16.6 |
| CCY-3-O2 | 6.0% | $V_0$ [V]: | 1.9 |
| CCY-3-O3 | 6.0% | | |
| CCY-4-O2 | 6.0% | | |
| CCY-5-O2 | 3.0% | | |
| CZC-3-3 | 3.0% | | |
| CZC-3-5 | 3.0% | | |
| CZC-4-3 | 3.0% | | |
| CZC-4-5 | 3.0% | | |
| CCZPC-3-3 | 5.0% | | |
| CCZPC-3-4 | 5.0% | | |
| CCZPC-3-5 | 5.0% | | |
| B(S)-2O-O5 | 3.0% | | |
| COB(S)-2-O4 | 2.0% | | |
| Σ | 100.0% | | |

| Mixture M16 | | | |
|---|---|---|---|
| Y-4O-O4 | 10.0% | Clearing point/° C.: | 103 |
| CY-3-O4 | 18.0% | Δn (589 nm, 20° C.): | 0.0872 |
| CC-4-V | 12.5% | Δε (1 kHz, 20° C.): | −4.9 |
| CCP-V2-1 | 1.5% | $\gamma_1$ [mPa s](20° C.): | 247 |
| CCY-3-O1 | 4.0% | $K_1$ (pN, 20° C.): | 15.4 |
| CCY-3-O2 | 6.0% | $K_3$ (pN, 20° C.): | 16.6 |
| CCY-3-O3 | 6.0% | $V_0$ [V]: | 1.9 |
| CCY-4-O2 | 6.0% | | |
| CCY-5-O2 | 4.0% | | |
| CZC-3-3 | 3.0% | | |
| CZC-3-5 | 3.0% | | |
| CZC-4-3 | 3.0% | | |
| CZC-4-5 | 3.0% | | |
| CCZPC-3-3 | 5.0% | | |
| CCZPC-3-4 | 5.0% | | |
| CCZPC-3-5 | 5.0% | | |
| B(S)-2O-O5 | 5.0% | | |
| Σ | 100.0% | | |

| Mixture M17 | | | |
|---|---|---|---|
| Y-4O-O4 | 9.5% | Clearing point/° C.: | 104 |
| CY-3-O4 | 13.5% | Δn (589 nm, 20° C.): | 0.0876 |
| CC-4-V | 16.0% | Δε (1 kHz, 20° C.): | −4.9 |
| CCY-3-O1 | 4.0% | $\gamma_1$ [mPa s](20° C.): | 233 |
| CCY-3-O2 | 6.0% | $K_1$ (pN, 20° C.): | 15.6 |
| CCY-3-O3 | 6.0% | $K_3$ (pN, 20° C.): | 16.7 |
| CCY-4-O2 | 6.0% | $V_0$ [V]: | 1.9 |
| CCY-5-O2 | 4.0% | | |
| CZC-3-3 | 4.0% | | |
| CZC-3-5 | 4.0% | | |
| CZC-4-3 | 4.0% | | |
| CZC-4-5 | 4.0% | | |
| CCZPC-3-3 | 4.0% | | |
| CCZPC-3-4 | 4.0% | | |
| CCZPC-3-5 | 4.0% | | |
| B(S)-2O-O5 | 7.0% | | |
| Σ | 100.0% | | |

| Mixture M18 | | | |
|---|---|---|---|
| Y-4O-O4 | 9.5% | Clearing point/° C.: | 101 |
| CY-3-O4 | 13.5% | Δn (589 nm, 20° C.): | 0.0870 |
| CC-4-V | 16.0% | Δε (1 kHz, 20° C.): | −4.8 |

-continued

| Mixture M18 | | | |
|---|---|---|---|
| CCY-3-O1 | 4.0% | $\gamma_1$ [mPa s](20° C.): | 250 |
| CCY-3-O2 | 6.0% | | |
| CCY-3-O3 | 6.0% | | |
| CCY-4-O2 | 6.0% | | |
| CCY-(c5)-O2 | 4.0% | | |
| CZC-3-3 | 4.0% | | |
| CZC-3-5 | 4.0% | | |
| CZC-4-3 | 4.0% | | |
| CZC-4-5 | 4.0% | | |
| CCZPC-3-3 | 4.0% | | |
| CCZPC-3-4 | 4.0% | | |
| CCZPC-3-5 | 4.0% | | |
| B(S)-2O-O5 | 7.0% | | |
| Σ | 100.0% | | |

Mixture M18 contains the compound CCY-(c5)-O2:

IIA-10a-5

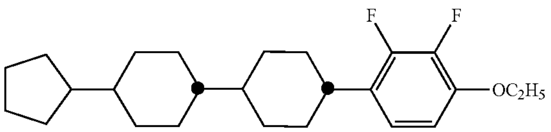

| Mixture M19 | | | |
|---|---|---|---|
| CY-3-O2 | 4.0% | Clearing point/° C.: | 105 |
| CY-3-O4 | 18.0% | Δn (589 nm, 20° C.): | 0.0962 |
| CCY-3-O1 | 5.0% | Δε (1 kHz, 20° C.): | −4.8 |
| CCY-3-O2 | 6.0% | $\gamma_1$ [mPa s](20° C.): | 231 |
| CCY-3-O3 | 6.0% | $V_0$ [V]: | 2.0 |
| CCY-4-O2 | 6.0% | | |
| CLY-3-O2 | 2.5% | | |
| CPY-2-O2 | 8.0% | | |
| CC-4-V | 18.0% | | |
| CC-5-V | 4.0% | | |
| CZC-3-3 | 3.0% | | |
| CZC-3-5 | 3.0% | | |
| CCZPC-3-3 | 4.5% | | |
| CCZPC-3-4 | 4.5% | | |
| B(S)-2O-O4 | 3.0% | | |
| B(S)-(c5-3en)1O-O2 | 4.5% | | |
| Σ | 100.0% | | |

Mixture M19 contains the compound B(S)-(c5-3en)$_1$O-O2

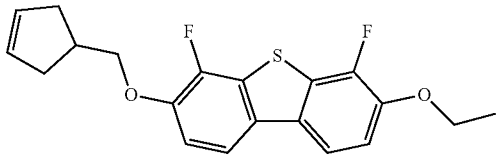 [SMILES: CCOc1ccc2c(sc3c(F)c(OCC4CC=CC4)ccc32)c1F]

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding EP application No. 22167585.3, filed Apr. 11, 2022, are incorporated by reference herein.

The invention claimed is:

1. A liquid crystal medium comprising a) one or more compounds of formula I-2

I-2

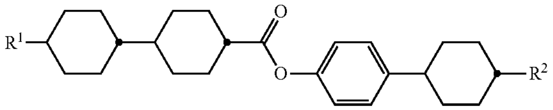

in which $R^1$ and $R^2$ independently of one another, denote alkyl having 1 to 7 C atoms;

b) one or more compounds selected from the group of compounds of formulae IIA, IIB, IIC and IID

IIA

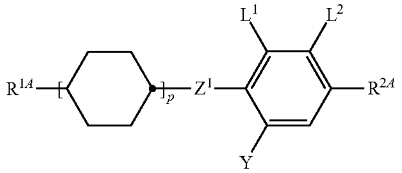

IIB

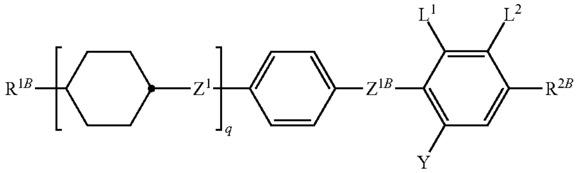

IIC

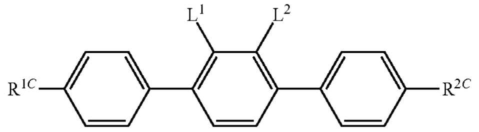

IID

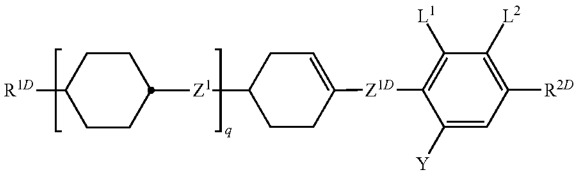

in which $R^{1A}$, $R^{1B}$, $R^{1C}$, $R^{1D}$, $R^{2A}$, $R^{2B}$, $R^{2C}$ and $R^{2D}$ each, independently of one another, denote H, an alkyl radical having 1 to 12 C atoms or an alkenyl radical having 2 to 12 C atoms, wherein the alkyl radical or alkenyl radical is unsubstituted, monosubstituted by CN or $CF_3$ or substituted by one or more halogens, in which one or more $CH_2$ groups may be replaced by —O—, —S—,

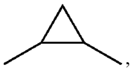, 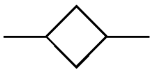, 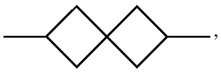, 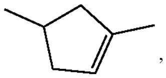, 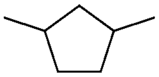

—C≡C—, $—CF_2O—$, $—OCF_2—$, —OC—O— or —O—CO— in such a way that o atoms are not linked directly to one another, $L^1$ and $L^2$, each, independently of one another, denote F, Cl, $CF_3$ or $CHF_2$, Y on each occurrence, identically or differently, denotes H, F, C, $CF_3$, $CHF_2$ or $CH_3$, $Z^1$, $Z^{1B}$ and $Z^{1D}$ each, independently of one another, denote a single bond, $—CH_2CH_2—$, —CH═CH—, $—CF_2O—$, $—OCF_2—$, $—CH_2O—$, $—OCH_2—$, —COO—, —OCO—, $—C_2F_4—$, —CF═CF— or $—CH═CHCH_2O—$, p denotes 0, 1 or 2, and q denotes 0 or 1;

and c) one or more compounds of formula III

III

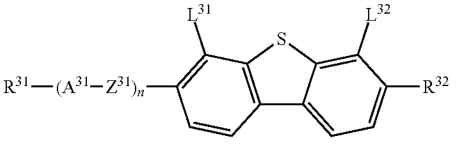

in which $R^{31}$ and $R^{32}$ each, independently of one another, denote H, a straight chain alkyl or alkoxy radical having 1 to 15 C atoms or a branched alkyl or alkoxy radical having 3 to 15 C atoms, where one or more $CH_2$ groups in these radicals may each be replaced, independently of one another, by —C≡C—, $—CF_2O—$, $—OCF_2—$, —CH═CH—, by —O—, —CO—O— or —O—CO— in such a way that O atoms are not linked directly to one another, and in which one or more H atoms may be replaced by halogen, $A^{31}$ on each occurrence, independently of one another, denotes a) 1,4-cyclohexylene or 1,4-cyclohexenylene radical, in which one or two non-adjacent $CH_2$ groups may be replaced by —O— or —S—, b) a 1,4-phenylene radical, in which one or two CH groups may be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be mono- or polysubstituted by halogen atoms, $Z^{31}$ on each occurrence independently of one another denotes —CO—O—, —O—CO—, $—CF_2O—$, $—OCF_2—$, $—CH_2O—$, $—OCH_2—$, $—CH_2—$, $—CH_2CH_2—$, $—(CH_2)_4—$, $—CH═CH—CH_2O—$, $—C_2F_4—$, $—CH_2CF_2—$, $—CF_2CH_2—$, —CF═CF—, —CH═CF—, —CF═CH—, —CH═CH—, —C≡C— or a single bond, $L^{31}$ and $L^{32}$ each, independently of one another, denote F, Cl, $CF_3$ or $CHF_2$, and n is 0, 1 or 2;

wherein the medium has a birefringence of 0.080 to 0.100, measured at 20° C. with light with a wavelength of 589.9 nm.

2. The medium according to claim 1, comprising one or more compounds of formula IID, which are selected from the group consisting of the compounds of formulae IID-4, IID-7 and IID-10

IID-4

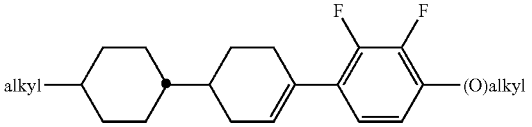

IID-7

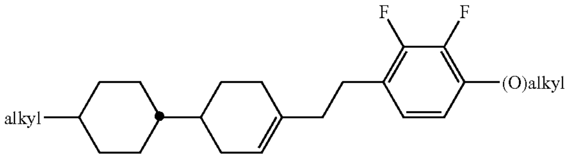

IID-10

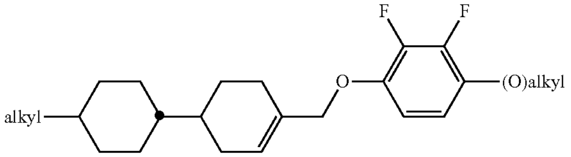

in which alkyl denotes a straight-chain alkyl radical having 1-6 C atoms and (O) denotes an oxygen atom or a single bond.

3. The medium according to claim 2, comprising a compound of formula IID-10.

4. The medium according to claim 1, further comprising one or more compounds of formula I-1

I-1

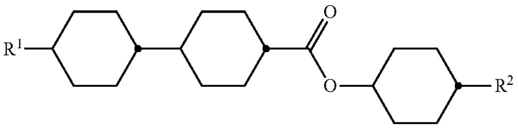

in which $R^1$ and $R^2$ denote alkyl having 1 to 7 C atoms.

5. The medium according to claim 1, comprising the one or more compounds of formula I-2 in a total concentration of 5% to 30% by weight.

6. The medium according to claim 1, further comprising one or more compounds of formula IV

IV

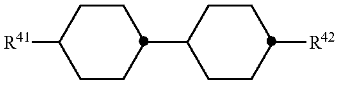

in which $R^{41}$ denotes alkyl having 1 to 7 C atoms or alkenyl having 2 to 7 C atoms, and $R^{42}$ denotes alkyl having 1 to 7 C atoms or alkoxy having 1 to 6 C atoms or alkenyl having 2 to 7 C atoms.

7. The medium according to claim 6, wherein the one or more compounds of formula IV are selected from the group consisting of compounds of formulae IV-3-3, IV-3-4 and IV-3-5:

IV-3-3

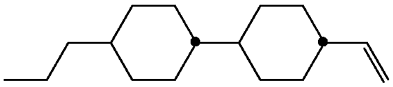

IV-3-4

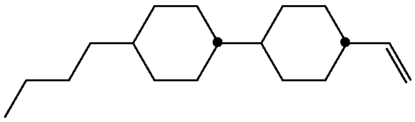

IV-3-5

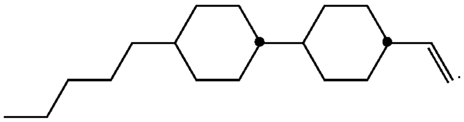

8. The medium according to claim 6, wherein the concentration of the one or more compounds of formula IV is >0% to 25% by weight.

9. The medium according to claim 1, wherein the medium has a clearing temperature of 95° C. or more.

10. A process of preparing an LC medium according to claim 1, comprising mixing one or more compounds of formula I-2 with one or more compounds selected from the group consisting of compounds of formulae IIA, IIB, IIC and IID and with one or more compounds of formula III.

11. An LC display comprising the medium according to claim 1.

12. The display according to claim 11, wherein the display is a VA, PSA, PS-VA, PVA, MVA, PM-VA, FFS, UB-FFS, PS-FFS, IPS or PS-IPS display.

13. The display according to claim 12, wherein the display is a passive matrix VA display.

14. An electro-optical display comprising the medium according to claim 1.

15. The medium according to claim 1, wherein the medium has a negative dielectric anisotropy.

16. The medium according to claim 1, wherein the medium has a clearing temperature of 100° C. to 107° C.

17. The medium according to claim 1, wherein the medium has a clearing temperature of 100° C. to 1070C and a negative dielectric anisotropy of −4.8 to −5.2.

18. The medium according to claim 1, wherein the one or more compounds of formula I-2 are present at a concentration of 4% to 13%.

* * * * *